United States Patent
Browy et al.

(10) Patent No.: US 11,747,618 B2
(45) Date of Patent: *Sep. 5, 2023

(54) SYSTEMS AND METHODS FOR SIGN LANGUAGE RECOGNITION

(71) Applicant: Magic Leap, Inc., Plantation, FL (US)

(72) Inventors: Eric Browy, Meridian, ID (US); Michael Janusz Woods, Mountain View, CA (US); Andrew Rabinovich, San Francisco, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/817,127

(22) Filed: Aug. 3, 2022

(65) Prior Publication Data

US 2022/0375177 A1    Nov. 24, 2022

Related U.S. Application Data

(63) Continuation of application No. 16/986,935, filed on Aug. 6, 2020, now Pat. No. 11,410,392, which is a
(Continued)

(51) Int. Cl.
*G02B 27/01* (2006.01)
*G06T 19/00* (2011.01)
(Continued)

(52) U.S. Cl.
CPC ....... *G02B 27/017* (2013.01); *G02B 27/0172* (2013.01); *G06F 1/163* (2013.01);
(Continued)

(58) Field of Classification Search
None
See application file for complete search history.

(56) References Cited

U.S. PATENT DOCUMENTS 6,850,221 B1   2/2005 Tickle
D514,570 S     2/2006 Ohta
(Continued)

FOREIGN PATENT DOCUMENTS

CN    204242466    4/2016
EP    3211504      8/2017
(Continued)

OTHER PUBLICATIONS

U.S. Appl. No. 14/212,961, filed Mar. 4, 2014, Schowengerdt et al.
(Continued)

*Primary Examiner* — Jeffrey J Chow
(74) *Attorney, Agent, or Firm* — Fish & Richardson P.C.

(57) ABSTRACT

A sensory eyewear system for a mixed reality device can facilitate user's interactions with the other people or with the environment. As one example, the sensory eyewear system can recognize and interpret a sign language, and present the translated information to a user of the mixed reality device. The wearable system can also recognize text in the user's environment, modify the text (e.g., by changing the content or display characteristics of the text), and render the modified text to occlude the original text.

20 Claims, 29 Drawing Sheets

Related U.S. Application Data continuation of application No. 16/801,684, filed on Feb. 26, 2020, now Pat. No. 10,769,858, which is a continuation of application No. 15/702,312, filed on Sep. 12, 2017, now Pat. No. 10,580,213.

(60) Provisional application No. 62/440,320, filed on Dec. 29, 2016, provisional application No. 62/394,013, filed on Sep. 13, 2016.

(51) Int. Cl.
*G06F 3/01* (2006.01)
*G06F 1/16* (2006.01)
*G06F 3/03* (2006.01)
*G06F 40/58* (2020.01)
*G06V 20/20* (2022.01)
*G06V 40/20* (2022.01)
*G06F 3/16* (2006.01)
*G06T 7/70* (2017.01)
*G06V 30/10* (2022.01)

(52) U.S. Cl.
CPC .......... *G06F 1/1686* (2013.01); *G06F 1/1688* (2013.01); *G06F 3/011* (2013.01); *G06F 3/013* (2013.01); *G06F 3/017* (2013.01); *G06F 3/0304* (2013.01); *G06F 40/58* (2020.01); *G06T 19/006* (2013.01); *G06V 20/20* (2022.01); *G06V 40/28* (2022.01); *G02B 27/0179* (2013.01); *G02B 2027/014* (2013.01); *G02B 2027/0138* (2013.01); *G02B 2027/0141* (2013.01); *G02B 2027/0178* (2013.01); *G02B 2027/0187* (2013.01); *G06F 3/16* (2013.01); *G06T 7/70* (2017.01); *G06T 2207/20084* (2013.01); *G06V 30/10* (2022.01)

(56) References Cited

U.S. PATENT DOCUMENTS

| | | | |
|---|---|---|---|
| 8,140,339 | B2 | 3/2012 | Hernandez-Rebollar |
| 8,493,174 | B2 | 7/2013 | Agrawal |
| 8,761,513 | B1* | 6/2014 | Rogowski ............... G06F 40/51 |
| | | | 382/187 |
| 9,081,426 | B2 | 7/2015 | Armstrong |
| 9,092,674 | B2 | 7/2015 | Andrade et al. |
| 9,215,293 | B2 | 12/2015 | Miller |
| D752,529 | S | 3/2016 | Loretan et al. |
| 9,348,143 | B2 | 5/2016 | Gao et al. |
| D759,657 | S | 7/2016 | Kujawski et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| D794,288 | S | 8/2017 | Beers et al. |
| 9,740,006 | B2 | 8/2017 | Gao |
| 9,791,700 | B2 | 10/2017 | Schowengerdt et al. |
| D805,734 | S | 12/2017 | Fisher et al. |
| 9,851,563 | B2 | 12/2017 | Gao et al. |
| 9,857,591 | B2 | 1/2018 | Welch et al. |
| 9,874,749 | B2 | 1/2018 | Bradski |
| 10,580,213 | B2 | 3/2020 | Browy et al. |
| 10,769,858 | B2 | 9/2020 | Browy et al. |
| 2006/0028436 | A1 | 2/2006 | Armstrong |
| 2007/0081123 | A1 | 4/2007 | Lewis |
| 2010/0328432 | A1 | 12/2010 | Tanaka |
| 2011/0151846 | A1 | 6/2011 | Lin |
| 2011/0301934 | A1 | 12/2011 | Tardif |
| 2012/0035907 | A1 | 2/2012 | Lebeau et al. |
| 2012/0105473 | A1 | 5/2012 | Bar-Zeev et al. |
| 2012/0127062 | A1 | 5/2012 | Bar-Zeev et al. |
| 2012/0162549 | A1 | 6/2012 | Gao et al. |
| 2012/0215520 | A1 | 8/2012 | Davis |
| 2012/0330646 | A1 | 12/2012 | Andrade et al. |
| 2013/0004068 | A1* | 1/2013 | Koo ..................... G06V 10/267 |
| | | | 382/165 |
| 2013/0051614 | A1 | 2/2013 | Lee et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2013/0250042 | A1 | 9/2013 | Raghoebardayal |
| 2013/0278631 | A1* | 10/2013 | Border .................. G06Q 30/02 |
| | | | 345/633 |
| 2013/0307842 | A1 | 11/2013 | Grinberg et al. |
| 2014/0003762 | A1* | 1/2014 | Macnamara ............ G02F 1/011 |
| | | | 385/39 |
| 2014/0071539 | A1 | 3/2014 | Gao |
| 2014/0081634 | A1 | 3/2014 | Forutanpour et al. |
| 2014/0125558 | A1 | 5/2014 | Miyajima et al. |
| 2014/0129207 | A1 | 5/2014 | Bailey et al. |
| 2014/0172408 | A1* | 6/2014 | Vukosavljevic ........ G06V 20/63 |
| | | | 704/2 |
| 2014/0177023 | A1 | 6/2014 | Gao et al. |
| 2014/0218468 | A1 | 8/2014 | Gao et al. |
| 2014/0253437 | A1 | 9/2014 | Vaught et al. |
| 2014/0267420 | A1 | 9/2014 | Schowengerdt |
| 2014/0306866 | A1 | 10/2014 | Miller et al. |
| 2014/0337023 | A1 | 11/2014 | McCulloch et al. |
| 2015/0002808 | A1 | 1/2015 | Rizzo, III et al. |
| 2015/0016777 | A1 | 1/2015 | Abovitz et al. |
| 2015/0103306 | A1 | 4/2015 | Kaji et al. |
| 2015/0134318 | A1* | 5/2015 | Cuthbert ................ G06F 40/58 |
| | | | 715/231 |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0248786 | A1 | 9/2015 | Schowengerdt |
| 2015/0254905 | A1 | 9/2015 | Ramsby et al. |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0309995 | A1 | 10/2015 | Osterhout |
| 2015/0316988 | A1 | 11/2015 | Sugaya et al. |
| 2015/0326570 | A1 | 11/2015 | Publicover et al. |
| 2015/0346490 | A1 | 12/2015 | TeKolste et al. |
| 2015/0346495 | A1 | 12/2015 | Welch et al. |
| 2015/0363388 | A1 | 12/2015 | Herdagdelen et al. |
| 2015/0370785 | A1* | 12/2015 | Mauser ................. G06V 30/262 |
| | | | 704/7 |
| 2016/0011419 | A1 | 1/2016 | Gao |
| 2016/0026253 | A1 | 1/2016 | Bradski et al. |
| 2016/0041388 | A1 | 2/2016 | Fujimaki et al. |
| 2016/0062987 | A1 | 3/2016 | Yapamanu et al. |
| 2016/0078631 | A1 | 3/2016 | Takahashi et al. |
| 2016/0091964 | A1 | 3/2016 | Iyer et al. |
| 2016/0209648 | A1 | 7/2016 | Haddick et al. |
| 2016/0270656 | A1 | 9/2016 | Samec et al. |
| 2017/0154464 | A1 | 6/2017 | Lanier et al. |
| 2017/0186230 | A1* | 6/2017 | Ivers ..................... G06F 3/04842 |
| 2017/0227773 | A1 | 8/2017 | Aksit et al. |
| 2017/0236450 | A1 | 8/2017 | Jung et al. |
| 2017/0270103 | A1 | 9/2017 | Golan et al. |
| 2018/0075659 | A1 | 3/2018 | Browy et al. |
| 2020/0193714 | A1 | 6/2020 | Browy et al. |
| 2021/0150145 | A1* | 5/2021 | Negishi .................. G06F 3/017 |

FOREIGN PATENT DOCUMENTS

| | | |
|---|---|---|
| JP | 10-133840 | 5/1998 |
| JP | 2004-254218 | 9/2004 |
| JP | 2005-100465 | 4/2005 |
| JP | 2005-166009 | 6/2005 |
| JP | 2005-197889 | 7/2005 |
| JP | 2006-139138 | 6/2006 |
| JP | 2007-172251 | 7/2007 |
| JP | 2007-172316 | 7/2007 |
| JP | 2008-083289 | 4/2008 |
| JP | 2008-116704 | 5/2008 |
| JP | WO 2009/037956 | 3/2009 |

(56) References Cited

FOREIGN PATENT DOCUMENTS

| JP | 2011-010128 | 1/2011 |
|---|---|---|
| JP | 2011-186636 | 9/2011 |
| JP | 2012-252581 | 12/2012 |
| JP | 2015-076774 | 4/2015 |
| JP | 2015-169814 | 9/2015 |
| JP | 2016-039599 | 3/2016 |
| WO | WO 2008/119187 | 10/2008 |
| WO | WO 2014/046833 | 3/2014 |
| WO | WO 2014/182976 | 11/2014 |
| WO | WO 2015/094220 | 6/2015 |
| WO | WO 2015/143114 | 9/2015 |
| WO | WO 2015/192117 | 12/2015 |
| WO | WO 2018/052901 | 3/2018 |

OTHER PUBLICATIONS

U.S. Appl. No. 14/331,218, filed Jul. 14, 2014, Abovitz et al.
U.S. Appl. No. 14/555,585, filed Nov. 27, 2014, Schowengerdt.
U.S. Appl. No. 14/641,376, filed Mar. 7, 2015, Bradski et al.
U.S. Appl. No. 14/690,401, filed Apr. 18, 2015, Miller et al.
U.S. Appl. No. 62/005,807, filed May 30, 2014, Klug et al.
U.S. Appl. No. 62/012,273, filed Jun. 14, 2014, Bradski.
ARToolKit: https://web.archive.org/web/20051013062315/http://www.hitl.washington.edu:80/artoolkit/documentation/hardware.htm, archived Oct. 13, 2005, 3 pages.
Azuma, "a Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995, 262 pages.
Bimber, et al., "Spatial Augmented Reality—Merging Real and Virtual Worlds," 2005, 393 pages https://web.media.mit.edu/~raskar/book/BimberRaskarAugmentedRealityBook.pdf.
Dogic, S. et al., "Sign Language Recognition using Neural Networks", TEM Journal, vol. 3(4), Nov. 2014, in 6 pages. URL: www.temjournal.com.
Extended European Search Report in European Appln. No. 21210826.0, dated Feb. 21, 2022, 9 pages.
Gawande, S. et al., "Neural Network based Hand Gesture Recognition", International Journal of Emerging Research in Management and Technology, Mar. 2013, in 5 pages.
International Preliminary Report on Patentability for PCT Application No. PCT/US2017/051173, dated Mar. 19, 2019(MLEAP.077WO), 9 pages.
International Search Report and Written Opinion for PCT Application No. PCT/US2017/051173, dated Nov. 16, 2017 (MLEAP.077WO), 19 pages.
Jacob, "Eye Tracking in Advanced Interface Design," Human-Computer Interaction Lab Naval Research Laboratory, Washington, D.C. /paper/in Virtual Environments and Advanced Interface Design, ed. by W. Barfield and TA Furness, DP. 258-288, Oxford University Press, New York (1995).
Lungociu, C., "Real Time Sign Language Recognition Using Artificial Neural Networks", Studia Univ. Babes-Bolyai, Informatica, vol. LVI (4), Sep. 2011, in 10 pages.
Mekala, P. et al., "Real-time Sign Language Recognition based on Neural Network Architecture", IEEE, Mar. 2011, in 5 pages.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

\* cited by examiner

SYSTEMS AND METHODS FOR SIGN LANGUAGE RECOGNITION

CROSS-REFERENCE TO RELATED APPLICATIONS

This application is a continuation of U.S. patent application Ser. No. 16/986,935, filed Aug. 6, 2020, and entitled "INFORMATION DISPLAY IN AUGMENTED REALITY SYSTEMS," which is a continuation of U.S. patent application Ser. No. 16/801,684, filed on Feb. 26, 2020, entitled "SYSTEMS AND METHODS FOR SIGN LANGUAGE RECOGNITION," now U.S. Pat. No. 10,769,858, which is a continuation of U.S. patent application Ser. No. 15/702,312, filed on Sep. 12, 2017, entitled "SYSTEMS AND METHODS FOR SIGN LANGUAGE RECOGNITION," now U.S. Pat. No. 10,580,213, which claims the benefit of priority under 35 U.S.C. § 119(e) to U.S. Provisional Application No. 62/394,013, filed on Sep. 13, 2016, entitled "SENSORY EYEWEAR," and U.S. Provisional Application No. 62/440,320 filed on Dec. 29, 2016, entitled "SYSTEMS AND METHODS FOR AUGMENTED REALITY," the disclosures of each of which are hereby incorporated by reference herein in their entireties.

FIELD

The present disclosure relates to virtual reality and augmented reality imaging and visualization systems and more particularly to recognizing sign language or text in an environment and rendering virtual content based on the recognized sign language or text.

BACKGROUND

Modern computing and display technologies have facilitated the development of systems for so called "virtual reality", "augmented reality", or "mixed reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user; a mixed reality, or "MR", related to merging real and virtual worlds to produce new environments where physical and virtual objects co-exist and interact in real time. As it turns out, the human visual perception system is very complex, and producing a VR, AR, or MR technology that facilitates a comfortable, natural-feeling, rich presentation of virtual image elements amongst other virtual or real-world imagery elements is challenging. Systems and methods disclosed herein address various challenges related to VR, AR and MR technology.

SUMMARY

Various embodiments of a mixed reality system for recognizing sign language and text in an environment are disclosed. These embodiments advantageously may permit greater interaction among differently-abled persons.

A sensory eyewear system for a mixed reality device can facilitate user's interactions with the other people or with the environment. As one example, the sensory eyewear system can recognize and interpret a sign language, and present the translated information to a user of the mixed reality device. The wearable system can also recognize text in the user's environment, modify the text (e.g., by changing the content or display characteristics of the text), and render the modified text to occlude the original text.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Figure 1:
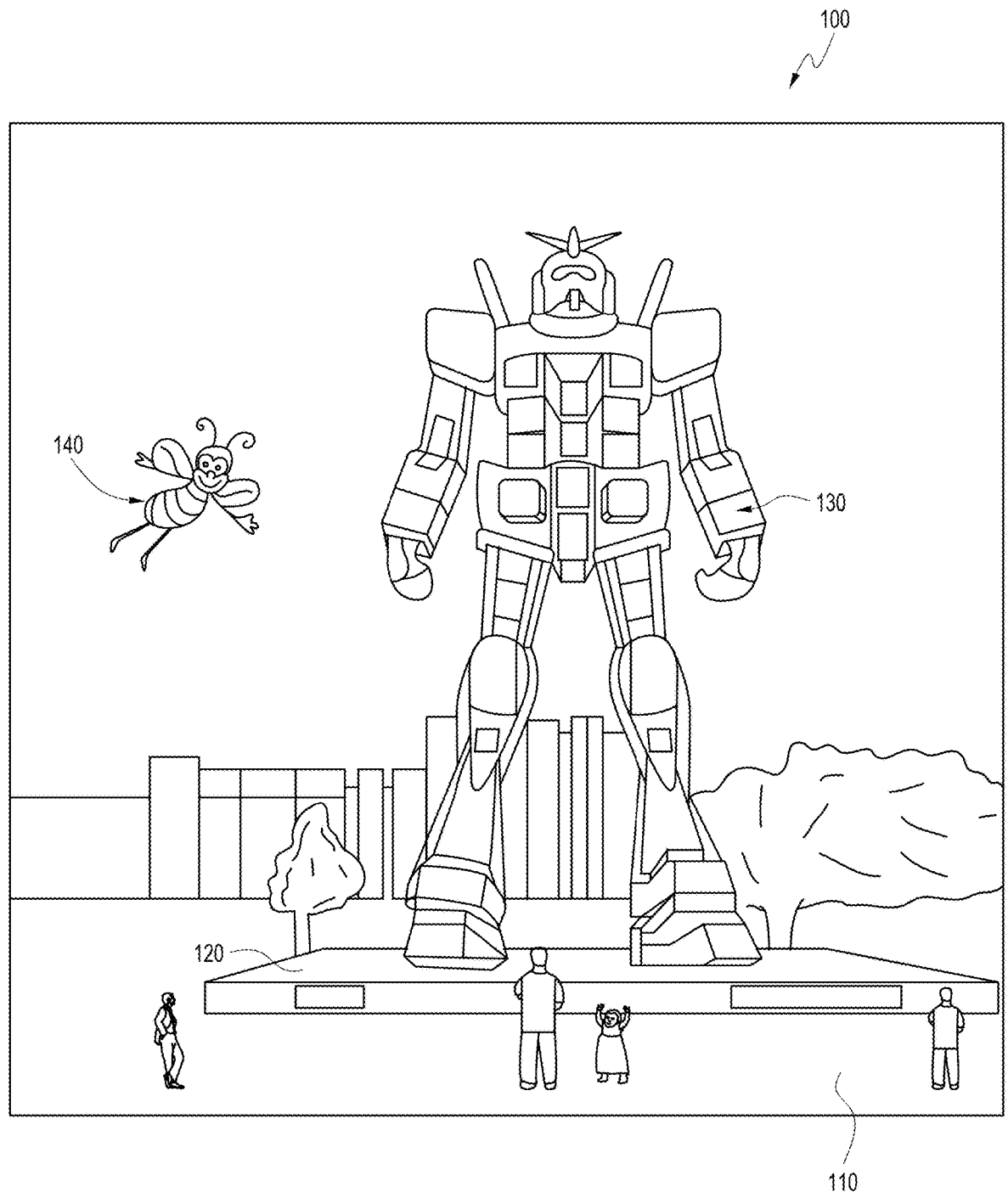
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A wearable system which is configured to present AR/VR/MR content can implement an sensory eyewear system to enhance the user's interaction with other people or the environment. An example wearable system can comprise a head-mounted display, various imaging sensors, and one or more hardware processors. The display can be a see-through display worn in front of the eye or eyes.

To enhance the user's interaction experience with other people, the wearable system can be configured to capture and interpret a sign language. A sign language primarily uses visual gestures (e.g., hand shapes; hand orientations; hand, arm, or body movements; or facial expressions) to communicate. There are hundreds of sign languages used around the world. Some sign languages may be used more often than others. For example, American sign language (ASL) is widely used in the U.S. and Canada.

Many people do not know any sign languages. A speech- or hearing-challenged person and a conversation partner may not be familiar with the same sign language. This can impede conversation with the hearing-challenged or the speech-challenged persons. Accordingly, the wearable system that can image signs (e.g., gestures) being made by a conversation partner, convert the signs to text or graphics (e.g., graphics of sign language gestures in a sign language the system user understands), and then display information associated with the sign (e.g., a translation of the signs into a language understood by the user) would greatly help improve the communication between the user and the conversation partner. Further, it may be desirable to have a wearable system which can provide textual or graphical conversion of a sign language in (or near) real-time with a minimal level of distraction to, and an insignificant level of effort by, a user of the wearable system.

The present disclosure discloses examples of such desirable systems in the context of a wearable device. The wearable device may include a head-mounted component (such as, e.g., a head-mounted display). Such a device can allow a user to visually receive information which is provided by a computing device in such a manner that the information is simultaneously viewable alongside (or on top of) the normally viewable real world. Such a system can be used to display any form of information that can be displayed on a traditional computer screen such as characters, image effects, text, graphics, or video of any kind.

The wearable system described herein can combine sign language recognition (SLR) and display capability of a wearable device to provide a user with information based on a detected sign language. For example, an outward-facing camera on the wearable device can image gestures being made, identify signs among the gestures, translate the signs to a language the user understands, and display the translation to the user. A transcript (e.g., a caption or a text bubble) of the detected sign language can be displayed to the user by the wearable system. A machine learning algorithm (e.g., a deep neural network) can receive the images and perform the identification and translation of the signs. When prompted by the user, the meaning of a word in the transcript or relevant information from an appropriate source can be displayed. The kinds of auxiliary information that the wearable system can provide can be as unlimited as the vast array of available information resources, e.g., on the Internet.

In addition to or in alternative to enhancing the user's interaction experience with other people, the sensory eyewear system can also improve the user's experience with the environment. As an example of improving user interactions with the environment, a wearable system implementing the sensory eyewear system can recognize text (e.g., text on signage such as, e.g., commercial or public display signs) in an environment, modify the display characteristics of the text (e.g., by increasing the size of the text) or modify the content of the text (e.g., by translating the text to another language), and render the modified text over the physical text in the environment.

As further described herein, a wearable system can receive an image of the user's environment. The image may be acquired by the outward-facing imaging system of a wearable device or a totem associated with the wearable device. The wearable system can determine whether the image comprises one or more letters or characters and convert the one or more letters or characters into text. The wearable system may determine whether the image comprises letters or characters using a variety of techniques, such as, for example, machine learning algorithms or optical character recognition (OCR) algorithms. The wearable system may use object recognizers (e.g., described in FIG. 7) to identify the letters and characters and convert them into text.

In certain embodiments, the text can be displayed for the user differently than the user would see without the wearable device. For example, the wearable system can cause a head-mounted display to display the text in a font size that is different from a font size associated with the letters or characters associated with the original image. The wearable system can also improve the display quality of the text. For example, various environmental factors, such as fog, haze, rain, bright light, low light, low light or color contrast between the letters and the surrounding image, etc., can impede a user's clear view of text in the environment without the wearable system. The wearable system may present a sign (e.g., with increased contrast ratio or larger font) that will increase the clarity of the text.

The wearable system can also translate the text (e.g., the text on signage) from its original language to a target language. For example, the text may be translated from a language that the user does not understand to a language that the user understands. The translated text may be rendered over the original text such that the user can readily view the text in a language that the user is able to understand.

Examples of 3D Display of a Wearable System

A wearable system (also referred to herein as an augmented reality (AR) system) can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be a head-mounted device (HMD) which is used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth.

Figure 2A:
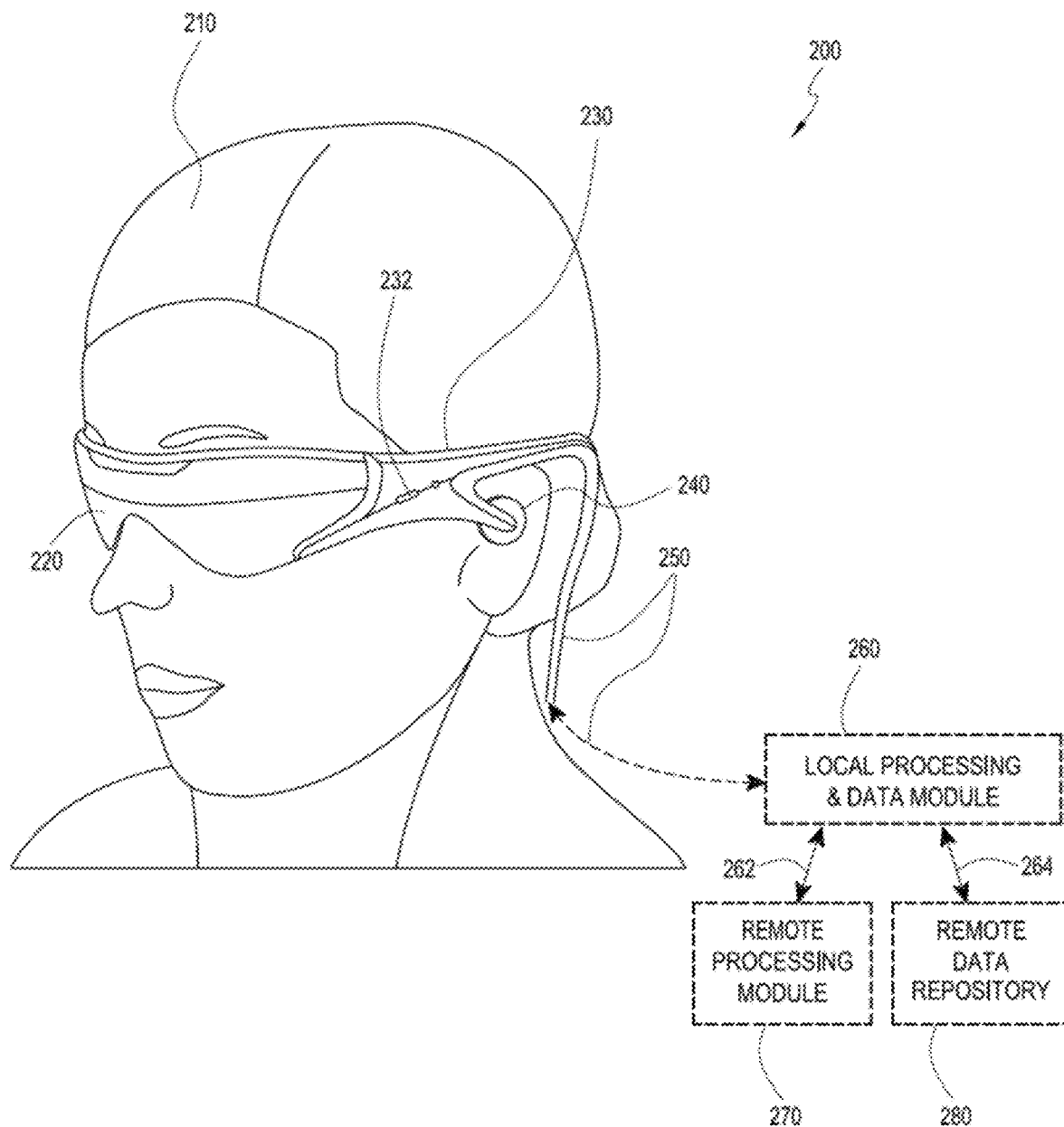
FIG. 2A schematically illustrates an example of a wearable system which can implement a sensory eyewear system.

FIG. 2A illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display that is worn on the head of the user. In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Figure 2B:
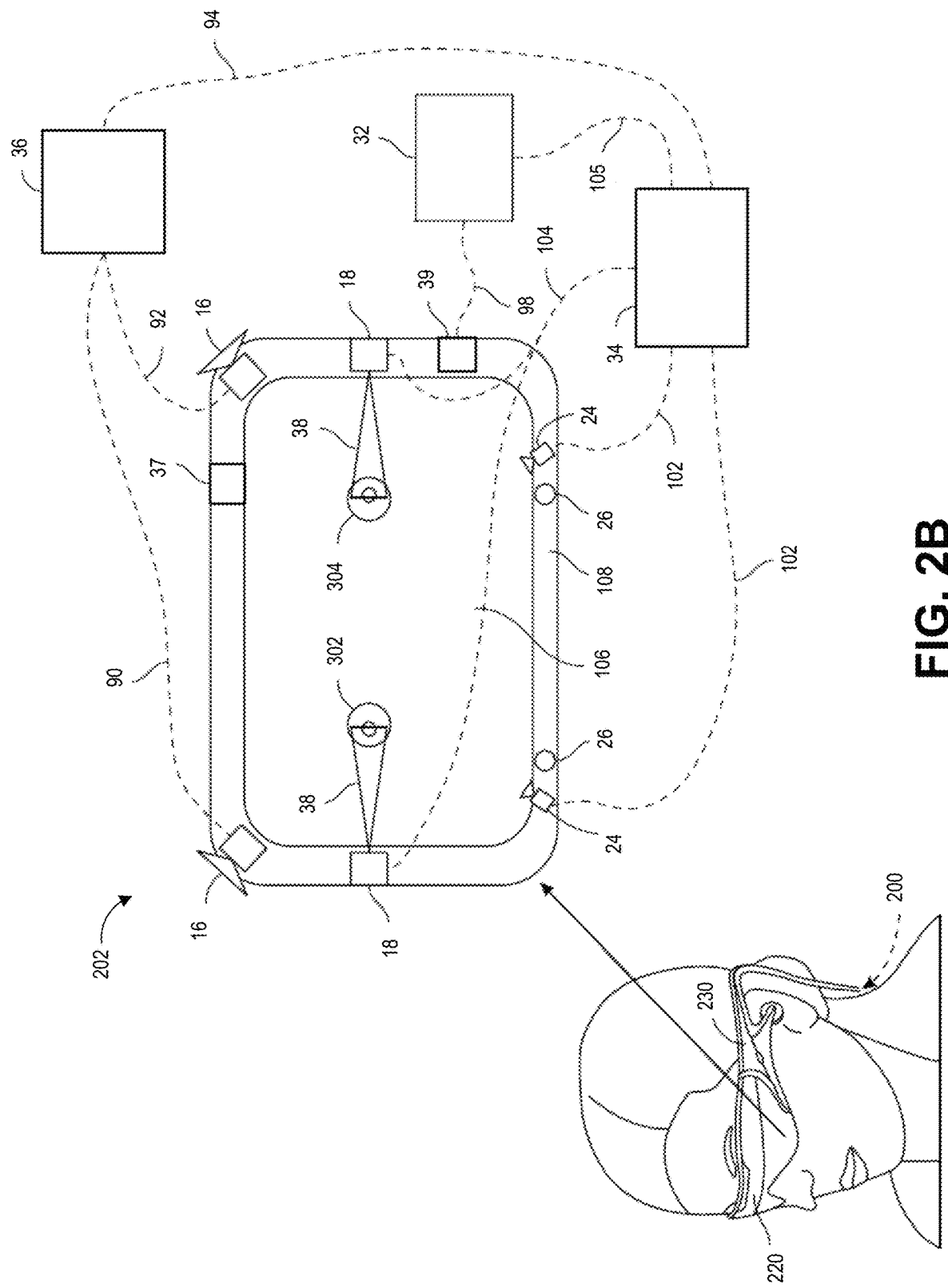
FIG. 2B schematically illustrates various example components of a wearable system.

FIG. 2B shows the wearable system 200 which can include a display 220 and a frame 230. A blown-up view 202 schematically illustrates various components of the wearable system 200. In certain implements, one or more of the components illustrated in FIG. 2B can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 2B provides a basic idea of some of the various components and types of data that may be collected, analyzed, and stored through the wearable system.

FIG. 2B shows an example wearable system 200 which can include the display 220. The display 220 can comprise a display lens 106 that may be mounted to a user's head or a housing or frame 108, which corresponds to the frame 230. The display lens 106 may comprise one or more transparent mirrors positioned by the housing 108 in front of the user's eyes 302, 304 and may be configured to bounce projected light 38 into the eyes 302, 304 and facilitate beam shaping, while also allowing for transmission of at least some light from the local environment. The wavefront of the projected light beam 38 may be bent or focused to coincide with a desired focal distance of the projected light. As illustrated, two wide-field-of-view machine vision cameras 16 (also referred to as world cameras) can be coupled to the housing 108 to image the environment around the user. These cameras 16 can be dual capture visible light/non-visible (e.g., infrared) light cameras. The cameras 16 may be part of the outward-facing imaging system 464 shown in FIG. 4. Image acquired by the world cameras 16 can be processed by the pose processor 36. For example, the pose processor 36 can implement one or more object recognizers 708 (e.g., shown in FIG. 7) to identify a pose of a user or another person in the user's environment or to identify a physical object in the user's environment.

With continued reference to FIG. 2B, a pair of scanned-laser shaped-wavefront (e.g., for depth) light projector modules with display mirrors and optics configured to project light 38 into the eyes 302, 304 are shown. The depicted view also shows two miniature infrared cameras 24 paired with infrared light sources 26 (such as light emitting diodes "LED"s), which are configured to be able to track the eyes 302, 304 of the user to support rendering and user input. The cameras 24 may be part of the inward-facing imaging system 462 shown in FIG. 4 The wearable system 200 can further feature a sensor assembly 39, which may comprise X, Y, and Z axis accelerometer capability as well as a magnetic compass and X, Y, and Z axis gyro capability, preferably providing data at a relatively high frequency, such as 200 Hz. The sensor assembly 39 may be part of the IMU described with reference to FIG. 2A The depicted system 200 can also comprise a head pose processor 36, such as an ASIC (application specific integrated circuit), FPGA (field programmable gate array), or ARM processor (advanced reduced-instruction-set machine), which may be configured to calculate real or near-real time user head pose from wide field of view image information output from the capture devices 16. The head pose processor 36 can be a hardware processor and can be implemented as part of the local processing and data module 260 shown in FIG. 2A.

Also shown is a processor 32 configured to execute digital or analog processing to derive pose from the gyro, compass, or accelerometer data from the sensor assembly 39. The processor 32 may be part of the local processing and data module 260 shown in FIG. 2A. The wearable system 200 as shown in FIG. 2B can also include a position system such as, e.g., a GPS 37 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 37 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 16 (which may be part of the outward-facing imaging system 464 shown in FIG. 4). Based on the images acquired by the world cameras 16, the wearable system 200 can detect characters in the environment (e.g., by using one or more object recognizers 708 shown in FIG. 7). The wearable system can further use data acquired by the GPS 37 to interpret the characters. For example, the wearable system 200 can identify a geographic region where the characters are located and identify one or more languages associated with the geographic region. The wearable system can accordingly interpret the characters based on the identified language(s), e.g., based on syntax, grammar, sentence structure, spelling, punctuation, etc., associated with the identified language(s). In one example, a user 210 in Germany can perceive a traffic sign while driving down the autobahn. The wearable system 200 can identify that the user 210 is in Germany and that the text from the imaged traffic sign is likely in German based on data acquired from the GPS 37 (alone or in combination with images acquired by the world camera 16).

In some situations, the images acquired by the world cameras 16 may include incomplete information of an object in a user's environment. For example, the image may include an incomplete text (e.g., a sentence, a letter, or a phrase) due to a hazy atmosphere, a blemish or error in the text, low lighting, fuzzy images, occlusion, limited FOV of the world cameras 16, etc. The wearable system 200 could use data acquired by the GPS 37 as a context clue in recognizing the text in image.

The wearable system 200 may also comprise a rendering engine 34 which can be configured to provide rendering information that is local to the user to facilitate operation of the scanners and imaging into the eyes of the user, for the user's view of the world. The rendering engine 34 may be implemented by a hardware processor (such as, e.g., a central processing unit or a graphics processing unit). In some embodiments, the rendering engine is part of the local processing and data module 260. The rendering engine 34 can be communicatively coupled (e.g., via wired or wireless links) to other components of the wearable system 200. For example, the rendering engine 34, can be coupled to the eye cameras 24 via communication link 102, and be coupled to a projecting subsystem 18 (which can project light into user's eyes 302, 304 via a scanned laser arrangement in a manner similar to a retinal scanning display) via the communication link 104. The rendering engine 34 can also be in communication with other processing units such as, e.g., the sensor pose processor 32 and the image pose processor 36 via links 105 and 94 respectively.

The cameras 24 (e.g., mini infrared cameras) may be utilized to track the eye pose to support rendering and user input. Some example eye poses may include where the user is looking or at what depth he or she is focusing (which may be estimated with eye vergence). The GPS 37, gyros, compass, and accelerometers 39 may be utilized to provide coarse or fast pose estimates. One or more of the cameras 16 can acquire images and pose, which in conjunction with data from an associated cloud computing resource, may be utilized to map the local environment and share user views with others.

The example components depicted in FIG. 2B are for illustration purposes only. Multiple sensors and other functional modules are shown together for ease of illustration and description. Some embodiments may include only one or a subset of these sensors or modules. Further, the locations of these components are not limited to the positions depicted in FIG. 2B. Some components may be mounted to or housed within other components, such as a belt-mounted component, a hand-held component, or a helmet component. As one example, the image pose processor 36, sensor pose processor 32, and rendering engine 34 may be positioned in a beltpack and configured to communicate with other components of the wearable system via wireless communication, such as ultra-wideband, Wi-Fi, Bluetooth, etc., or via wired communication. The depicted housing 108 preferably is head-mountable and wearable by the user. However, some components of the wearable system 200 may be worn to other portions of the user's body. For example, the speaker 240 may be inserted into the ears of a user to provide sound to the user.

Regarding the projection of light 38 into the eyes 302, 304 of the user, in some embodiment, the cameras 24 may be utilized to measure where the centers of a user's eyes 302, 304 are geometrically verged to, which, in general, coincides with a position of focus, or "depth of focus", of the eyes 302, 304. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 24, and the rendering engine 34 and projection subsystem 18 may be utilized to render all objects on or close to the horopter in focus, and all other objects at varying degrees of defocus (e.g., using intentionally-created blurring). Preferably, the system 220 renders to the user at a frame rate of about 60 frames per second or greater. As described above, preferably, the cameras 24 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Figure 3:
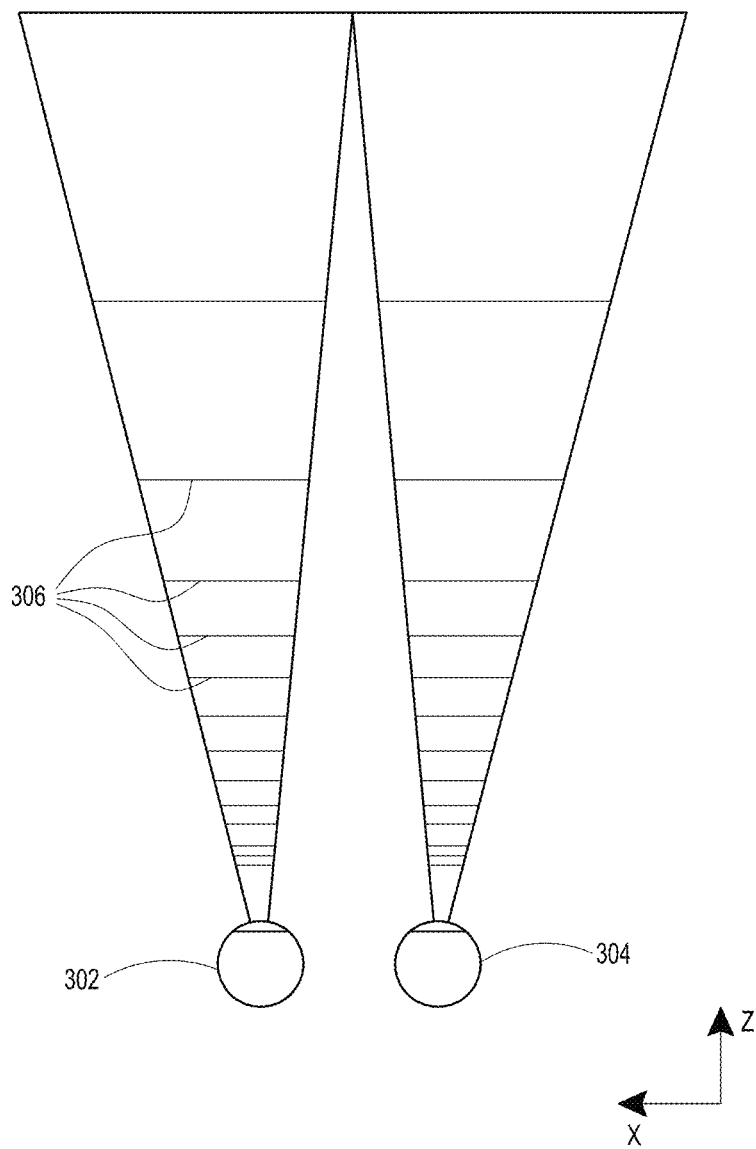
FIG. 3 schematically illustrates aspects of an approach for simulating three-dimensional imagery using multiple depth planes.

FIG. 3 illustrates aspects of an approach for simulating a three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, which has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, it will be appreciated that the fields of view of the eyes 302 and 304 may overlap, for example, as distance along the z-axis increases. In addition, while shown as flat for the ease of illustration, it will be appreciated that the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
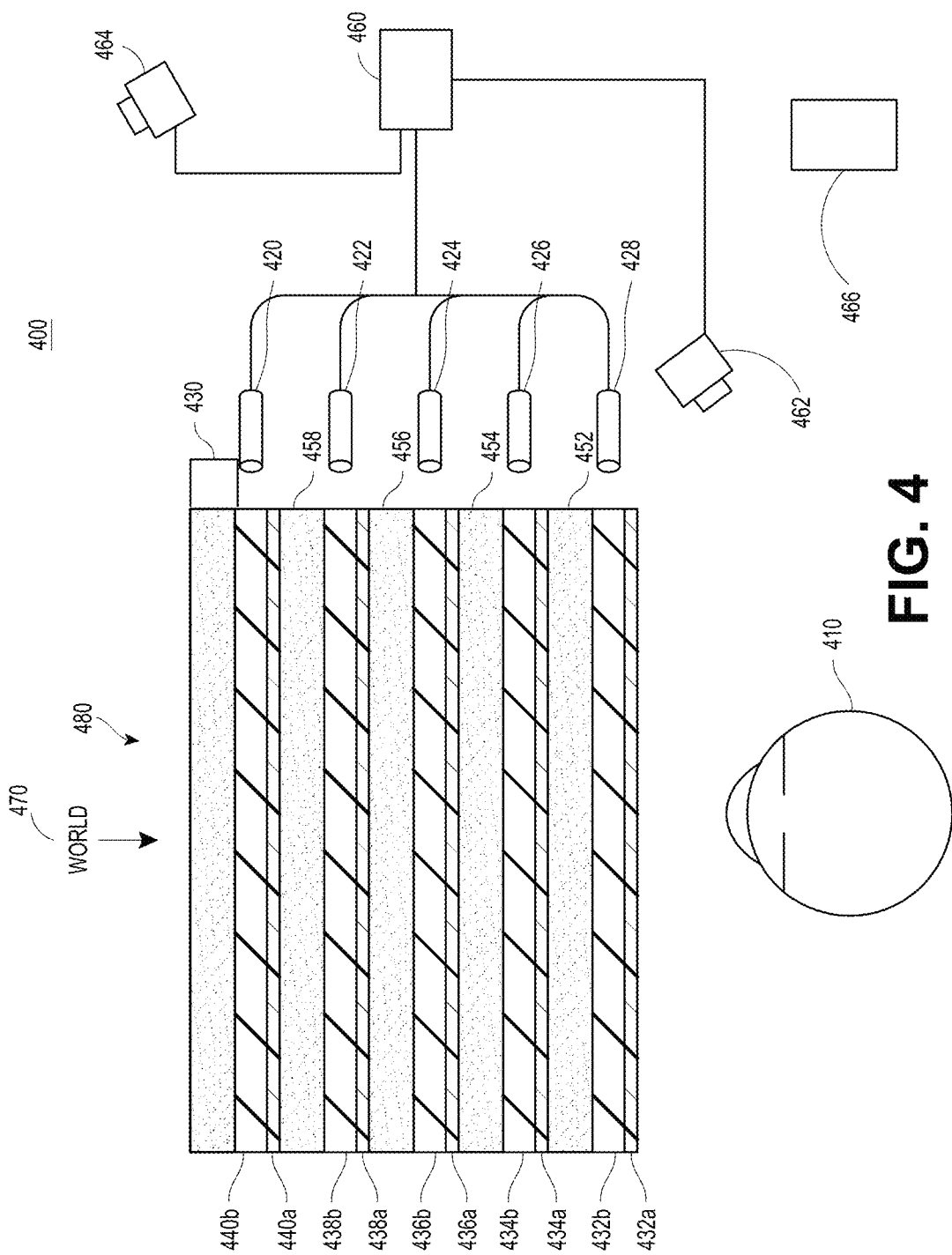
FIG. 4 schematically illustrates an example of a waveguide stack for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2A, with FIG. 4 schematically showing some parts of that wearable system 200 in greater detail. For example, in some embodiments, the waveguide assembly 480 may be integrated into the display 220 of FIG. 2A.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of cloned collimated beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the stacked waveguide assembly 480 and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2A) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include light extracting optical elements 440a, 438a, 436a, 434a, 432a that are configured to extract light out of a waveguide by redirecting the light, propagating within each respective waveguide, out of the waveguide to output image information to the eye 410. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the light extracting optical elements 440a, 438a, 436a, 434a, 432a may be disposed at the top or bottom major surfaces, or may be disposed directly in the volume of the waveguides 440b, 438b, 436b, 434b, 432b. In some embodiments, the light extracting optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the light extracting optical elements 440a, 438a, 436a, 434a, 432a may be formed on a surface or in the interior of that piece of material.

With continued reference to FIG. 4, as discussed herein, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, or diffraction gratings. Light extracting optical elements, such as diffraction gratings, are described in U.S. Patent Publication No. 2015/0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touch-screen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Figure 5:
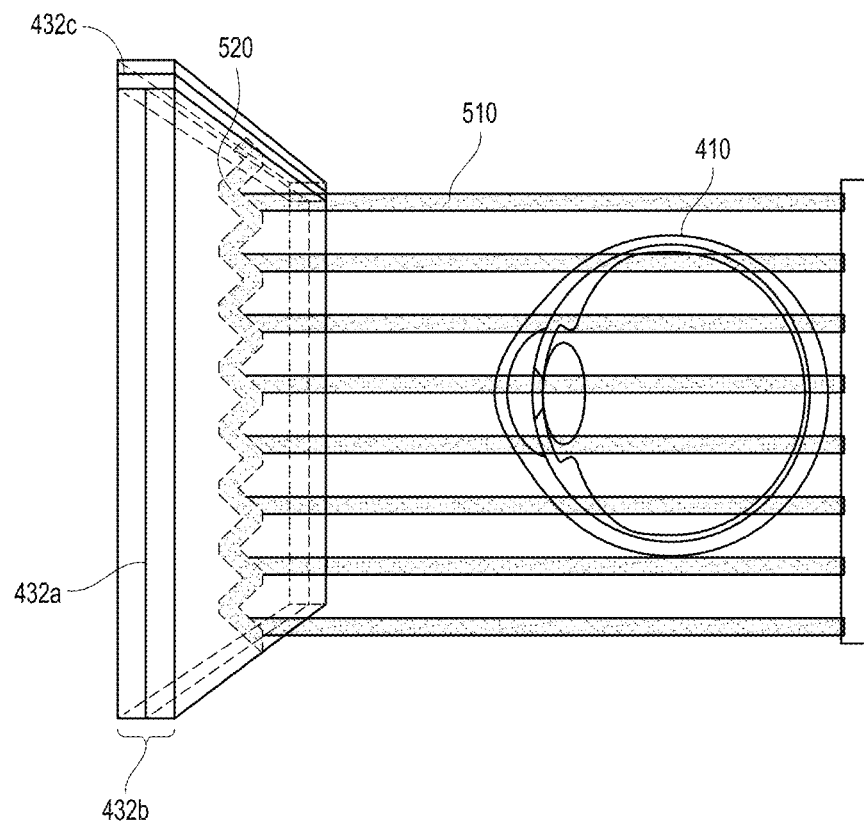
FIG. 5 shows example exit beams that may be outputted by a waveguide.

FIG. 5 shows an example of exit beams outputted by a waveguide. One waveguide is illustrated, but it will be appreciated that other waveguides in the waveguide assembly 480 may function similarly, where the waveguide assembly 480 includes multiple waveguides. Light 520 is injected into the waveguide 432b at the input edge 432c of the waveguide 432b and propagates within the waveguide 432b by TIR. At points where the light 520 impinges on the DOE 432a, a portion of the light exits the waveguide as exit beams 510. The exit beams 510 are illustrated as substantially parallel but they may also be redirected to propagate to the eye 410 at an angle (e.g., forming divergent exit beams), depending on the depth plane associated with the waveguide 432b. It will be appreciated that substantially parallel exit beams may be indicative of a waveguide with light extracting optical elements that outcouple light to form images that appear to be set on a depth plane at a large distance (e.g., optical infinity) from the eye 410. Other waveguides or other sets of light extracting optical elements may output an exit beam pattern that is more divergent, which would require the eye 410 to accommodate to a closer distance to bring it into focus on the retina and would be interpreted by the brain as light from a distance closer to the eye 410 than optical infinity.

Figure 6:
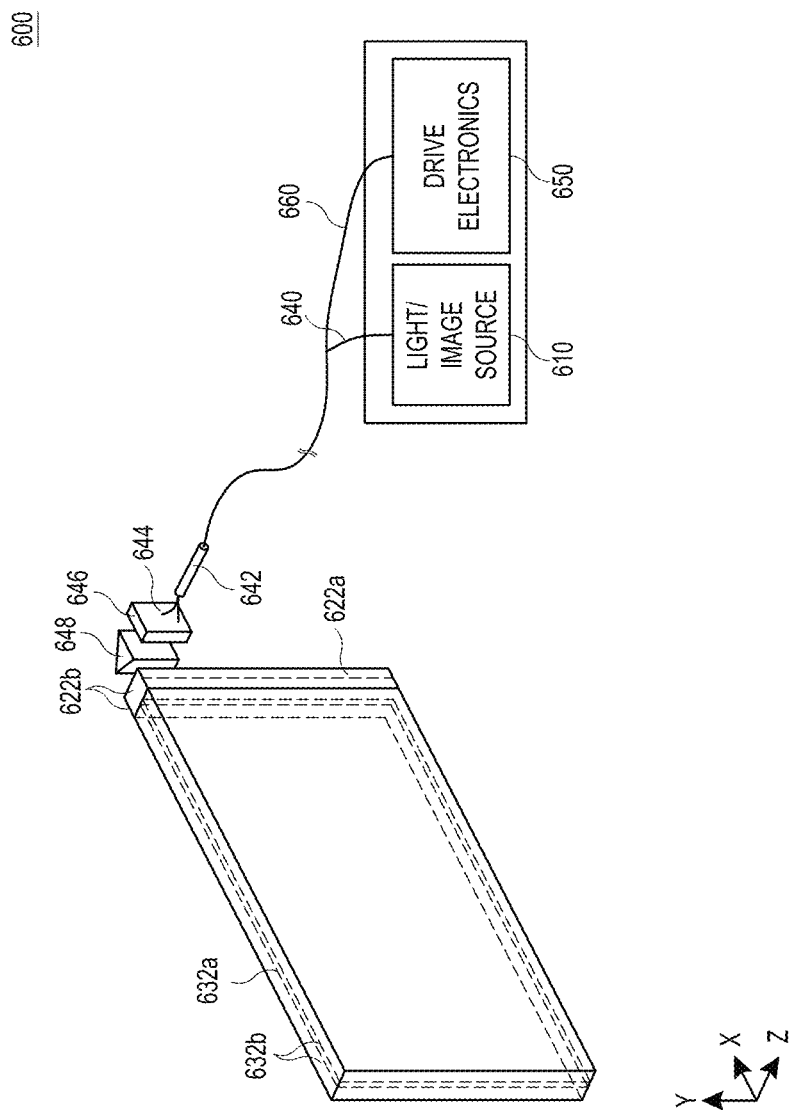
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field. The optical system can include a waveguide apparatus, an optical coupler subsystem to optically couple light to or from the waveguide apparatus, and a control subsystem. The optical system can be used to generate a multi-focal volumetric, image, or light field. The optical system can include one or more primary planar waveguides 632a (only one is shown in FIG. 6) and one or more DOEs 632b associated with each of at least some of the primary waveguides 632a. The planar waveguides 632b can be similar to the waveguides 432b, 434b, 436b, 438b, 440b discussed with reference to FIG. 4. The optical system may employ a distribution waveguide apparatus to relay light along a first axis (vertical or Y-axis in view of FIG. 6), and expand the light's effective exit pupil along the first axis (e.g., Y-axis). The distribution waveguide apparatus may, for example, include a distribution planar waveguide 622b and at least one DOE 622a (illustrated by double dash-dot line) associated with the distribution planar waveguide 622b. The distribution planar waveguide 622b may be similar or identical in at least some respects to the primary planar waveguide 632b, having a different orientation therefrom. Likewise, at least one DOE 622a may be similar to or identical in at least some respects to the DOE 632a. For example, the distribution planar waveguide 622b or DOE 622a may be comprised of the same materials as the primary planar waveguide 632b or DOE 632a, respectively.

Embodiments of the optical display system 600 shown in FIG. 6 can be integrated into the wearable system 200 shown in FIG. 2A.

The relayed and exit-pupil expanded light may be optically coupled from the distribution waveguide apparatus into the one or more primary planar waveguides 632b. The primary planar waveguide 632b can relay light along a second axis, preferably orthogonal to first axis (e.g., horizontal or X-axis in view of FIG. 6). Notably, the second axis can be a non-orthogonal axis to the first axis. The primary planar waveguide 632b expands the light's effective exit pupil along that second axis (e.g., X-axis). For example, the distribution planar waveguide 622b can relay and expand light along the vertical or Y-axis, and pass that light to the primary planar waveguide 632b which can relay and expand light along the horizontal or X-axis.

The optical system may include one or more sources of colored light (e.g., red, green, and blue laser light) 610 which may be optically coupled into a proximal end of a single mode optical fiber 640. A distal end of the optical fiber 640 may be threaded or received through a hollow tube 642 of piezoelectric material. The distal end protrudes from the tube 642 as fixed-free flexible cantilever 644. The piezoelectric tube 642 can be associated with four quadrant electrodes (not illustrated). The electrodes may, for example, be plated on the outside, outer surface or outer periphery or diameter of the tube 642. A core electrode (not illustrated) may also be located in a core, center, inner periphery or inner diameter of the tube 642.

Drive electronics 650, for example electrically coupled via wires 660, drive opposing pairs of electrodes to bend the piezoelectric tube 642 in two axes independently. The protruding distal tip of the optical fiber 644 has mechanical modes of resonance. The frequencies of resonance can depend upon a diameter, length, and material properties of the optical fiber 644. By vibrating the piezoelectric tube 642 near a first mode of mechanical resonance of the fiber cantilever 644, the fiber cantilever 644 can be caused to vibrate, and can sweep through large deflections.

By stimulating resonant vibration in two axes, the tip of the fiber cantilever 644 is scanned biaxially in an area filling two-dimensional (2D) scan. By modulating an intensity of light source(s) 610 in synchrony with the scan of the fiber cantilever 644, light emerging from the fiber cantilever 644 can form an image. Descriptions of such a set up are provided in U.S. Patent Publication No. 2014/0003762, which is incorporated by reference herein in its entirety.

A component of an optical coupler subsystem can collimate the light emerging from the scanning fiber cantilever 644. The collimated light can be reflected by mirrored surface 648 into the narrow distribution planar waveguide 622b which contains the at least one diffractive optical element (DOE) 622a. The collimated light can propagate vertically (relative to the view of FIG. 6) along the distribution planar waveguide 622b by TIR, and in doing so repeatedly intersects with the DOE 622a. The DOE 622a preferably has a low diffraction efficiency. This can cause a fraction (e.g., 10%) of the light to be diffracted toward an edge of the larger primary planar waveguide 632b at each point of intersection with the DOE 622a, and a fraction of the light to continue on its original trajectory down the length of the distribution planar waveguide 622b via TIR.

At each point of intersection with the DOE 622a, additional light can be diffracted toward the entrance of the primary waveguide 632b. By dividing the incoming light into multiple outcoupled sets, the exit pupil of the light can be expanded vertically by the DOE 622a in the distribution planar waveguide 622b. This vertically expanded light coupled out of distribution planar waveguide 622b can enter the edge of the primary planar waveguide 632b.

Light entering primary waveguide 632b can propagate horizontally (relative to the view of FIG. 6) along the primary waveguide 632b via TIR. As the light intersects with DOE 632a at multiple points as it propagates horizontally along at least a portion of the length of the primary waveguide 632b via TIR. The DOE 632a may advantageously be designed or configured to have a phase profile that is a summation of a linear diffraction pattern and a radially symmetric diffractive pattern, to produce both deflection and focusing of the light. The DOE 632a may advantageously have a low diffraction efficiency (e.g., 10%), so that only a portion of the light of the beam is deflected toward the eye of the view with each intersection of the DOE 632a while the rest of the light continues to propagate through the primary waveguide 632b via TIR.

At each point of intersection between the propagating light and the DOE 632a, a fraction of the light is diffracted toward the adjacent face of the primary waveguide 632b allowing the light to escape the TIR, and emerge from the face of the primary waveguide 632b. In some embodiments, the radially symmetric diffraction pattern of the DOE 632a additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 632b by a multiplicity of DOEs 632a at different angles, focus levels, or yielding different fill patterns at the exit pupil. Different fill patterns at the exit pupil can be beneficially used to create a light field display with multiple depth planes. Each layer in the waveguide assembly or a set of layers (e.g., 3 layers) in the stack may be employed to generate a respective color (e.g., red, blue, green). Thus, for example, a first set of three adjacent layers may be employed to respectively produce red, blue and green light at a first focal depth. A second set of three adjacent layers may be employed to respectively produce red, blue and green light at a second focal depth. Multiple sets may be employed to generate a full 3D or 4D color image light field with various focal depths.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Wearable Systems, Environments, and Interfaces

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 7:
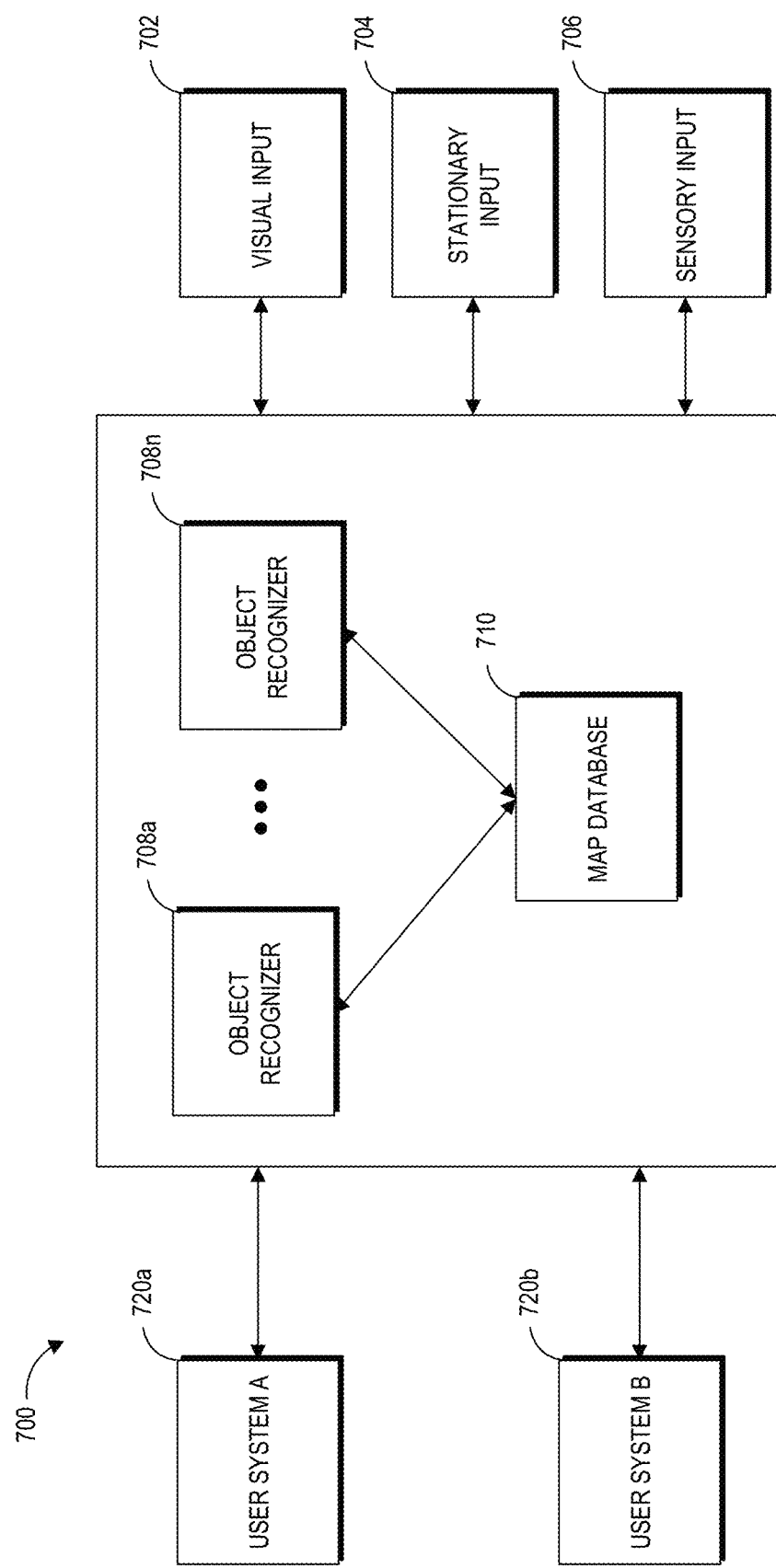
FIG. 7 is a block diagram of an example of a wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

One or more object recognizers 708 can also implement various text recognition algorithms to identify and extract the text from the images. Some example text recognition algorithms include: optical character recognition (OCR) algorithms, deep learning algorithms (such as deep neural networks), pattern matching algorithms, algorithms for pre-processing, etc.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
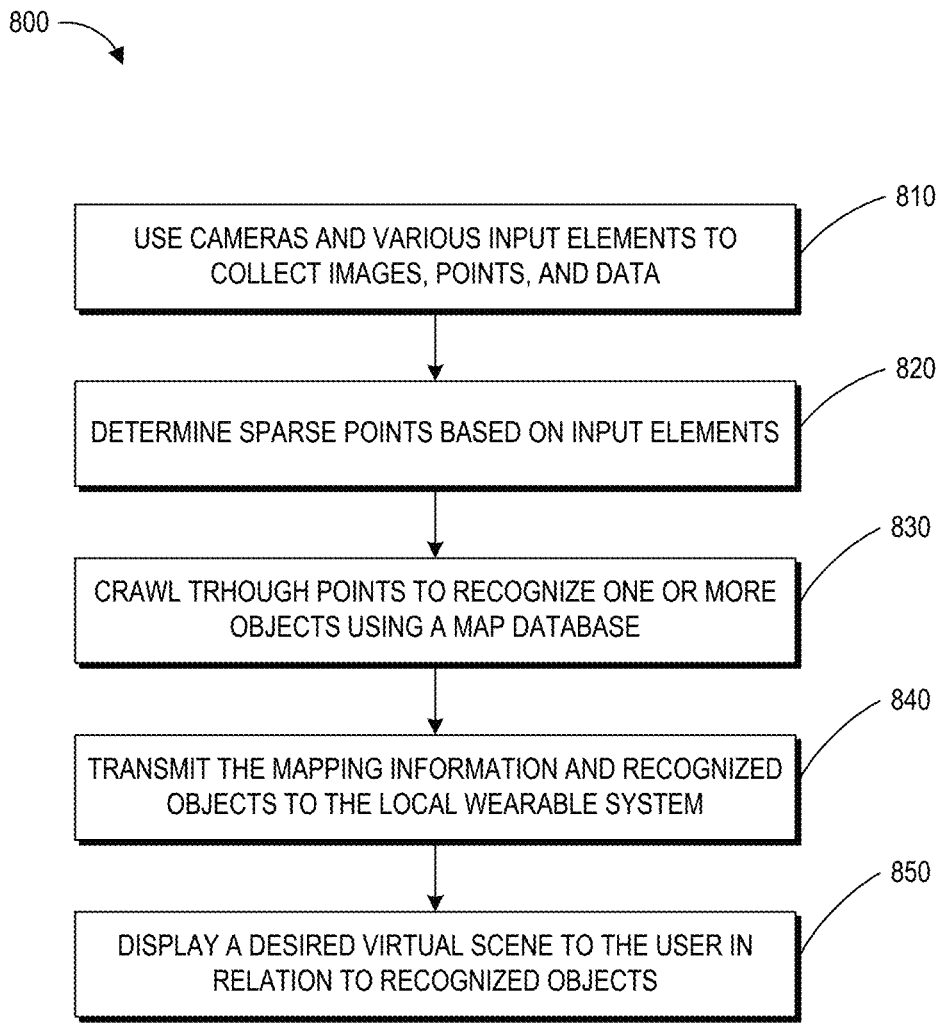
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Figure 9:
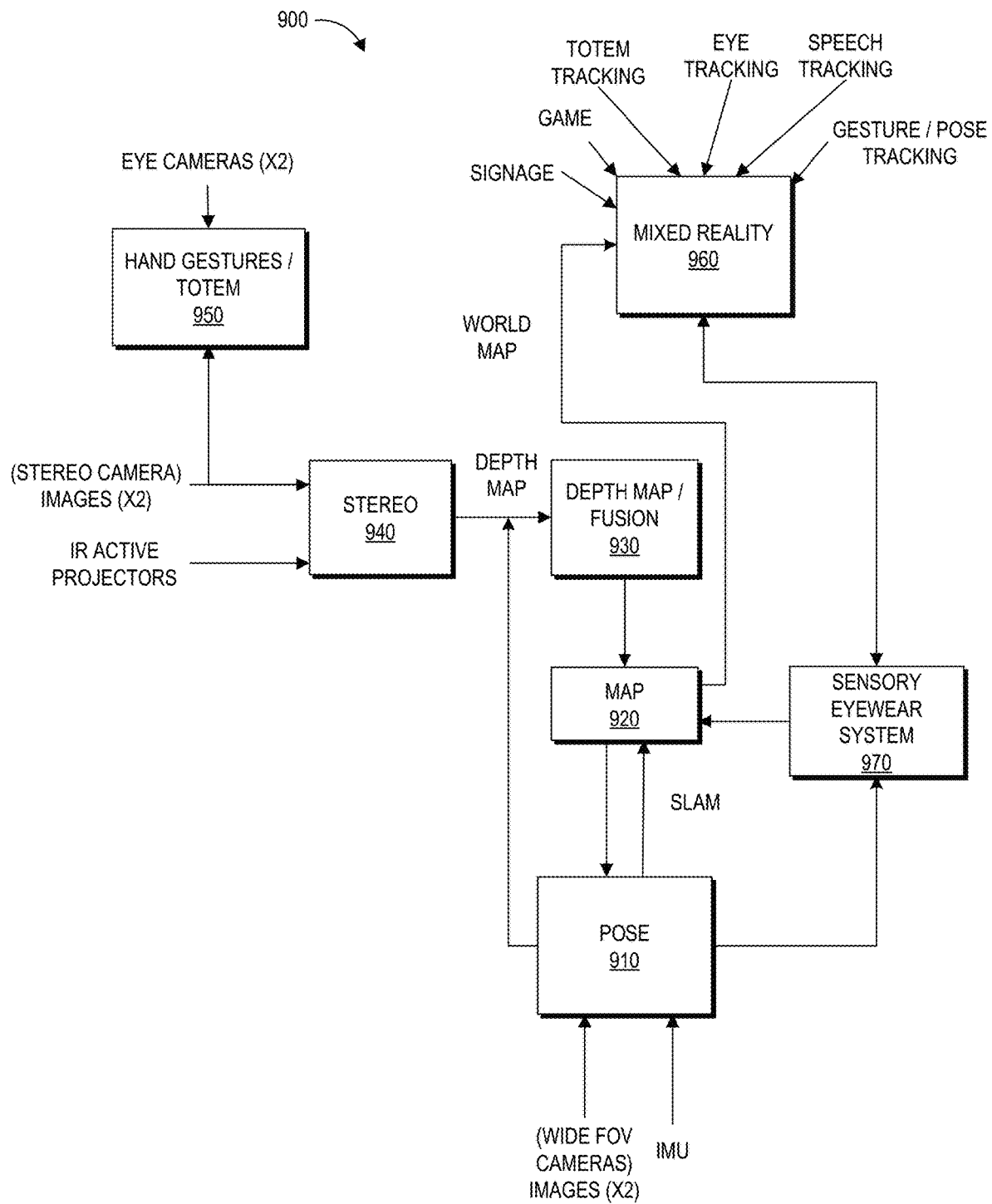
FIG. 9 is a block diagram of another example of a wearable system that includes a sensory eyewear system.

FIG. 9 is a block diagram of another example of a wearable system. In this example, the wearable system 900 comprises a map 920, which may include the map database 710 containing map data for the world. The map may partly reside locally on the wearable system, and may partly reside at networked storage locations accessible by wired or wireless network (e.g., in a cloud system). A pose process 910 may be executed on the wearable computing architecture (e.g., processing module 260 or controller 460) and utilize data from the map 920 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 940, wherein depth information is determined using a technique such as triangulation or time-of-flight sensing. Image information and active patterns (such as infrared patterns created using active projectors), images acquired from image cameras, or hand gestures/totem 950 may serve as input to the Stereo process 940. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 940 may be combined in the fusion process 930. Pose 910 may be an input to this fusion process 930 as well, and the output of fusion 930 becomes an input to populating the map process 920. Sub-surfaces may connect with each other, such as in topographical mapping, to form larger surfaces, and the map becomes a large hybrid of points and surfaces.

To resolve various aspects in a mixed reality process 960, various inputs may be utilized. For example, in the embodiment depicted in FIG. 9, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects and the world map can be another valuable input to mixed reality. Pose relative to the world becomes an input as well and plays a key role to almost any interactive system.

Controls or inputs from the user are another input to the wearable system 900. As described herein, user inputs can include visual input, gestures, totems, audio input, sensory input, etc. In order to move around or play a game, for example, the user may need to instruct the wearable system 900 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 900 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 900 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands. Hand gesture tracking can include tracking gestures made by others in the user's environment, such as others who make the gestures to communicate with sign language (see, e.g., FIG. 13A).

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input can be used alone or in combination with other inputs (e.g., totem tracking, eye tracking, gesture tracking, etc.). Speech tracking may include speech recognition, voice recognition, alone or in combination. The system 900 can include an audio sensor (e.g., a microphone) that receives an audio stream from the environment. The system 900 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)-based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

Another input to the mixed reality process 960 can include tracking signage in the environment. Signage can include commercial or public display signs. As described with reference to FIGS. 16A-19, the system can recognize signage, identify text in the signage, adjust characteristics of the text (e.g., increasing a font size of the text to improve readability), modify the content of the text (e.g., translate the text from a foreign language to a language understood by the user), etc.

The local data & processing module 260 or the remote processing module 270 can also apply voice recognition algorithms which can identify the identity of the speaker, such as whether the speaker is the user 210 of the wearable system 900 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

The system 900 can also include a sensory eyewear system 970 for facilitating a user's interactions with other people or the environment. An implementation of a sensory eyewear system 970 can use these user controls or inputs via a UI. UI elements (e.g., controls, popup windows, bubbles, data entry fields, etc.) can be used, for example, to dismiss a display of information, e.g., converted text, graphics, or auxiliary information, or to request a display of auxiliary information. The UI can permit the user to input a list of one or more languages the user understands so that the sensory eyewear system 970 knows which language to use in translating signs made by a conversation partner in a sign language. Examples of such implementations and these uses are described further below.

The sensory eyewear system 970 can also comprise text recognition, modification, and rendering features. Such features may in combination with various other components of the wearable system to enhance a user's interactions with the environment. For example, an HMD can includes one or more light sources 11 that are configured to project an image onto the display based on text that is identified from an image of the user's physical environment (e.g., such that the projected image occludes the original text from the physical environment). An optically transmissive eyepiece 106 can be configured to transmit light from the one or more light sources 11 to the user 210 as an image. The image may appear as if it is at a particular depth, which may be just one of many possible depths at which the HMD system 200 could have displayed the image. The HMD system 100 may be able to project images to appear at a number of different depths, which may appear as if on different depth planes 306 (see FIG. 3). In some embodiments where the eyepiece 106 is optically transmissive, the eyepiece 106 can allow light from the environment to enter a user's eye. Thus, in such embodiments, a user 210 may see portions of an image from the environment together with projected images from the one or more light sources 11.

With regard to the camera systems, the example wearable system 900 shown in FIG. 9 can include three pairs of cameras: a relative wide FOV or passive SLAM pair of cameras arranged to the sides of the user's face, a different pair of cameras oriented in front of the user to handle the stereo imaging process 940 and also to capture hand gestures and totem/object tracking in front of the user's face. The FOV cameras or the pair of cameras for stereo process 940 may also be referred to as cameras 16. The FOV cameras and the pair of cameras for the stereo process 940 may be a part of the outward-facing imaging system 464 (shown in FIG. 4). The wearable system 900 can include eye tracking cameras (which also were shown as eye cameras 24 and which may be a part of an inward-facing imaging system 462 shown in FIG. 4) oriented toward the eyes of the user in order to triangulate eye vectors and other information. The wearable system 900 may also comprise one or more textured light projectors (such as infrared (IR) projectors) to inject texture into a scene.

Figure 10:
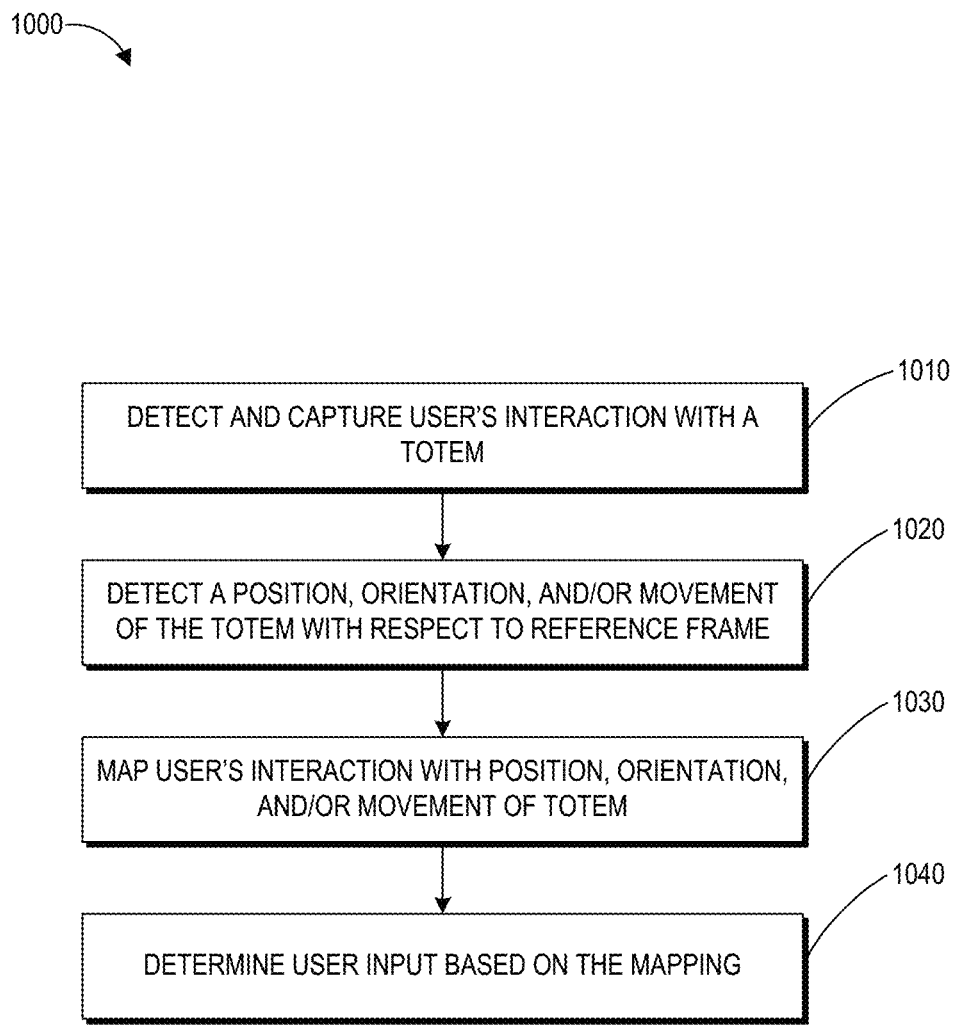
FIG. 10 is a process flow diagram of an example of a method for determining user input to a wearable system.

FIG. 10 is a process flow diagram of an example of a method 1000 for determining user input to a wearable system. In this example, the user may interact with a totem. The user may have multiple totems. For example, the user may have designated one totem for a social media application, another totem for playing games, etc. At block 1010, the wearable system may detect a motion of a totem. The movement of the totem may be recognized through the outward-facing imaging system or may be detected through sensors (e.g., haptic glove, image sensors, hand tracking devices, eye-tracking cameras, head pose sensors, etc.).

Based at least partly on the detected gesture, eye pose, head pose, or input through the totem, the wearable system detects a position, orientation, or movement of the totem (or the user's eyes or head or gestures) with respect to a reference frame, at block 1020. The reference frame may be a set of map points based on which the wearable system translates the movement of the totem (or the user) to an action or command. At block 1030, the user's interaction with the totem is mapped. Based on the mapping of the user interaction with respect to the reference frame 1020, the system determines the user input at block 1040.

For example, the user may move a totem or physical object back and forth to signify turning a virtual page and moving on to a next page or moving from one user interface (UI) display screen to another UI screen. As another example, the user may move their head or eyes to look at different real or virtual objects in the user's FOR. If the user's gaze at a particular real or virtual object is longer than a threshold time, the real or virtual object may be selected as the user input. In some implementations, the vergence of the user's eyes can be tracked and an accommodation/vergence model can be used to determine the accommodation state of the user's eyes, which provides information on a depth plane on which the user is focusing. In some implementations, the wearable system can use ray casting techniques to determine which real or virtual objects are along the direction of the user's head pose or eye pose. In various implementations, the ray casting techniques can include casting thin, pencil rays with substantially little transverse width or casting rays with substantial transverse width (e.g., cones or frustums).

The user interface may be projected by the display system as described herein (such as the display 220 in FIG. 2A). It may also be displayed using a variety of other techniques such as one or more projectors. The projectors may project images onto a physical object such as a canvas or a globe. Interactions with user interface may be tracked using one or more cameras external to the system or part of the system (such as, e.g., using the inward-facing imaging system 462 or the outward-facing imaging system 464).

Figure 11:
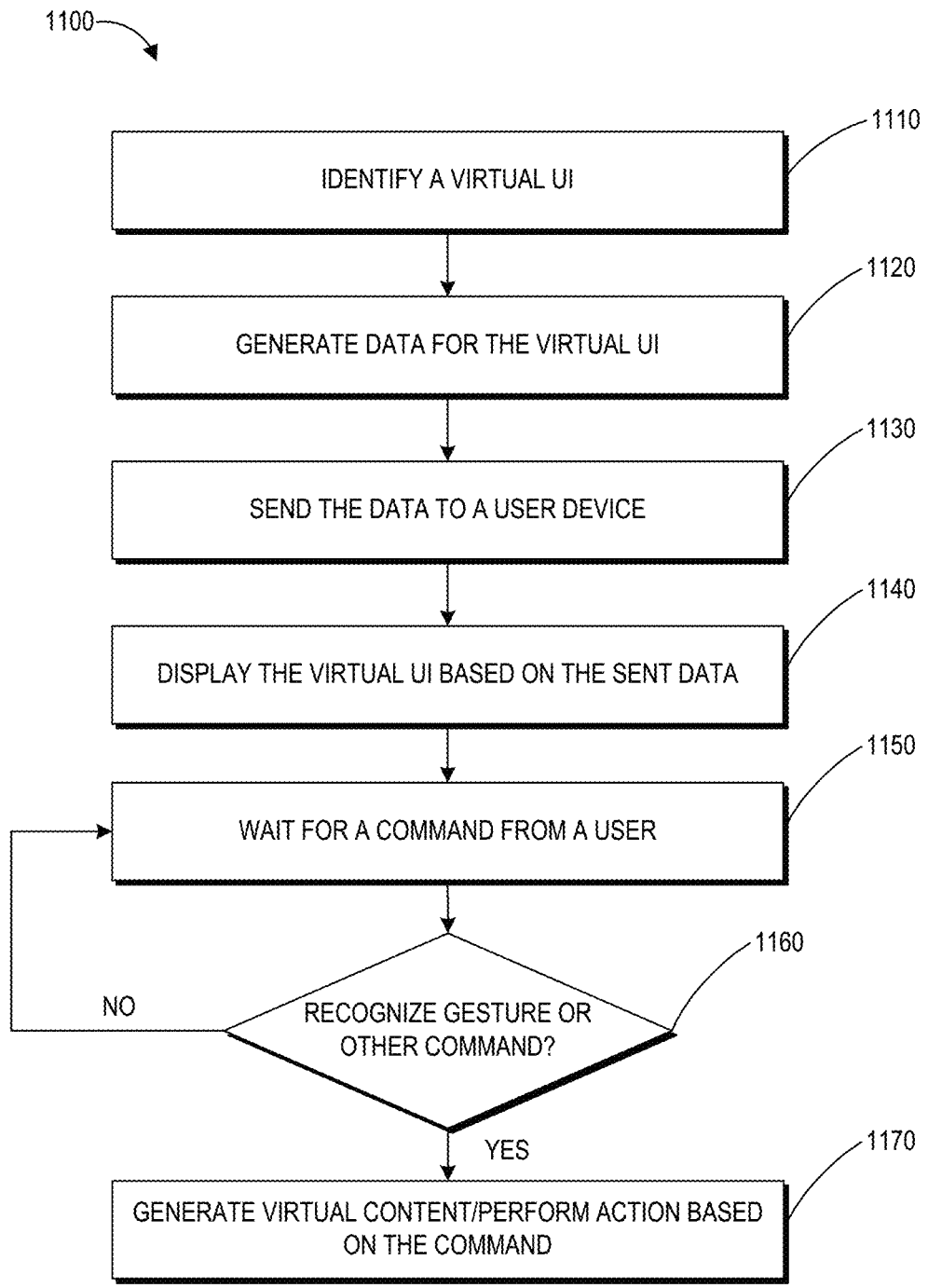
FIG. 11 is a process flow diagram of an example of a method for interacting with a virtual user interface.

FIG. 11 is a process flow diagram of an example of a method 1100 for interacting with a virtual user interface. The method 1100 may be performed by the wearable system described herein. Embodiments of the method 1100 can be used by the wearable system to detect persons or documents in the FOV of the wearable system.

At block 1110, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 1120, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 1130, the wearable system may send the data to the display from the cloud or the data may be sent from a local database to the display components. At block 1140, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 1150. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 1160), virtual content associated with the command may be displayed to the user (block 1170).

Additional examples of wearable systems, UIs, and user experiences (UX) are described in U.S. Patent Publication No. 2015/0016777, which is incorporated by reference herein in its entirety.

Example Communications Among Multiple Wearable Systems

Figure 12:
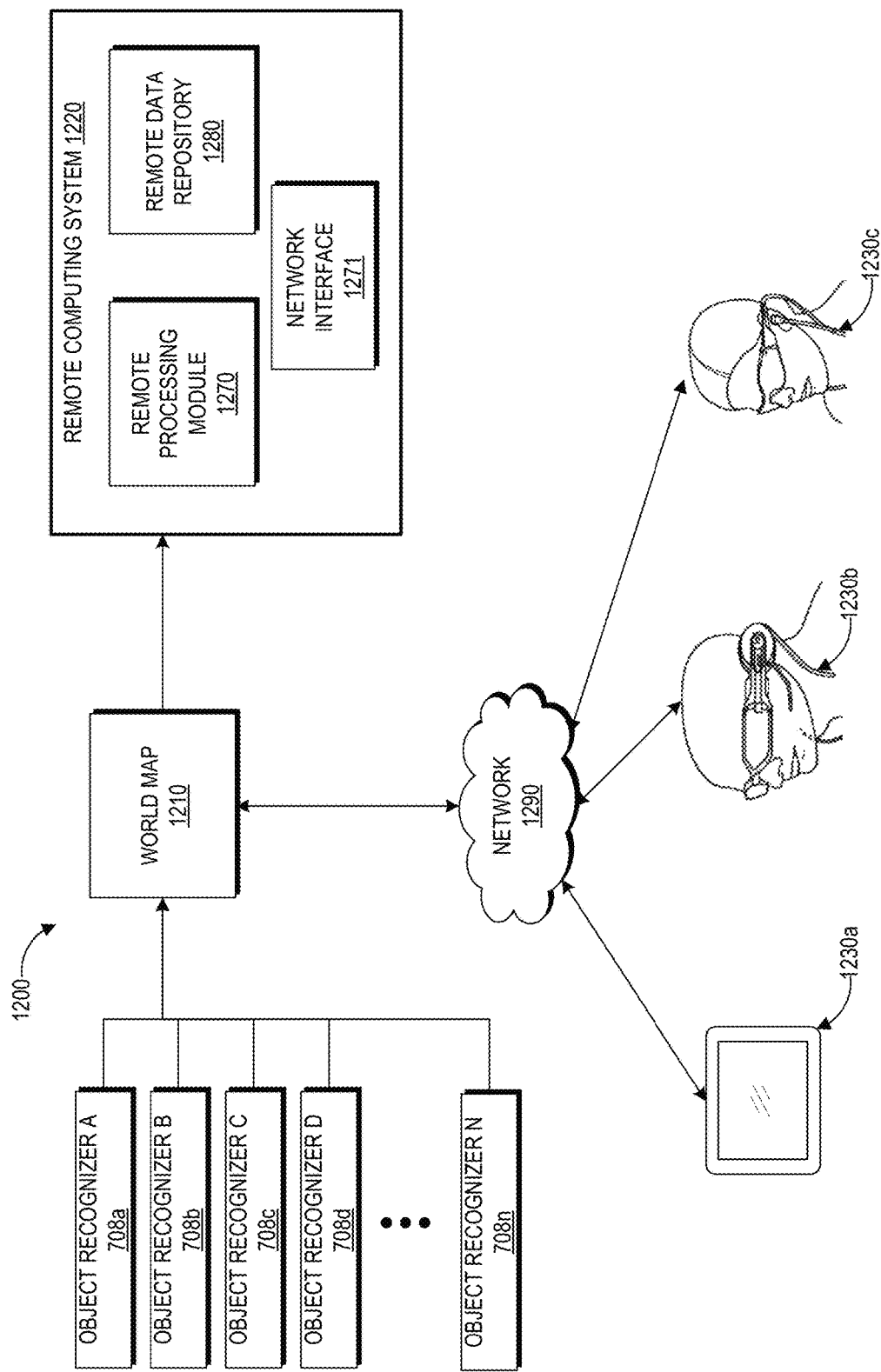
FIG. 12 schematically illustrates an overall system view depicting multiple wearable systems interacting with each other.

FIG. 12 schematically illustrates an overall system view depicting multiple user devices interacting with each other. The computing environment 1200 includes user devices 1230*a*, 1230*b*, 1230*c*. The user devices 1230*a*, 1230*b*, and 1230*c* can communicate with each other through a network

1290. The user devices 1230a-1230c can each include a network interface to communicate via the network 1290 with a remote computing system 1220 (which may also include a network interface 1271). The network 1290 may be a LAN, WAN, peer-to-peer network, radio, Bluetooth, or any other network. The computing environment 1200 can also include one or more remote computing systems 1220. The remote computing system 1220 may include server computer systems that are clustered and located at different geographic locations. The user devices 1230a, 1230b, and 1230c may communicate with the remote computing system 1220 via the network 1290.

The remote computing system 1220 may include a remote data repository 1280 which can maintain information about a specific user's physical or virtual worlds. Data storage 1280 can contain information useful to sensory eyewear such as a sign language dictionary, auxiliary information source, etc. The remote data repository may be an embodiment of the remote data repository 280 shown in FIG. 2A. The remote computing system 1220 may also include a remote processing module 1270. The remote processing module 1270 may be an embodiment of the remote processing module 270 shown in FIG. 2A. In some implementations, the remote computing system 1220 may be a third party system which is unaffiliated with the wearable system 200.

The remote processing module 1270 may include one or more processors which can communicate with the user devices (1230a, 1230b, 1230c) and the remote data repository 1280. The processors can process information obtained from user devices and other sources. In some implementations, at least a portion of the processing or storage can be provided by the local processing and data module 260 (as shown in FIG. 2A). The remote computing system 1220 may enable a given user to share information about the specific user's own physical or virtual worlds with another user.

The user device may be a wearable device (such as an HMD or an ARD), a computer, a mobile device, or any other devices alone or in combination. For example, the user devices 1230b and 1230c may be an embodiment of the wearable system 200 shown in FIG. 2A (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices or multiple server computer systems may participate in the construction or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 7 and 9, information acquired by the user devices may be used to construct a world map 1210. The world map 1210 may include at least a portion of the map 920 described in FIG. 9. Various object recognizers (e.g. 708a, 708b, 708c . . . 708n) may be used to recognize objects and tag images, as well as to attach semantic information to the objects. These object recognizers are also described in FIG. 7.

The remote data repository 1280 can be used to store data and to facilitate the construction of the world map 1210. The user device can constantly update information about the user's environment and receive information about the world map 1210. The world map 1210 may be created by the user or by someone else. As discussed herein, user devices (e.g. 1230a, 1230b, 1230c) and remote computing system 1220, alone or in combination, may construct or update the world map 1210. For example, a user device may be in communication with the remote processing module 1270 and the remote data repository 1280. The user device may acquire or process information about the user and the user's environment. The remote processing module 1270 may be in communication with the remote data repository 1280 and user devices (e.g. 1230a, 1230b, 1230c) to process information about the user and the user's environment. The remote computing system 1220 can modify the information acquired by the user devices (e.g. 1230a, 1230b, 1230c), such as, e.g. selectively cropping a user's image, modifying the user's background, adding virtual objects to the user's environment, annotating a user's speech with auxiliary information, etc. The remote computing system 1220 can send the processed information to the same or different user devices.

Various functionalities of embodiments of the sensory eyewear system are further described below.

Example Sensory Eyewear for Facilitating User Interactions

The wearable system 200 can implement a sensory eyewear system 970 for facilitating user's interactions with the other people or with the environment. As one example of interacting with other people, the wearable system 200 can interpret sign language by, for example, detecting gestures that may constitute sign language, translating the sign language to another language (e.g., another sign language or a spoken language), and presenting the translated information to a user of a wearable device. As another example, the sensory eyewear system 970 can translate speech into sign language and present the sign language to the user.

The wearable system 970 can also facilitate user's interaction with the environment by recognizing objects in the environment, modifying the characteristics of the objects (in a virtual environment), and presenting modified objects as virtual objects to the user. For example, the wearable system 200 can recognize signs (e.g., traffic signs, signs for store front, etc.) in a user's environment based on images acquired by the outward-facing imaging system 464, modify the characteristics of the sign in the user's environment, and present the modified sign to the user. The modified sign may be overlaid onto the user's 3D environment such that the original sign maybe be occluded.

Example Sensory Eyewear System as a Tool for Interpersonal Communications

In some situations, one or more people in a conversation may use hand or body gestures (such as, e.g., a sign language) to express themselves. The conversation may occur during a telepresence session or when the people are in the physical vicinity of each other. The wearable system 200 can interpret sign language of a signer for a user of the wearable system 200 (also referred to as an observer) when the user is communicating with the signer. The wearable system 200 can also translate a verbal or sign language based speech into a graphics (such as, e.g., images of hand gestures) and present the graphics to a signer such that the signer can understand the speech of the observer. For example, an observer wearing a head-mounted display may have a reduced field of view, and thus the observer may not be able to observe the complete gestures made by a signer using a sign language. The wearable system 200 can capture the gestures by the signer using the outward-facing imaging system 464 (because it may have a camera that has a wider field of view that what a user can perceive through the head-mounted display). The wearable system 200 can show the captured gestures as virtual graphics to the observer or show text converted from the captured gestures to facilitate the observer's understanding of the signer's speech. Further, the wearable system 200 can be configured to translate one sign language into another sign language. For example, one person in the conversation may use American Sign Language and the other person may use Dogon Sign Language. The wearable system 200 can translate the American Sign Language to the Dogon Sign Language for the person using the Dogon Sign Language and translate the Dogon Sign Language to American Sign Language for the person who uses the American Sign Language.

Example Sign Language Capturing

The wearable system can use various techniques to capture an original speech and translate the original speech to a target speech. The speech may be in the form of hand or body gestures, or audible sounds. As described herein, the original speech may be in a sign language and the target speech may be another sign language or a spoken language. Alternatively, the original speech may be a spoken language while the target speech is a sign language. The wearable system 200 can capture the original speech using the outward-facing imaging system 464, the audio sensor 232, or by communicating with another computing device via the network 1290 depending on the context of the speech (e.g., whether the speech is in-person or via telecommunications).

As an example of capturing the original speech during an in-person communication, where the signer of the detected sign language is in the physical vicinity of a sensory eyewear system, the outward-facing imaging system 464 can capture images of the user's environment. The wearable system 200 can detect, from the image information, gestures (e.g., hand/body gestures or lip movements) which may constitute a sign language. The wearable system 200 can recognize gestures using algorithms such as, e.g., a deep neural network, a hidden Markov model, dynamic programming matching, etc. to recognize signs represented by the gestures made by the speaker. As described with reference to FIG. 7, the gesture recognition may be performed by one or more object recognizers 708.

As an example of capturing the original speech in the context of remote communications, the wearable system 200 can capture and recognize the presence of the original speech by analyzing data received from a remote computing device (e.g., another wearable device) or by analyzing data captured by the outward-facing imaging system 464 (e.g., where the original speech is present on a television). In one example, the signer and the observer may be conversing through an Internet video chat session. The signer and the observer can each wear their respective HMDs. The HMDs can communicate with each other via the network 1290 (shown in FIG. 12). Where the signer is in front of a reflected surface (e.g., a mirror), the HMD of the signer can capture the gestures of the signer by acquiring reflected images of the signer via the outward-facing imaging system 464. The reflected images of the signer may be sent to the HMD of the observer or the remote computing system 1220 for recognition and interpretation of sign languages. As another example, the signer may be a person in a video program, such as one presented on television or Internet programming, etc. Where the signer's gestures can be visually observed at the observer's location, a wearable system 464 can capture sign language gestures in the same way as it does in the in-person communication context (e.g., via the audio sensor 232 or the outward-facing imaging system 464).

In addition to or in alternative to displaying a text or graphical translation of the sign language gestured by another person to a user of the wearable system 200, the user of the wearable system 200 may also communicate with sign language. In this case, the wearable system can capture the user's own sign language gestures (from a first-person point of view) by the outward-facing imaging system 464. The wearable system can convert the sign language to a target speech which may be expressed in the format of text, audio, images, etc. The wearable system 200 can transmit the result to another wearable system for presentation to another user. As described herein, the conversion from the original speech to the target speech can be performed by the wearable system of the user, another user's wearable system, or the remote computing system 1220, alone or in combination. For example, the user's wearable system can capture the user's hand gestures and transmit the captured video or image (containing sign language gestures) to another user's wearable system or the remote computing system 120 which can extract sign language from the video or image and convert the sign language to audio-visual content for a speaking language or another sign language. The audio-visual content can include text, graphics, video, animations, sound, etc.

Signer Gesture Rejection and Source Localization

The wearable system can identify a source of gesture or sign language using various sensors, such as, e.g., the audio sensor 232, the outward-facing imaging system 464, stationary input 704, or other sensors in the user's environment. As one example, the wearable system may detect a series of hand gestures as well as lip movements from data acquired by the outward-facing imaging system 464. The wearable system may find that the hand gestures are associated with a signer because the signer also has corresponding lip movements. As another example, the wearable system can measure the distance between the user and the gestures to determine the source of gestures. For example, the wearable system can determine that a series of gestures comes from the user because the hands appear relatively big in the images acquired by the outward-facing imaging system 464. But if the hands appear to be relatively small, the wearable system may find the gestures are from a person other than the user. As yet another example, the wearable system may find that the gestures come from an audio-visual content (e.g., in a television) by recognizing the object that is playing the audio-visual content (e.g., by recognizing the television using the object recognizers 708).

Based on the source of the gestures, the wearable system 200 can be configured not to process the gestures from certain people. For example, the wearable system may capture gestures from multiple people in the user's environment but the wearable system can be configured to not process the sign language from a person outside the center of the user's FOV for sign language recognition. As another example, the wearable system may be configured not to process the user's own sign language.

In some embodiments, the wearable system can configure the sensors to detect the user's own sign language, such as, e.g., by positioning the cameras in the outward-facing imaging system 464 at an angle such that the user does not have to raise his hand in order for the outward-facing imaging system 464 to capture the user's hand gestures. The sensors can also be configured not to detect the user's own sign language. For example, the non-detection can be achieved through not capturing images in the direction of the user's own hands (which is typically below the user's FOV), or filtering out (e.g., by cropping) images in such a direction. Thus the system can distinguish the user's own sign language from those of others.

Example Conversion from Sign Language to Text

The wearable system 200 can convert the captured sign language to text which can be presented to a user or translated into another language. Conversion of sign language to text can be performed using algorithms such as deep learning (which may utilize a deep neural network), hidden Markov model, dynamic programming matching, etc. For example, the deep learning method (a convolutional neural network in some cases) can be trained on images or videos containing known signs (supervised learning) so as to determine features representative of the signs and to build a classification model based on the learned features. Such a trained deep learning method can then be applied by the local processing and data module 260 or the remote processing module and data repository 270, 280 of the wearable system 200 to images of a signer detected by the outward-facing imaging subsystem.

The text conversion functionality can be implemented by the local processing & data module 260, the remote processing module 270, the remote data repository 280, or the remote computing system 1220, alone or in combination. For example, the wearable system 200 can include sign-language-to-text functionality implemented on the HMD. As one example, the wearable system can store a sign language dictionary in the local data module 260 or the remote data repository 280. The wearable system can accordingly access the sign language dictionary to translate a detected gesture into text. As another example, the wearable system 200 can access sign-language-to-text functionality implemented by the remote computing system 1220. The wearable system 200 may utilize wireless connections to commercial sign-language-to-text services or data repositories (e.g., via an application programming interface (API)). For example, the wearable system 200 can provide captured gesture to the remote computing system 1220 and receive the corresponding text from the remote computing system 1220.

Whether the conversion is performed locally or remotely, other processing steps such as displaying the converted text and retrieving auxiliary information (which are further described below) may be done locally or remotely independent of where text conversion is performed. For example, if sign-language-to-text conversion is done remotely and the converted text is to be displayed locally (e.g., the user of the system is the observer), a captured video stream can be sent to a remote processing module 270 or a remote server performing the conversion via a network; converted text strings are returned to a local component of the system (e.g., local processing and data module 260) for display. As another example, if sign-language-to-text conversion and auxiliary information retrieval are done remotely, a captured video stream can be sent to a remote processing module 270 or to a remote server via a network and retrieved auxiliary information can be returned to a local component of the system. Other combinations of local/remote processing are also viable.

Although these examples are described with reference to converting a sign into text, the signs may be converted into various other formats such as, e.g., graphics, animations, audio, or other types of audio-visual content. Further, the translation of the signs does not require the signs to be first translated into text.

Examples of Converting One Sign Language to Another Sign Language

As noted herein, there are hundreds of sign languages throughout the world. Accordingly, the wearable systems described herein can be also used when both conversation partners are signing, but in different sign language systems. Advantageously, each such signer can use his or her own wearable system to translate the signs of the other signer into the user's own sign language system. The wearable system may translate the signs into text understood by the user or into a graphic representation of the user's own sign language.

The wearable system 200 may be configured to recognize a particular sign language, e.g., American Sign Language (ASL). The wearable system 200 may also be configured to recognize a plurality of sign languages, e.g., ASL, British Sign Language, Chinese Sign Language, Dogon Sign Language, etc. In some implementations, the wearable system 200 supports reconfiguration of sign language recognition, e.g., based on location information of the sensory eyewear system. The wearable system may recognize a foreign sign language through a means similar to how the system recognizes the user's own or preferred sign language, e.g., utilizing object recognizers 708 alone or in combination with a sign language dictionary to recognize gestures perceived by the outward-facing imaging system 464. The wearable system can convert a sign language the user perceives into the user's dominant sign language. The user's dominant sign language can be the user's first sign language or the user's preferred sign language in a conversation. A sign language other than the user's dominant sign language can be considered a foreign sign language. The wearable system can allow the user to select converted text of the foreign sign language. For example, a user can select a foreign sign language and the wearable system can present the meaning of gestures in the foreign sign language as text to the user of the wearable system.

The wearable system may recognize a foreign sign language through the aid of spoken language in the environment or location information. For example, the wearable system detects Italian is spoken in the user's environment or determine that user is in Italy based on data acquired by the GPS. Based on this information, the wearable system can automatically activate the functions for recognizing the Italian Sign Language. As another example, the wearable system may have an order of preference for sign languages that the wearable system is able to support. In this example, ASL may takes precedence over Italian sign language because the user is from the United States. However, once the wearable system detects that the user is surrounded by Italian speakers or is physically in Italy, the wearable system can change the order of preference so that the Italian sign language is now before ASL. Thus, the wearable system can translate the Italian sign language to English text or graphics associated with ASL.

A sensory eyewear system can not only help a user understand a foreign sign language, it can also help a user sign the foreign sign language. For example, a wearable system can be configured to translate a user's own language into a foreign sign language. The system can display the foreign sign language gestures (e.g., the translated sign language) on the display. The user can see the gestures in the foreign sign language and imitate the gestures. For example, a user may be conversing with a signer who is hearing-impaired. The wearable system can capture the user's speech and display, to the user, the corresponding gestures in a sign language that signer understands. The user can accordingly make the gestures as presented by the display to communicate with the signer. In some embodiments, rather than showing the gestures to the user, the wearable system can communicate the signs corresponding to the user's speech to the signer instead such that the signer is able to understand the user's vocal speech.

A wearable system can include an audio amplifier (e.g., the speaker 240) to provide the recognized sign language in audio. For example, the wearable system can convert a sign language by a signer into an audio stream for playback to the user of the wearable system 200.

Examples of Determining Auxiliary Information Associated with the Sign Language

It is not uncommon for people to not know or understand words or phrases in a conversation, including a conversation involving a sign language. The wearable system can display auxiliary information associated with part of the displayed text to enhance a user's understanding. The auxiliary information can include information, such as definition, translation, explanation, etc., which augments and adds to the contexts of the definition. Auxiliary information may present in various forms, such as, e.g., text, image, graphics, animations, or other audio or visual information. The system can present auxiliary information visually, e.g., via the display 220 in FIG. 2A. The system can present auxiliary information in audio, e.g., via an audio amplifier 240 in FIG. 2A, to a user who is not hearing-challenged. By providing a definition, translation, explanation, or other information for such words or phrases, the wearable system advantageously can assist the user in better understanding sign language that the user observes.

The auxiliary information may be determined based on contextual information of the user's environment, the context of the speech, etc. As an example, the wearable system can utilize, at least in part, user behavior in determining whether to display auxiliary information associated with a conversation partner's signs. For example, a user may temporarily stare in a certain direction (e.g., toward the signer or the signer's hands). The wearable system can detect the user's direction of gaze (e.g., using the inward-facing imaging system 462), and, in response, can retrieve and display auxiliary information associated with the conversation partner's signs.

The wearable system may comprise a data repository (e.g., a database) of auxiliary information. A wearable system can retrieve auxiliary information associated with displayed text by accessing a data repository. Such a database of information may be stored locally to a wearable device, e.g., in the data module 260 in FIG. 2A, or stored remotely, e.g., in the remote data repository 270. The wearable system can utilize publicly accessible information, e.g., information on the Internet, to determine auxiliary information. For example, the wearable system can access a network to send a query regarding a word/phrase in a conversation to a resource on the Internet, such as a dictionary, an encyclopedia, or other similar resource. Such resources may be general (e.g., a general purpose encyclopedia such as Wikipedia) or specialized (e.g., an index of drugs such as one on rxlist.com or a mineralogy database (e.g., webmineral.com)).

Example Display, Dismissal, and Recall of Converted Signs or Auxiliary Information The wearable system can present the converted signs (e.g., in a text or graphical format) alone or in combination with the auxiliary information to a user of the wearable system 200. For example, the wearable system 200 can be configured to display auxiliary information together with converted signs of the sign language, to display converted signs or auxiliary information individually (e.g., displaying only auxiliary information for the duration when auxiliary information is displayed), or to switch between the two display modes. The converted signs alone or in combination with the auxiliary information may sometimes be referred to as the displayed item.

The converted text or auxiliary information may be presented in a variety of ways. In one example, the wearable system 200 can place converted text or auxiliary information in text bubbles, e.g., text localized geometrically near the signer, such as illustrated in graphic 1355 in FIG. 13. As another example, the wearable system 200 can be configured to display a rolling transcript of detected sign language. In this configuration, words or even sentences that were missed can be quickly reread in case, for example, a user is momentarily distracted. A converted text transcript of a signer may be displayed as a rolling text similar to presentation of end credit in a movie.

A system displaying a transcript of converted text can highlight a word or phrase for which auxiliary information is requested in some way, e.g., underlined, colorized, in bold text, etc. Such highlights can be displayed before the auxiliary information is retrieved or displayed. Some embodiments configured in this display mode can permit the user to confirm or cancel the request of the highlighted text. Alternatively or additionally, such highlights can be displayed together with the auxiliary information. This display mode can make clear to the user the text to which the auxiliary information is associated. The system can permit a user to select, through a UI interaction, current or past converted text and bring up, or bring back, associated auxiliary information as further described below.

The wearable system 200 may place converted text or auxiliary information (e.g., in text bubbles or as a rolling transcript) so as to minimize a user's eye movement in order to access the information via a UI interaction. In this way, the UI is simplified and the user does not need to take his or her attention far from the signer. The converted text or auxiliary information may be so placed as to make the reading action minimally visible to a conversation partner and, in so doing, provide less distraction and better communication while not revealing the user's access to converted text or auxiliary information. For example, an implementation capable of determining the location of a signer may place converted text or auxiliary information next to the signer. Images from the systems outward-facing imaging system 464 can help with determination of appropriate placement, for example, not obscuring, e.g., the face, the gesture, etc., of the signer. The wearable system 200 can use the process flow illustrated in FIG. 8 to determine the placement of converted text or auxiliary information display. For example, the recognized object in block 850 can be the signer whose sign language is to be processed for sign language recognition.

As another example of reducing distraction experienced by the user or a conversation partner, if converted text or auxiliary information is presented in audio (e.g., where the user is not hearing-challenged and the conversation partner uses sign language), the wearable system can present the information at a volume loud enough for the user, but not for the (speech-challenged but not hearing-challenged) conversation partner, to hear, or present information when neither the user nor the conversation partner is speaking.

The displayed item may be left visible until a condition is met. For example, the displayed item may be left visible for a fixed amount of time, until the next displayed item is to be displayed, or until dismissed by a user action. The user action may be passive (e.g., eye movements as captured by the inward-facing imaging system 462). The wearable system can dismiss a displayed when it determines that the user has reviewed the displayed item. For example, if the displayed item is a text, the system can track the user's eye movements through the text (e.g., left to right or top to bottom). Once the wearable system has determined that the user has looked through the entire displayed item (or a majority of the displayed item), the wearable system can accordingly dismiss the displayed item. As another example, a displayed item may be dismissed after the user has been observed by the system to have looked away from (or to not look at) the area occupied by the displayed item. The user action may also be active (e.g., by a hand gesture as captured by the outward-facing imaging system 464, a voice input as received by the audio sensor 232, or a input from the user input device 466). For example, once the wearable system detects a swipe gesture by the user, the wearable system can automatically dismiss the displayed item.

A wearable system can be configured to support a customized set of user interface (UI) interactions for a particular user. UI interactions may take the form of a UI element analogous to a button that is actuated either with a finger, a pointer or stylus of some kind, by the gaze and subsequent fixation on the button with the eyes, or others. The button can be a real physical button (e.g., on a keyboard) or a virtual button displayed by the display 220. UI interactions may take the form of a head pose, e.g., as described above in connection with FIG. 4. An example of UI interaction detection is described above in connection with FIG. 10.

A wearable system can prompt a user to delay dismissal of a displayed item. For example, the wearable system 200 may reduce the brightness or change the color scheme of the displayed item to notify the user that the displayed item will be dismissed shortly, e.g., a few seconds. A UI interaction such as those described above may be used to postpone the dismissal. For example, a wearable system may detect that a user has looked away from a displayed item. Thus, the wearable system can increase the transparency of the displayed item to notify the user that the displayed item will be dismissed shortly. However, if the wearable system, through eye tracking, detects that the user looks back to the displayed item, the AR system can postpone the dismissal.

A UI interaction such as those described above may also be used to recall a displayed item that has been dismissed. For example, an input action through the user input device (e.g., an actuation of a backspace on a keyboard) can be used to recall the most recent displayed item, or used to select a particular displayed item for recall.

Example User Experiences of a Sensory Eyewear System

Figure 13A:
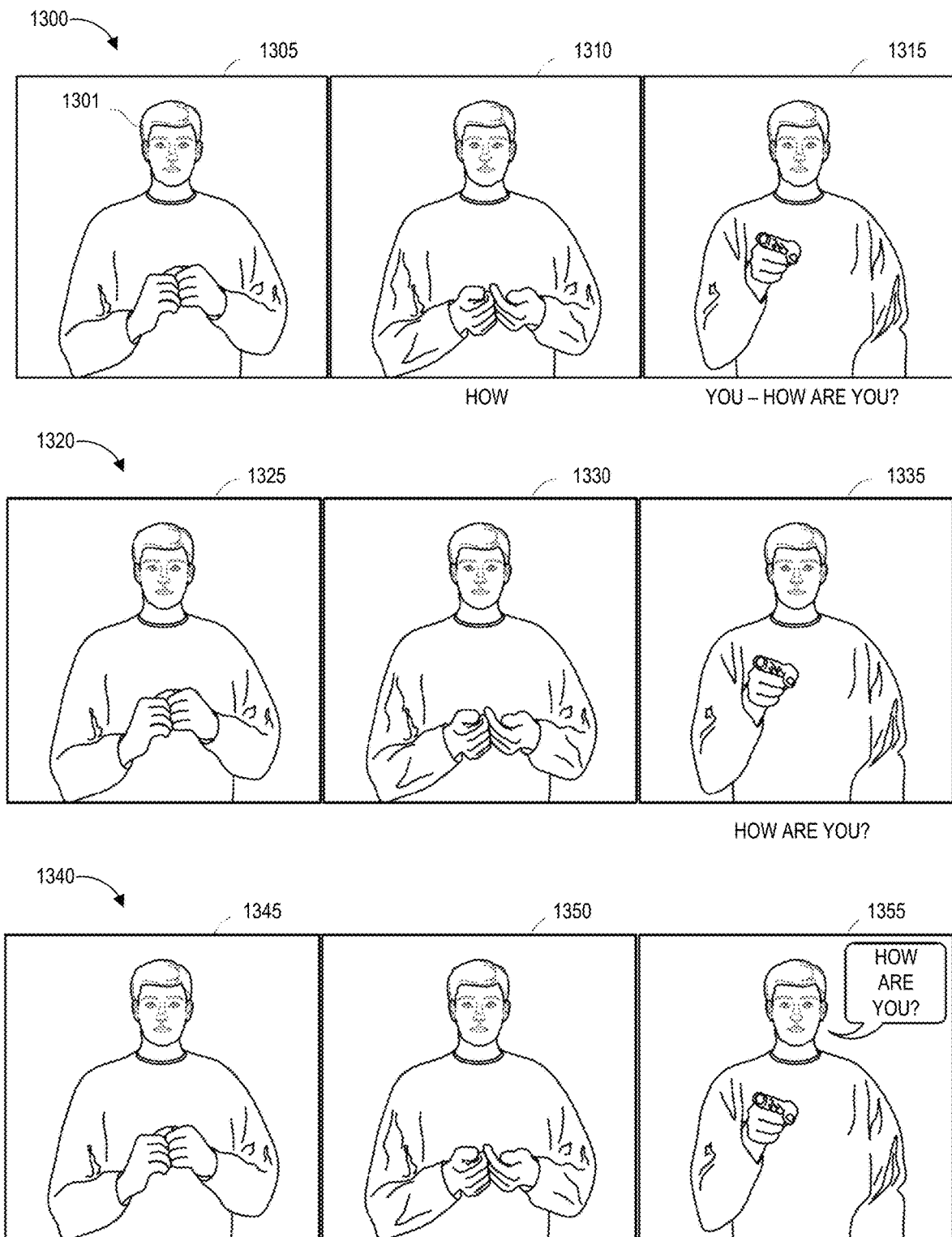
FIG. 13A shows an example user experience of a sensory eyewear system where the sensory eyewear system can interpret a sign language (e.g., gestured by a signer).

FIG. 13A shows an example user experience of a sensory eyewear system where the sensory eyewear system can interpret a sign language (e.g., gestured by a signer) for a user of a wearable system. This example shows a signer 1301 who the user of a sensory eyewear system is observing. The user can perceive that the signer 1301 is making a sequence 1300 of hand gestures as shown in the scenes 1305, 1310, and 1315. The hand gesture in the scene 1305 represents the word "how"; the hand gesture in the scene represents the word "are"; and the hand gesture in the scene 1315 represents the word "you". Thus the sequence 1300 can be interpreted as "How are you". The sequences 1320 and 1340 show the same gestures as the sequence 1300. The gesture 1305 corresponds to the gestures 1325 and 1345; the gesture 1310 corresponds to the gestures 1330 and 1350; and the gesture 1315 corresponds to the gestures 1335 and 1355. However, the sequences 1300, 1320, and 1340 illustrate different user display experience as further described below.

To translate the hand gestures in the sequence 1300 to the English phrase "How are you", an outward-facing imaging system 464 of the wearable system 200 can capture the sequence of gestures, either as a series of images or as a video. The wearable system can extract gestures from the series of images or the video. The wearable system can perform sign language recognition on the extracted gestures, for example, through object recognizers 708 or applying a deep learning algorithm. In the process or recognizing sign language, the wearable system can access a sign language dictionary stored in a local or a remote storage. The wearable system can display text (or a graphic representation of the sign) converted from the recognized sign language to the user (not shown) via the display 220. The sensory eyewear system can also receive a request for auxiliary information associated with the converted signs, and retrieve and display the auxiliary information use the techniques described herein.

In the graphical sequences illustrated in FIG. 13A, expressing the word "how" takes two distinct gestures, e.g., as shown in graphics 1305 and 1310. The wearable system may wait until after the second gesture (in the scene 1310) before displaying the word "how" (as gestured in the scene 1305). Additionally or alternatively, the wearable system may hold off on text conversion or display until a sentence or phrase is completed, such as shown in graphical sequence 1320, where the phrase "How are you" is shown at the end of the scene 1335. The wearable system can display converted text or auxiliary information as a caption or as a text bubble, e.g., as shown in graph 1355. The caption or the text bubble can be positioned in the user's FOV to minimize distraction to the user, e.g., in close proximity to the signer without of obscuring the user's view of the signer's face.

Figure 13B:
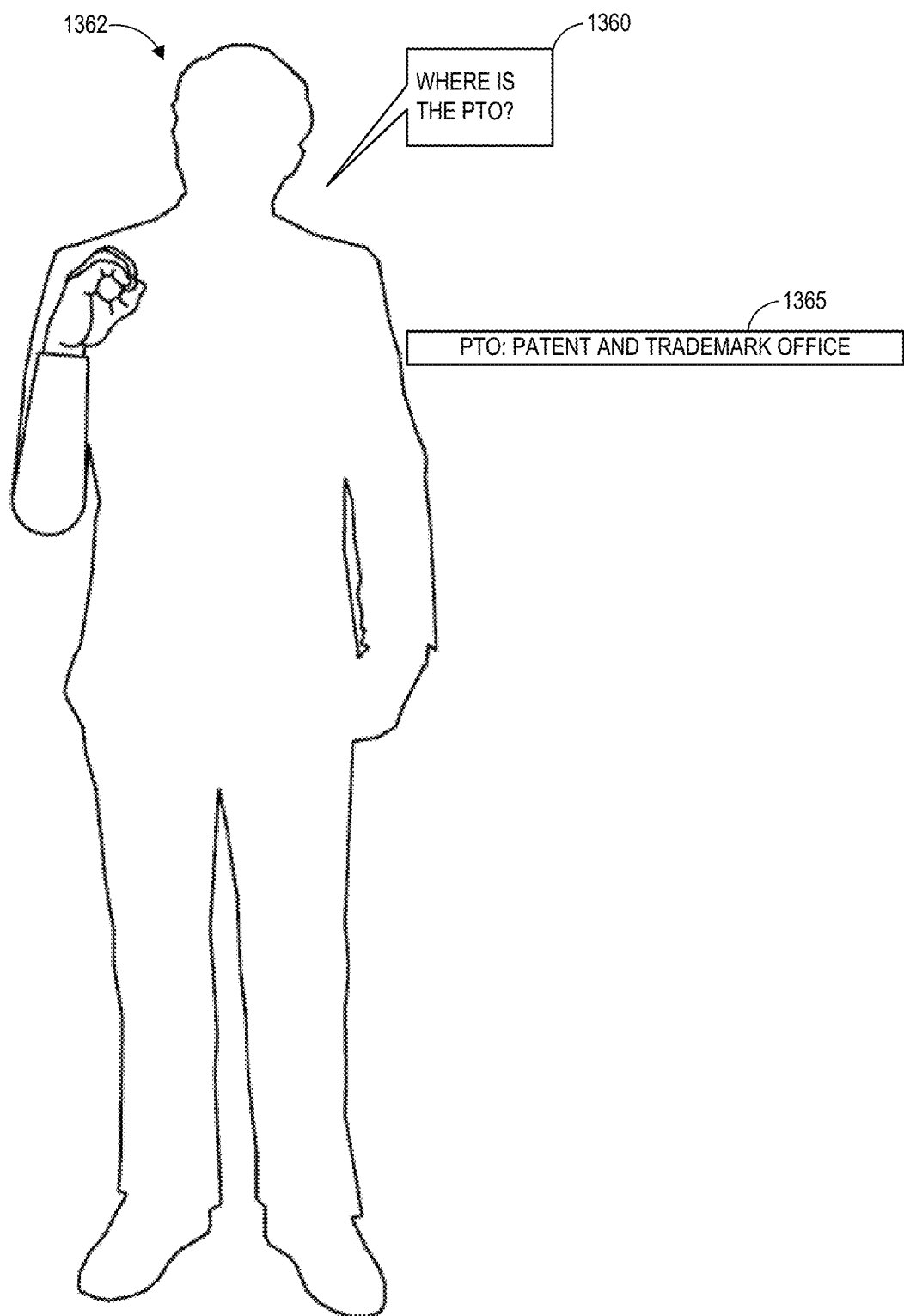
FIG. 13B shows another example user experience of a sensory eyewear system, where target speech and auxiliary information are both presented.

FIG. 13B shows another example user experience of a sensory eyewear system, where the target speech and auxiliary information are both presented. In this example, a user (not shown) can wear an HMD and perceive a signer 1362. The signer asks the question "Where is the PTO?" using a sign language (the signer is depicted as gesturing the letter "O" at the end of the question). The wearable system can recognize the gestures made by the signer, convert them to text, and display the converted text in a text bubble 1360 to the user of the wearable system. The wearable system can determine that the "PTO" is an acronym and is a word that the user does not use often in everyday speech. For example, the wearable system can maintain a dictionary of commonly used words and phrases and determine that "PTO" is not in the dictionary. Upon detecting that the word "PTO" is not in the dictionary, the wearable system can initiate an access of auxiliary information associated with the phrase "PTO".

The wearable system can retrieve auxiliary information on the acronym based on contextual information. In this example, the system may rely on its location information, e.g., the system (and its user) is presently in Alexandria, Va. The system retrieves "Patent and Trademark Office" as auxiliary information for the acronym "PTO." The system displays the auxiliary information as a virtual banner 1365 to the user via the display 220. The display mode of the converted text and the auxiliary information shown in FIG. 13B are for illustration only. Some embodiments may display them differently, e.g., both in a caption displayed sequentially.

Figure 13C:
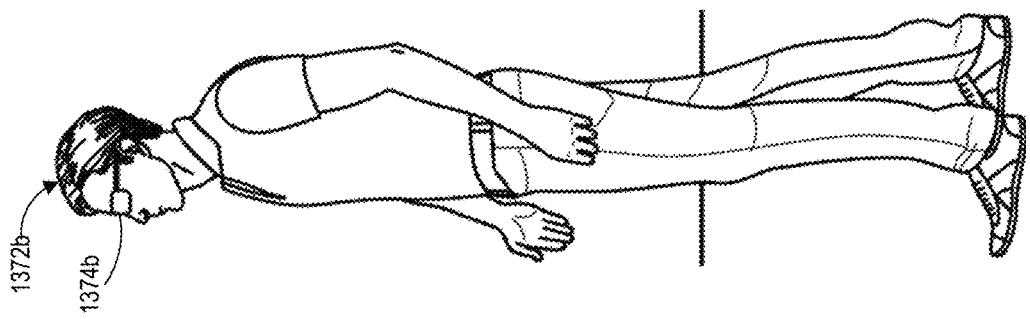
FIG. 13C shows an example user experience of a sensory eyewear system in a telepresence session.
Figure 13C:
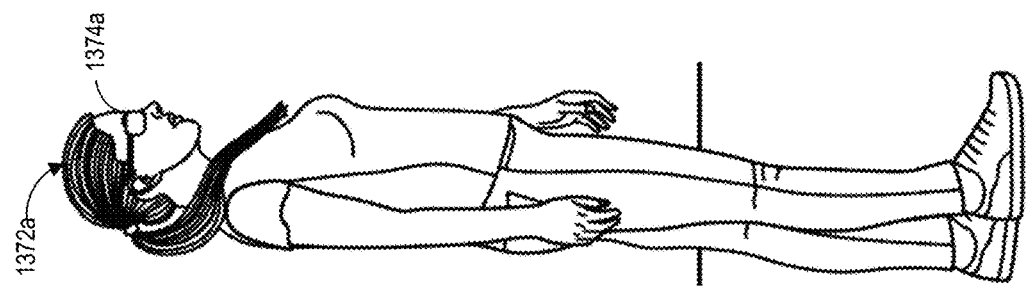

A plurality of users of a plurality of wearable systems can communicate remotely through the aid of their respective wearable systems. FIG. 13C shows an example user experience of a sensory eyewear system in a telepresence session. For example, as illustrated in FIG. 13C, two users 1372a, 1372b at two physical locations 1370a, 1370b (such that they do not see or hear each other directly, without the aid of a man-made device) can both wear a wearable device 1374a, 1374b respectively. One or both users 1372a, 1372b may converse using a sign language. The hand gestures may be captured by an imaging system of the users' respective wearable system and transmitted through the network 1290. User A's 1372a sign language may be displayed as converted text on user B's 1372b device, and vice versa.

A sensory eyewear system can convert detected sign language to text locally and transmitted only the converted text through the network 1290. The other user's device can either display the text or, where the other user is not hearing-challenged, convert the text to audible speech. This can be advantageous where the bandwidth of the network 1290 is constrained because a smaller amount of data is required to transmit text than to transmit corresponding images, video, or audio.

A wearable system can also enhance a telepresence conversation through images presented on the display 220. For example, the display 220 can present an avatar of a remote signer along with converted text or auxiliary information to engage a participant's visual senses. For example, a wearable device equipped with an inward-facing imaging system 464 can capture images for substituting the region of a wearer's face occluded by an HMD, which can be used such that a first user can see a second user's unoccluded face during a telepresence session, and vice versa. World map information associated with a first user may be communicated to a second user of a telepresence session involving sensory eyewear systems. This can enhance user experience through the creation of images of the remote user to be seen by an HMD wearer.

In a telepresence application, capturing image information is performed by a device associated with a user-signer (e.g., from a first person point of view), rather than a device associated with a user-observer, which may be typical in the in-person scenario. Detection of presence of sign language and conversion of sign language to text can be performed by device associated with either user, or by a remote system, e.g., server computer system 1220. The source of sign language can be determined based on the device that captures the image, e.g., when user A's device captures the image, user A is signing.

Figure 13D:
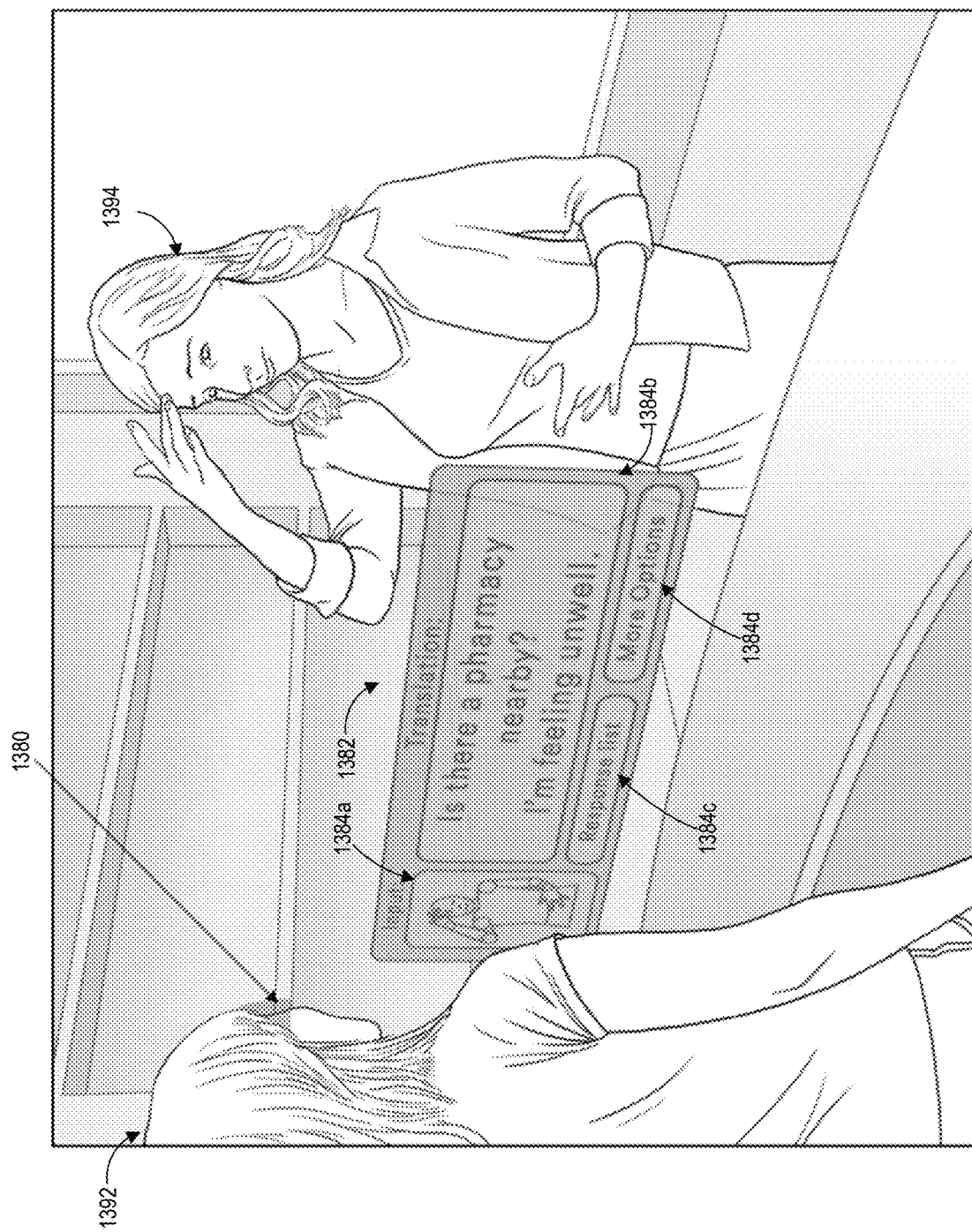
FIG. 13D illustrates an example virtual user interface for interpreting a sign language.

FIG. 13D illustrates an example virtual user interface for interpreting a sign language. In this example, the user 1392 is wearing a wearable device 1380 (which may include at least a portion of the wearable system 200). In this example, the user 1392 is behind a counter and perceives a person 1394 approaching the counter. For example, the user 1392 may be a nurse or admittance person in a medical facility, a hotel employee (e.g., concierge) who assists guests, and so forth. The person 1394 may be feeling unwell and seeking medical attention such as directions to a pharmacy. The wearable device 1380 can observe (e.g., via the outward-facing imaging system 464) the hand gestures by the user 1394 as shown in FIG. 13D. The wearable device 1380 can automatically (e.g., using object recognizers 708) detect that the hand gestures as shown are an expression in a sign language, recognize the meaning associated with the hand gestures, and provide the translation of the hand gestures in a target language (e.g., English) which the user 1392 understands. The wearable device 1380 can present a virtual user interface 1382 to show the input 1384a captured by the wearable device, the translation 1384b corresponding to the input 1384a (e.g., "Is there a pharmacy nearby? I'm feeling unwell."). The wearable system can also provide user input elements 1384c and 1384d on the virtual user interface 1382. For example, the user 1392 may use a hand gesture (e.g., a press gesture) to select the user input element 1384c. An actuation of the user input element 1384c may cause the wearable device to provide a list of responses, such as, e.g., the location of the nearby pharmacy, or "I don't know". In some embodiments, the wearable device 1380 can show corresponding graphics in the sign language for the responses. The user 1392 can accordingly respond to the person 1394 using hand gestures as shown in the graphics. As another example, where the user input element 1384d is actuated, the wearable system can provide list of options such as, e.g., dismissing the user interface element 1382, or making a call for help, etc. In some embodiments, the area 1384a of the interface 1382 may include an output graphic, showing sign language gestures that the user 1392 can perform to communicate with the person 1394 (e.g., signs for "the pharmacy is across the street").

Figure 14A:
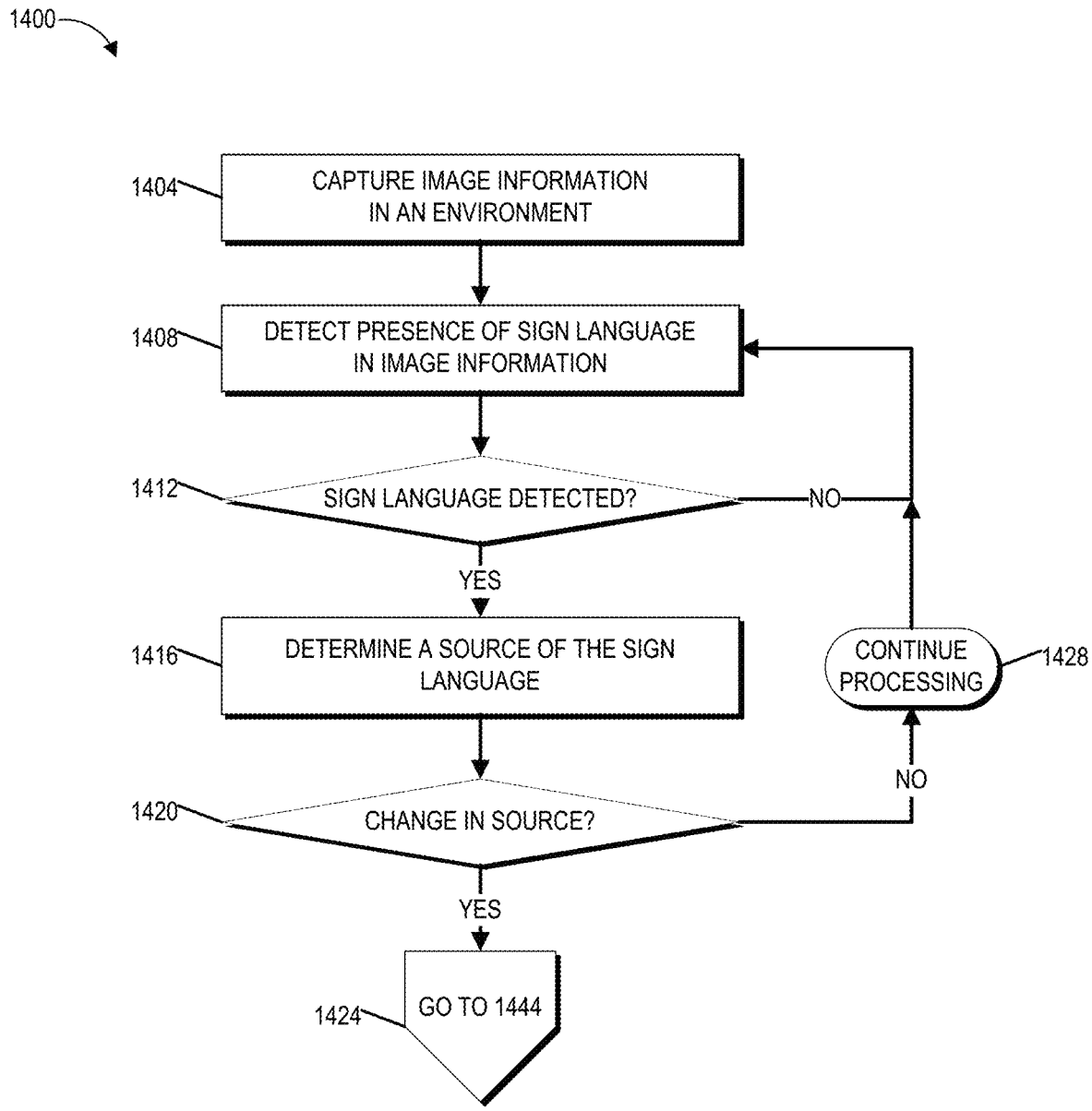
FIGS. 14A and 14B illustrate example processes for facilitating interpersonal communications with a sensory eyewear system.
Figure 14B:
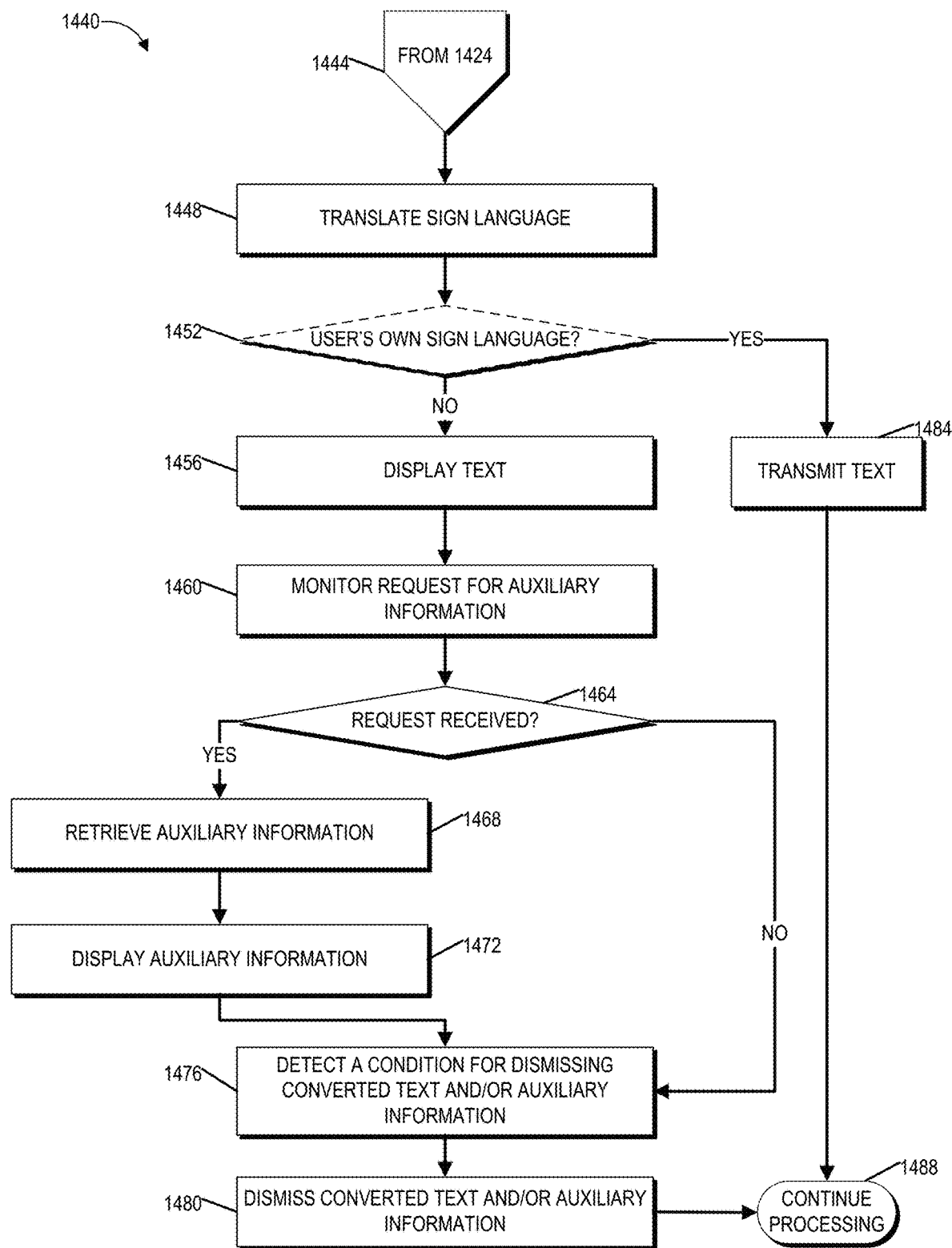

Example Processes for a Sensory Eyewear System as a Tool for Interpersonal Communications FIGS. 14A and 14B illustrate example processes for facilitating interpersonal communications with a sensory eyewear system. The example processes 1400 and 1440 in FIGS. 14A and 14B can be performed by the wearable system shown in FIG. 2A.

At block 1404, the wearable system can capture image information in an environment. As described herein, the wearable system can use the outward-facing imaging system 464 to capture image information in the user's surroundings. The wearable system can also capture the audio information in the environment. The audio information can be used with the data acquired by the outward-facing imaging system 464 to determine a source of the speech or gesture, or detect the presence of a sign language.

At block 1408, the wearable system detects the presence of sign language in the captured image information. This detection processing may be done locally (e.g., by local processing module 71) or remotely (e.g., by remote processing module 72). The wearable system can use various object recognizers to detect the presence of hand gestures. For example, the wearable system may find a sequence of hand gestures may constitute a phrase or a sentence in a sign language. As another example, the wearable system may detect a series of hand gestures as well as lip movements. The wearable system may find that the hand gestures and lip movements are associated with a sign language because such gestures and lip movements are not accompanied by audio information.

In some embodiments, the wearable system can detect and interpret a sign language based on contextual information. For example, the wearable system can receive audio signals (e.g., of dinner conversation), convert those signals into language, or extract meaning from that language, thereby inferring the genre (or other attribute) of the topics of discussion which can be used to interpret the sign language (such as, e.g., to interpret hand gestures in a way to align with the topics of discussions).

The wearable system can be configured to detect or to ignore the user's own sign language. The function of block 1408 can be different based on this configuration because the user's own sign language can be captured from a first-person point of view at a relatively close distance. For example, if the system is configured to capture the user's own sign language, an additional outward-facing camera directed downward at the user's hands may be turned on, or the outward-facing imaging system may be configured into a wide-angle mode to capture images of the user's hands.

At block 1412, the system determines whether sign language is detected. If sign language is detected, the process flow 1400 continues to block 1416. If sign language is not detected, the flow returns to block 1408 (as shown) or to block 1404 (not shown).

The operations in blocks 1404 through 1412 may be performed continuously or periodically (e.g., at a sampling frequency) when the wearable system (including its imaging systems) is turned on or when the sign language recognition function is enabled. These operations can be performed in parallel to other blocks in flowcharts 1400 and 1440 (e.g., as background tasks driven by a timed interrupt). They are shown as discrete blocks in a processing flow sequence for the purpose of illustration. But they are not limited by the illustrated sequence. Many processing flows other than the examples described above are possible at the discretion of a system designer.

At block 1416, the wearable system can determine a source (e.g., the signer) of the detected sign language. The source may be a person in the physical vicinity of the user, the user, or a person in a visual content that the user perceives. The source of the sign language can be relevant, for example, if the system is configured to process sign language only from a person in or near the center of the wearable system's FOV (sign language from people outside of the center of the FOV, e.g., when multiple persons are concurrently conversing in sign language, can be discarded and not processed further). As another example, the wearable system can process gestures for sign language recognition only for a person at whom the user is looking, which may or may not be a person at the center of the FOV. The wearable system can identify the person which the user is looking at based on data acquired by the inward-facing imaging system 462 and the outward-facing imaging system 464. For example, an outward-facing camera can provide information including position of a signer relative to the user. An inward-facing camera can provide information including the direction in which the user is looking. By using information from both cameras, the wearable system can determine the person whom a user is looking at, and whether that person is the source of sign language.

At block 1420, the system determines whether there has been a change in the source of sign language. If there has been a change, the flow 1400 continues through block 1424 to block 1444 as shown in FIG. 14B. If there has not been a change in the source of sign language, the flow moves to block 1428 to continue sign language recognition processing, which can include capturing image information (block 1404), detecting presence of sign language (block 1408), as well as processing steps shown in FIG. 14B. For example, if the system determines the gestures continue to come from the same signer continues, the system can continue to perform functions starting from block 1448 in addition to continuing to capture image information and detect sign language.

At block 1448, the wearable system can translate the sign language into a language understood by the user. For example, the system can convert the recognized sign language to text, which can be read by the user when displayed by the system (e.g., as a text bubble or caption). In some cases, if the user understands a different sign language, a graphic representation of the other signer's signs can be displayed to the user, for example, as graphics showing the signs converted into signs in the user's own sign language.

At block 1452, the example system can determine whether the detected sign language is the user's own, when the system is configured to detect the user's own as well as a conversation partner's sign language. If it is, the process proceeds to block 1484, wherein the system can transmit the converted text to a display device of the observer/conversation partner.

From block 1484, the system can proceed to block 1488 to continue processing. When the system is configured to ignore the user's own sign language, both blocks 1452 and 1484 can be omitted from the flow. If the detected sign language is not the user's own, the flow continues to block 1456.

At block 1456, the wearable system can display converted text by the display as described above. Where the user of the system is not hearing-challenged, the text can be presented in audio, e.g., through the audio amplifier 240, in addition to or in alternative to the visual display.

At block 1460, the wearable system can monitor for a request for auxiliary information on the converted text. The request for auxiliary information may be sent by the user's wearable device upon detection of a triggering condition. Some example triggering conditions may include a user's indication, e.g., a user's gesture or an actuation of the user input device 466; or upon detecting of a word (or phrase) that a user may not understand.

At block 1464, the system determines whether a request is received. If a request is not received, the flow moves to block 1476, which is further described below.

If a request is received, at block 1468, the system can retrieve auxiliary information associated with the converted text (or a requested portion thereof). As described herein, the auxiliary information may be determined and retrieved based on contextual information, such as, e.g., the user's location, the context of the speech, or other types of information as described herein.

At block 1472, the wearable system can display retrieved auxiliary information via the display 220 of the wearable system. In some implementations, the wearable system may dismiss a display of the converted text before displaying auxiliary information.

The flow may enter block 1476 from block 1464 or 1472. At block 1476, the system can detect a condition for dismissing the converted text or auxiliary information display. When such a condition is detected, at block 1480, the system can dismiss the display of the converted text or auxiliary information and continue on to block 1488. At block 1488, processing of sign language recognition continues, in a manner similar to the description of block 1428 above.

Similar to what is noted above with respect to blocks 1404 through 1412, operations in flowchart 1440 may be performed in parallel to other blocks in flowcharts 1400 and 1440. They are shown as discrete blocks in a processing flow sequence for the purpose of illustration, but they are not limited by the illustrated sequence. For example, a system may be displaying auxiliary information for converted text (at block 1472) while the system converts additional sign language to text (at block 1448), performs auxiliary information request monitoring (at block 1460), or retrieves auxiliary information on another converted text (at block 1468). As another example, a system can convert sign language to text (at block 1448) while it retrieves auxiliary information for a prior-requested (for auxiliary information) converted text (at block 1468). Many other processing flows are possible at the discretion of a system designer.

Figure 14C:
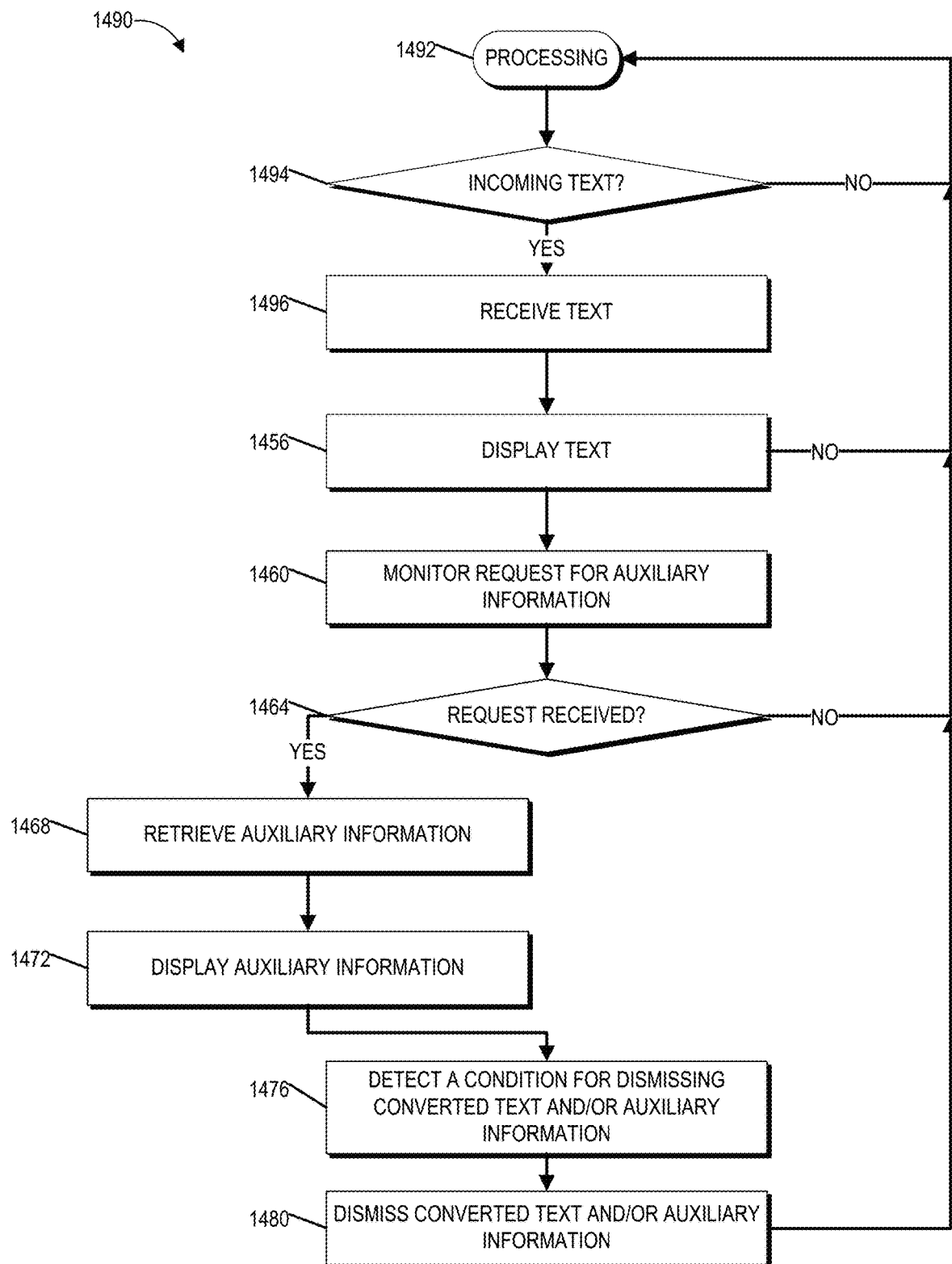
FIG. 14C is a process flow diagram of an example method for determining auxiliary information and presenting the auxiliary information associated with converted text.

FIG. 14C is a process flow diagram of an example method for determining auxiliary information and presenting the auxiliary information associated with converted text. This process 1490 can be executed on the wearable system 200 described herein or another computing device which itself may or may not have sign language recognition functionality. This process 1490 can be applicable to situations where it is more advantageous to detect sign language and convert the sign language to text using one sensory eyewear system and to display the converted text on another device or system. An example situation can be where a signer wishes to communicate remotely with a second person. The wearable device of the signer can convert the signer's own sign language to text. The wearable device can transmit the converted text to a remote system viewable by the second person. Since converted text can be transmitted in much fewer information bits than the corresponding images or video, such a process can advantageously require a much lower bandwidth from the transmission medium or result in a much more reliable communication.

The process 1490 starts at block 1492, wherein the device or system is performing some sort of processing, which may or may not be related to sign language processing. At block 1494, the device or system can determine whether text is received from a wearable system. If no, the process can return to block 1492. If yes, the process can proceed to block 1496. At block 1496, the device or system can receive text from the wearable system and render the text. The process can then proceed to block 1456. Where the rendering device comprises an HMD, the rendering device can present the text as virtual content overlaid on the physical environment of the user. Processing in blocks 1456 through 1480 can proceed similarly as described above in connection with FIG. 14B.

Figure 15:
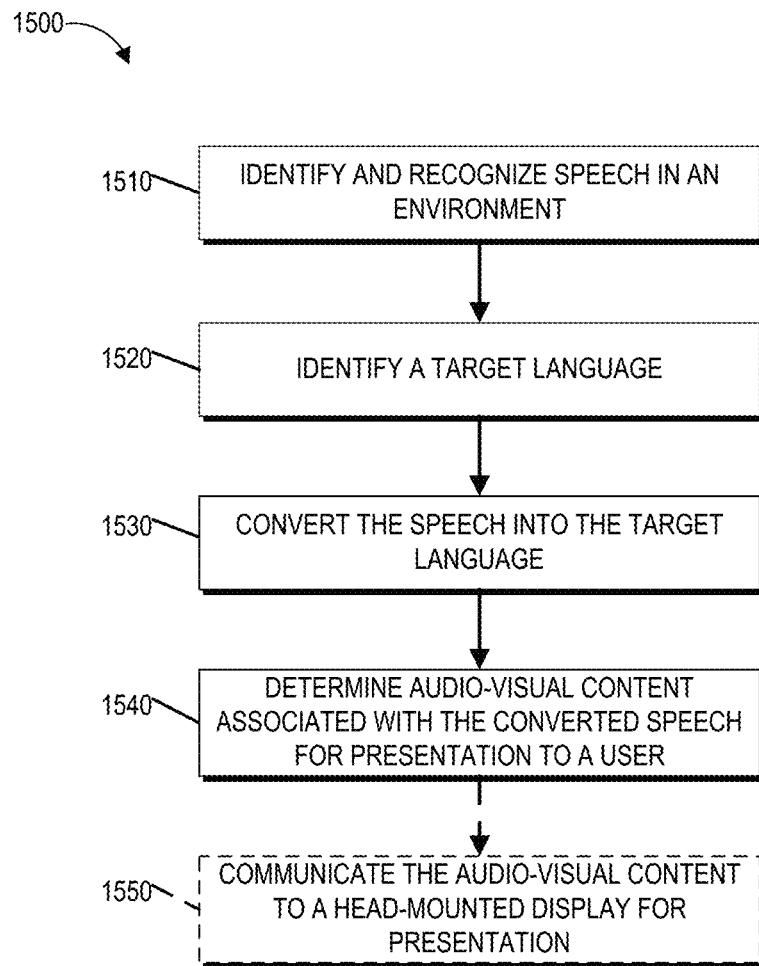
FIG. 15 illustrates another example process for facilitating interpersonal communications with a sensory eyewear system.

FIG. 15 illustrates another example process for facilitating interpersonal communications with a sensory eyewear system. The example process 1500 may be performed by one or more components of the wearable system 200 (e.g., by the local processing & data module 260, the remote processing module 270, alone or in combination) described herein. As described with reference to FIG. 12, one or more of the steps described in this FIG. 15 can be performed by one or more computing devices that are not part of a user's wearable system, such as, e.g., another user's wearable device, or a third party's server system.

At block 1510, the wearable system can identify and recognize speech in an environment. The speech may be in the form of a sign language. For example, the wearable system can analyze data acquired by the outward-facing imaging system 464 to identify hand gestures that are part of a sign language. The wearable system can also analyze audio data acquired by the audio sensor 232 which may include speech by a person in the user's environment. The wearable system can recognize the speech using object recognizers 708. For example, the wearable system can recognize the presence of a phrase or a word by analyzing images of the sign language using the object recognizers. The wearable system can also recognize the audio data using the various speech recognition algorithms described in FIG. 7.

At block 1520, the wearable system can identify a target language. The target language may be the language a user of the wearable system uses to communicate. For example, the user may communicate with other people using English while the recognized original speech (used by another user) is a sign language. The target language may also be a language selected by the user or by the wearable system. For example, the user may select ASL as the target language because the user may want to use sign language to communicate with another person even though the user speaks another language. As another example, the wearable system may automatically select a language based on the user's location. For example, the wearable system can determine which country the user is at and select an official language of that country as the target language.

At block 1530, the wearable system can convert the detected speech into the target language. The wearable system can use various techniques described herein, such as, e.g., dictionary translations, to perform such conversion.

At block 1540, the wearable system can determine audio-visual content associated with the converted speech for presentation to a user of the wearable system. As one example, the audio-visual content may include text in the target language. As another example, the audio-visual content may be an audio stream in the target language where the converted speech is in a spoken language. As yet another example, the audio-visual content may be graphics or animations if the target language is a sign language.

At the optional block 1550, the wearable system can communicate the audio-visual content to a head-mounted display for presentation. For example, the audio-visual content may be communicated from one user's wearable device to another user's wearable device. In this example, the wearable device of the first user can capture the first user's, convert the speech to a target language, and communicate the converted speech to the second user's wearable device.

Example Sensory Eyewear System as a Tool for Interacting with Environment

In addition to or as an alternative to recognizing gestures by another person, the wearable system described herein can also recognize signs in the environment with, for example, various text recognition algorithms described with reference to FIG. 7. The wearable system can also modify the text (e.g., modify the display characteristics or the content of the text) and render the modified text onto the user's physical environment. For example, the modified text may be rendered to overlay and occlude the original text such that the user will perceive the modified text rather than the original the text.

Examples of Modifying Display Characteristics of the Text

Figure 16A:
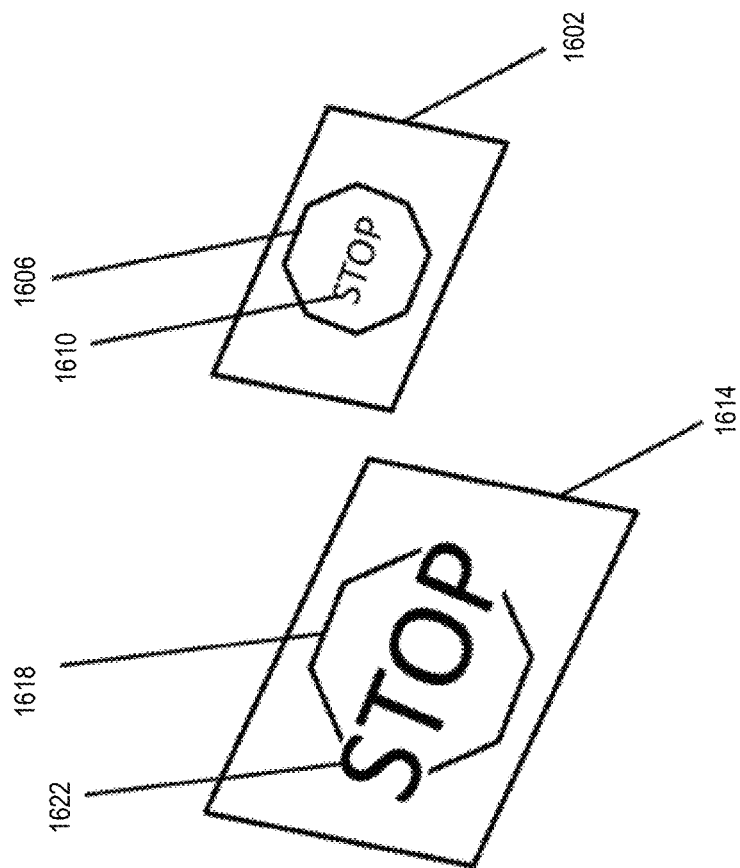
FIGS. 16A-16E illustrate example user experiences for a sensory eyewear system which is configured to recognize text in the environment, modify the display characteristics of the text, and render the modified text.
Figure 16A:
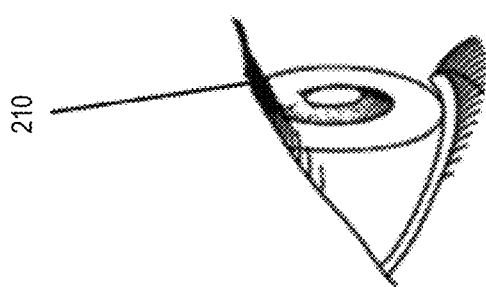

FIGS. 16A-16E illustrate example user experiences for a sensory eyewear system which is configured to recognize a text in the environment, modify the display characteristics associated with the text, and render the modified text. With reference to FIG. 16A, a user 210 can wear a wearable device (not shown in FIG. 16A) and may see a physical object 1606 in the environment via the display 220. The wearable device can include an outward-facing imaging system 464 which can capture an image 1602 that comprises the object 1606 within the image 1602. In addition to or in alternative to the outward-facing imaging system 464, the wearable system 200 can capture an image of the physical object using other sensors or devices. For example, a user input device 466 (e.g., a totem) may have imaging capacities and can capture the image 1602 which includes an image of the object 1606. The object 1606 may include a sign or other object that may contain writing, letters, symbols, or characters 1610 on or in it. For example, the letters may be written on the object; or shaped from, with, or embedded in the object. The text may also be a sequence of static or flashing lights; or an arrangement of one or more physical objects. In the examples shown in FIGS. 16A-16E, the object 1606 is a traffic stop sign. In other examples and without limitation, the object 1606 could be any type of signage (e.g., a commercial or public display sign), a book, a magazine, a piece of paper, a computer display screen, a television screen, and so forth.

The wearable system 200 can analyze the image 1602 and recognize the object 1606 using one or more object recognizers 708, for example as described with reference to FIG. 7. As one example, the wearable system can recognize that the object 1606 is a traffic sign (e.g., based on the shape of the object 1606, an octagon in FIG. 16A). As another example, the wearable system can recognize the presence of the text in the object 1606. The wearable system can recognize the text regardless of the format of the text (e.g., whether the text is on the object or is represented by a sequence of lights that project the text (e.g., neon lights, LED lights, etc.).

As will be further described with reference to FIG. 18, in certain embodiments, the wearable system 200 can recognize the meaning of the text and convert the text from an original language to a target language. For example, the wearable system 200 can identify letters, symbols, or characters from a variety of languages, such as, for example, English, Chinese, Spanish, German, Arabic, Hindi, etc., and translate the text from the original, displayed language to another language. In some embodiments, such translation can occur automatically according to previously specified settings (such as, e.g., user's preference or user's demographic or geographic information). In some embodiments, the translation can be done in response to a command (e.g., verbal or gesture) from the user.

The wearable system 200 can analyze the characteristics of the text 1610 using the object recognizer 708. For example, the wearable system 200 can recognize the font size or typeface associated with the text 1610. The wearable system can adjust the characteristics of the text 1610 to generate a modified text. For example, the wearable system 200 may adjust the size of the text 1610 to magnify or shrink the text 1610. The size of the modified text may be dependent in part on a distance from the eye 210 to the original text 1610 or user's characteristics. For example, if the text 1610 is far away from the user, the wearable system can enlarge the text 1610. As another example, depending on the user's eye capability, the system can make a determination on how to adjust the size of the text. The wearable system can determine the person's eye capability based on information acquired previously from the user. For example, the user can input whether there are any vision problems of the eyes. The wearable system can also perform a vision test to the user (e.g., by displaying virtual objects at different depth planes and sizes to determine if the user can clearly perceive the virtual objects) to determine the user; s eye capacity. Based on the user's eye capacity, the wearable system can determine whether the user will likely perceive the text 1610 based on the characteristics (e.g., the distance/location, color, size, font, etc.) of the text. For example, the wearable system can enlarge or bold the text if the wearable system determines that the user cannot perceive the text clearly (e.g., when the text is out of focus). If the user is near-sighted, but the text is far away from the user, the wearable system can enlarge the size of the text so that the user can more easily perceive the text. The size adjustment may correspond to the degree of near-sightedness. The size may be associated with a larger increase if the degree of near-sightedness of a user is big while the size may be associated with a smaller increase if the degree of near-sightedness of the user is small. As further described herein, the wearable system can also change the display location of the modified text based on the user's eye capacity. With reference to FIG. 3, the display system 220 can include a plurality of depth planes, Where the user is far-sighted but the text is close to the user, the wearable system can render a modified text at a depth plane 306 farther away from the user than the original depth plane such that the modified text appears far away from the user. The size adjustment can occur by changing the front size of the text (e.g., where the text is recognized as a string). The size adjustment can also occur by zooming in or out (e.g., digital zoom) on a portion of the image 1602 containing the text 1610 (e.g., where the text is analyzed as an image rather than a text string).

The wearable system 200 can render the modified text to a user. With continued reference to FIG. 16A, a user wearing the HMD may see a virtual image 1614 (as rendered by the HMD) containing a rendered version 1618 of the object 1606. In some implementations, the rendered version 1618 of the object 1606 can occlude the original text. As shown in FIG. 16A, the rendered text 1622 is "STOP" and is enlarged in comparison to the original text 1610. The HMD can render the enlarged text 1622 to be overlaid on the original text 1610 and thus the user may not perceive the original text 1610. In this example, by increasing the text size, the user advantageously can more readily perceive, understand, and respond to the underlying text 1610, which in actuality may be much smaller and harder to perceive.

Figure 16B:
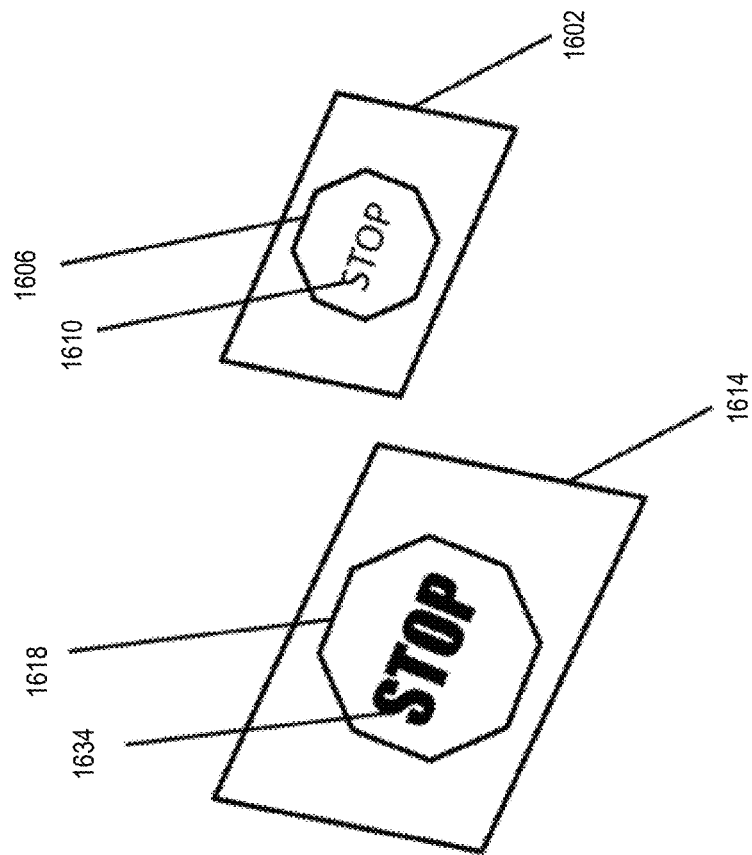
Figure 16B:
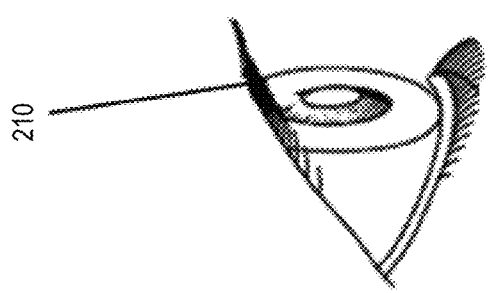

FIG. 16B illustrates another example of modifying characteristics of a text in the user's environment. As shown by the rendered text 1634, the wearable system 200 can bold the font of the original text 1610. In addition to or in alternative to bolding the font, other alterations to the original text 1610 can be made as well, such as, for example, changing the text color, shading, outlines, format (e.g., italics, underline, alignment, justification, etc.), and so forth. The wearable system 200 may add (or modify) graphics elements associated with the text 1610 such as making the rendered text 1634 flash, spin, etc.

Figure 16C:
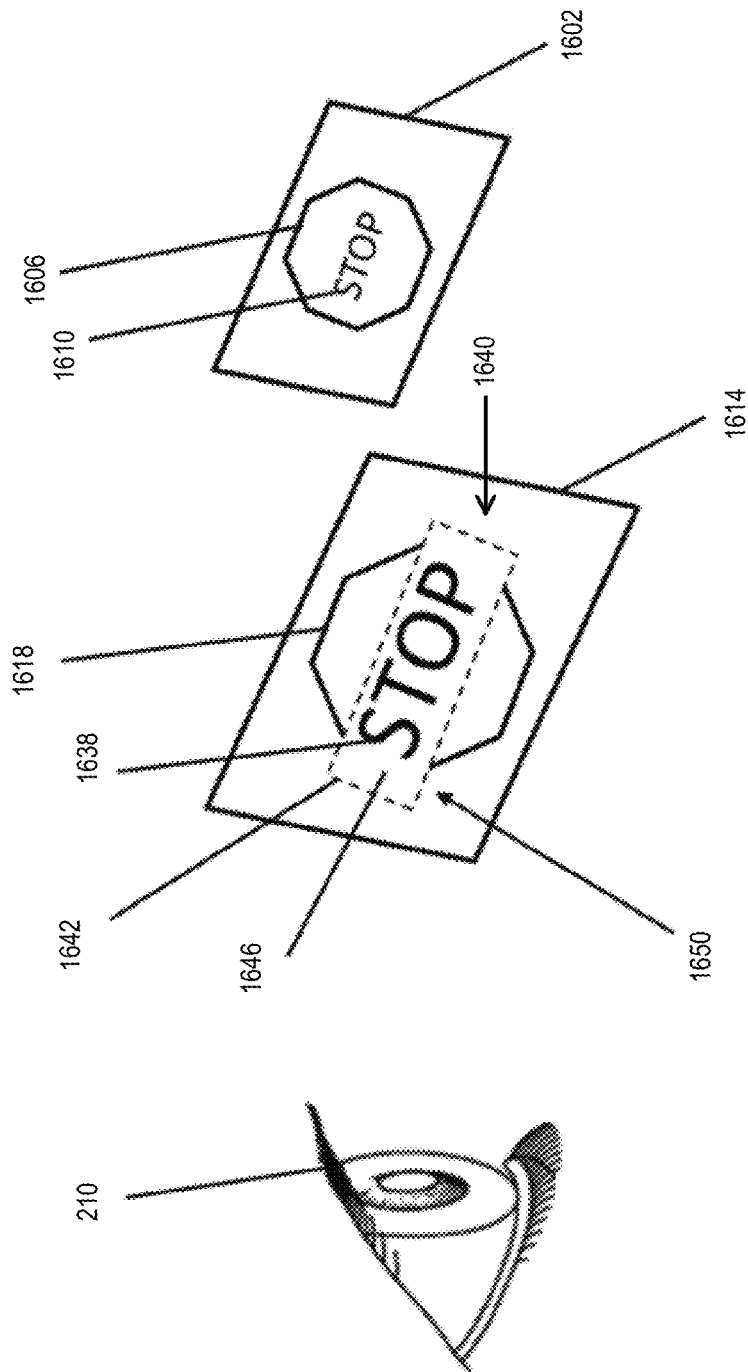

FIG. 16C illustrates an example of rendering the modified text together with a focus indicator 1640. The focus indicator 1640 can comprise visual effects, such as, a bulls eye, a cross-hair, a halo, a color, a perceived depth change (e.g., causing the rendered text to appear closer), an addition or a change in the background of the text, an animation, or other visual effects which draw the user's attention. In the example shown in FIG. 16C, the wearable system 200 may be configured to display the focus indicator 1640 as a background 1650 against which the text 1638 is rendered. The background 1650 can comprise a border region 1642 and an inner region 1646. The border region 1642 can bound the inner region 1646. In the embodiment shown, the virtual letters 1638 are displayed within the inner region 1646. The text background 1650 can be rendered in the displayed image 1614 such that the text background 1650 is a different background than the user would see without the HMD. In some embodiments, one or more of the inner region 1646 and the border region 1642 are monochrome (e.g., white, black, or gray). The system can alter the background 1650 such that the rendered text 1638, rather than the original text 1610, is seen by the user. For example, the background may be non-transparent such that it can occlude the original text 1610. The processing electronics can also be configured to display the background 1650 such that it blends into the rest of the image 1614. For example, the background 1650 may have the same color and texture effect as the rest of the image 1614. The wearable system can also display the background 1650 and the text 1638 in a way that highlights the text 1638 or background 1650, such as, e.g., a displaying a halo around the text 1638 or the background 1650. In such cases the background 1650 may not seamlessly integrate into the rest of the image 1614. For example, the inner region 1646 can be outlined by the border region 1642 in order to emphasize the background 1650 or the text 1638.

Figure 16D:
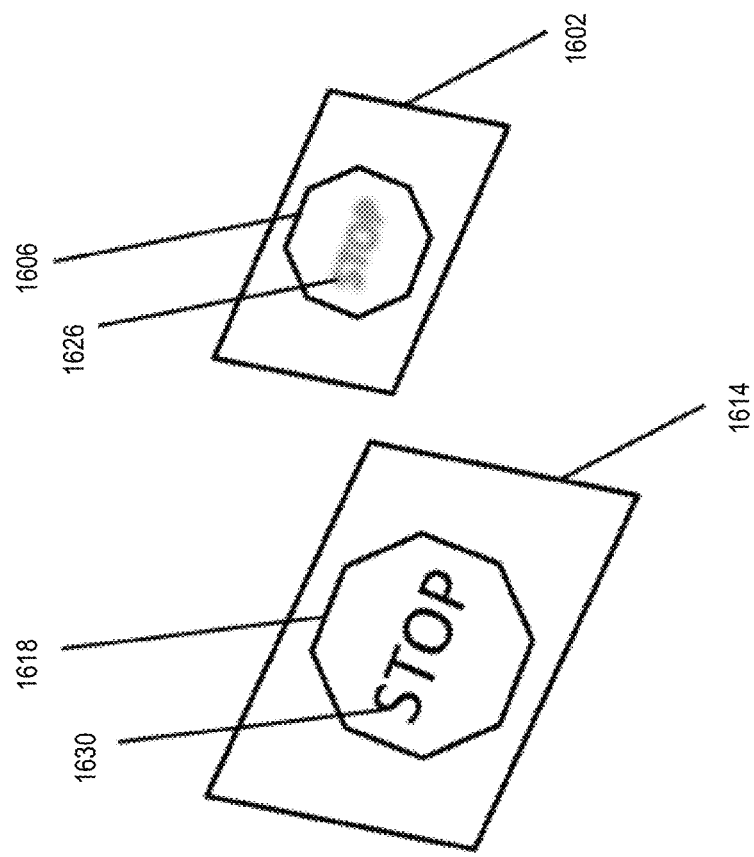
Figure 16D:
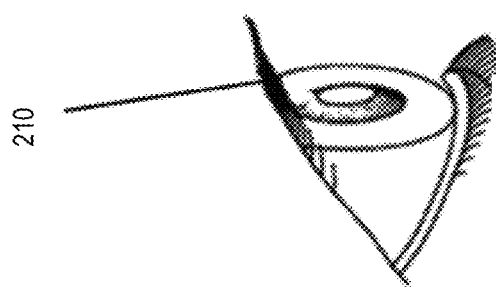

Under certain circumstances, the visual appearance of the original text may not be clear, for example, because of environmental effects (e.g., rain, fog) between the user and the object 1606. FIG. 16D illustrates an example of modifying characteristics of the text and rendering the modified the text so as to be more legible. In this figure, the text 1626 appears to be blurry to the user 210. Text may be perceived blurry for a variety of reasons. For example, a user with poor eyesight may have trouble seeing text clearly at a particular distance. Users with myopia may find images of text that are nearby to appear relatively clear while text that appears far away to be blurry. Similarly, those with hyperopia can see text appearing far away clearly while having a hard time with putting into focus text that appears to be nearby. But eye conditions may not be the only reason an image may appear blurry. Text that appears to be closer or farther away than the eye 210 can accommodate for may also appear blurry. If the text appears to be moving rapidly relative to the user, the text 1626 may appear to be blurry. Other factors described above, such as climate or weather factors, as well as resolution of cameras which acquired the images may also play a role.

In this example, the wearable system 200 can make the blurry text 1626 or text that is otherwise difficult to read clearer or more legible. Where the text appears to be blurry to the user but not in the images received by the wearable system, the wearable system can analyze images acquired by the outward-facing imaging system 464 or another device (such as e.g., the user input device 466 or a camera external to the wearable system such as a dash cam) to identify the text 1626 using similar techniques described with reference to FIG. 13A. The wearable system can render the text virtually as shown by the text 1630. In certain implementations, the wearable system can adjust the characteristics of the virtual text 1630 based on the user's or the environment's conditions. For example, where the user is near sighted, the wearable system can enlarge the font of the text 1626 or render the text to appear closer to the user (e.g., on a closer depth plane). As another example, when the environment is dark, the wearable system can increase the contrast ratio between the text 1630 and the other regions of the virtual image 1614.

In some situations, the text 1626 appears to be blurry because the image 1602 obtained by the wearable system is blurry (e.g., due to fast driving speed or when the camera's resolution is low). As described herein, the wearable system can use the object recognizer 708 to identify the existence of the blurry text 1626. For example, the wearable system can determine a likelihood on the existence of the text in or on the object 1606. In some situations, if the likelihood passes a threshold, the wearable system can use one or more text recognition algorithms described, e.g., with reference to FIG. 7, such as an OCR algorithm, to identify letters 1630 that most likely correspond to the blurry text 1626.

Figure 16E:
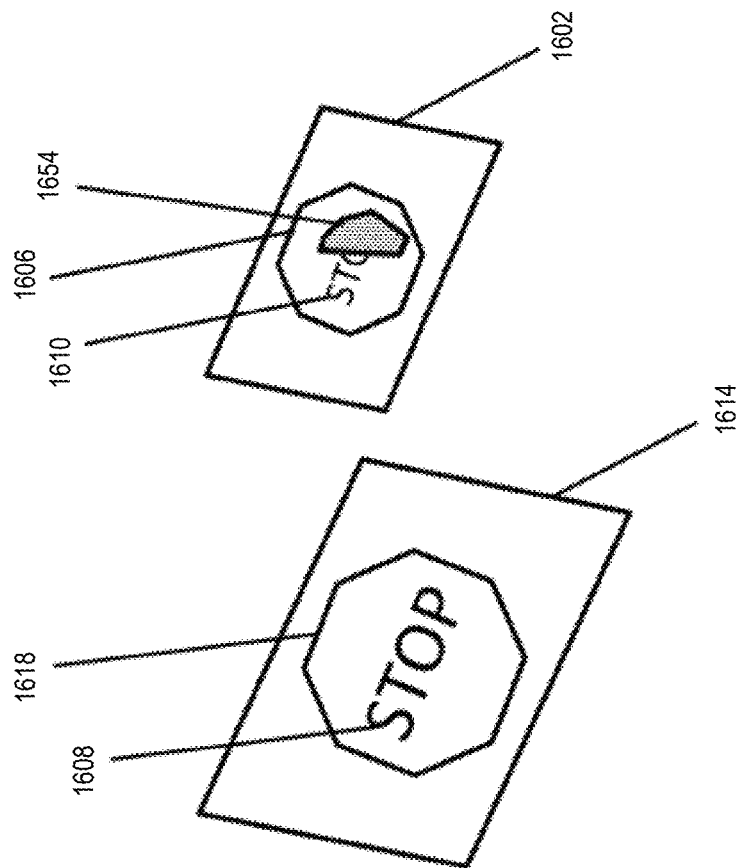

FIG. 16E illustrates a scenario when the original text 1610 is partially illegible due to an obstruction 1654. As shown, the obstruction 1654 covers part of the original text 1610 in the original image 1602. However, the obstruction 1654 can take on one or more various forms. For example, the obstruction 1654 could be some physical obstruction between the eye 210 or display and the image 1602, such as, for example, a pole, a building, etc. The obstruction 1654 could also be an environmental or weather obstruction, such as those described above. The obstruction 1654 could also be on the object 1606 (e.g., a portion of the text 1610 is occluded by another object on the sign 1606 or a portion of the text 1610 is erased, missing, or covered by a sticker). This could include, for example, a surface that has accumulated dust or dirt, damage to the surface of the object 1606 where the writing 1610 is found, an inkblot (e.g., from a printer), a distortion in the original text 1610, or any other similar obstruction 1654.

The system may use contextual information (also sometimes referred to herein as context clues) in determining what the original text 1610 says. The various context clues described herein may be used individually or in combination by the wearable system to determine the full text for the text 1610. An example context clue is the user's location. For example, as described above, the GPS system 37 (see FIG. 2B) can acquire location data of the user and based on the location data, the wearable system can provide an initial guess as to what the language of the text is. Wherein applicable, in some embodiments, the wearable system may gain additional information from signals received from one or more light sources at wavelength(s) outside the visible spectrum (e.g., infrared, ultraviolet). For example, the wearable system may emit an ultraviolet light toward the sign 1606 to reveal the signage information that is only visible under the ultraviolet light (or may detect ultraviolet light reflected by another source (e.g., the sun) from the signage). In some embodiments, the system has access to a database of words against which the system can check the visible portion of the original text 1610. In such examples, the wearable system 200 may be able to determine which candidates of letters or words are most likely. For example, as shown in FIG. 16E, the system infers that the letters spell "STOP" in part due to the octahedral shape of the object 1606 or the red color (not shown) of the object 1606.

The wearable system may be able to rely on surrounding words, symbols, punctuation, or characters as context clues to determine what an original text 1610 says. In certain embodiments, the system is able to identify location-specific context clues using, for example, machine learning techniques. For example, the system may be able to detect that a user that is driving down the street and may bias an identification of text towards words frequently used on street signs. The wearable system may comprise a database, which may be accessed by the local processing and data module 270 or the remote processing module 280 (see, e.g., FIG. 2A). The database may store categories of words that are associated with particular activities engaged in by the user (e.g., skiing), geographical locations of the user, speeds of travel of the user, altitude of the user, volume or type of ambient noise received by the system, level or type of visible or other light in the area received by the system, the temperature or climate surrounding the system, the perceived distance of the text from the user, or the category or categories of words spoken by another party that the system picks up. In some embodiments, the wearable system can use this information as context clues to more accurately hone in on more likely candidates for the words or language of the text viewed by a user according to one or more associations described above. In some embodiments, the wearable system can use machine learning algorithms (e.g., a deep neural network) to "learn" from previous words in various circumstances and identify the likely word based on the present circumstance. Accordingly, by performing this learning, the wearable system 200 can become particularized to the behavior of the user and can more rapidly or efficiently determine the text.

In the examples described in FIGS. 16A-16E, the system can determine at which depth to display the text based on the perceived distance the original letters appear to be from the user. The perceived distance between the original letters and the user may be measured using various techniques such as by applying a stereo vision algorithm (e.g., on the data acquired by the outward-facing imaging system) or by analyzing data acquired by a depth sensor (e.g., a lidar). Stereo vision algorithms can include a block-matching algorithm, a semi-global matching algorithm, a semi-global block-matching algorithm, disparity maps, triangulation, depth maps, a neural network algorithm, a simultaneous location and mapping algorithm (e.g., SLAM or v-SLAM), and so on. Letters that are perceived to be close to the user may be displayed at a near depth on the display system 220. In some embodiments, letters that appear to be closer than a first distance threshold (e.g., about 800 cm) from the user are displayed on the system at a first depth. In some embodiments, the first distance threshold is 200 cm, such that letters that appear to be closer than about 200 cm are displayed at the first depth. In some embodiments, the first distance threshold is about 80 cm. Whether letters are displayed as if at the first depth or what first distance threshold is used may depend on a number of factors. One factor may be at how many different depths the system is able to display. For example, a shorter first distance threshold may be used if the embodiment only displays objects at two different depths, whereas a smaller range may be used when the embodiment can display the text at a greater number of different depths. For example, if a user is reading the newspaper, the system will perceive the text to be close to the user, so the letters on the newspaper will be displayed on the system as if at a close depth. As shown in FIG. 3, the display system 220 may comprise a plurality of depth planes 306 which can cause the virtual objects to appear at difference distances from the user. In certain implementations, the wearable system can adjust the rendering location of the modified text based on the user's eye capacity. For example, where the user is near-sighted, the wearable system can render the modified text at a depth plane closer to the user than the depth plane of which text originally corresponds to. As another example, where the user is far-sighted, the wearable system can render the modified text at a depth plane farther away from the user than where the original text appears.

Similarly, letters that are perceived to be far from the user may be displayed at a far depth on the display system. In some embodiments, letters that appear to be farther than about a second distance threshold from the user are displayed on the system at a second depth that appears to be farther away than the first depth. In some embodiments, the second distance threshold is about 300 cm. In some embodiments, the second distance threshold is about 600 cm. In some embodiments, the second distance threshold is about 10 m. For example, text viewed on a billboard while driving may be rendered at the second depth.

The difference between the first and second distance thresholds can be different in various embodiments. The magnitude of the difference may be based on a number of factors, such as, for example, how many depths at which the system can display text, the precision or accuracy of the system's ability to perceive distances from real-world objects or text, or what the manual or factory setting is. In some embodiments, the difference is less than 100 m. In some embodiments, the difference is less than 700 cm. In some embodiments, the difference is less than 30 cm. In certain embodiments, the difference is zero (e.g., the first distance threshold and the second distance threshold are the same).

In some embodiments, it is possible for the system to handle negative differences. That is, where there is some overlap in which an object or text fits the criteria both for being displayed at the first depth and at the second depth. In such embodiments, the wearable system can use context clues to determine which depth will provide the most seamless viewing experience for the user. For example, an object that initially appears close to the user but is rapidly moving away from the user may initially fit the criteria to be displayed at the first depth. However, the system may determine that because of the trajectory of the object's location, it will display the object at the second depth.

Some embodiments of the wearable system are able to display text at three or more depths. In such cases, intermediate distance thresholds or ranges of distances corresponding to third, fourth, etc. depths between the first and second depths can be included. For example, in some embodiments, text may be rendered at a third depth when the letters appear to be, for example, between about 100 cm and 300 cm away from the display 220.

The wearable system 200 can be configured to identify or recognize text from an image automatically or in response to a user input. In embodiments where text is automatically identified, a user can view an image with text and the system can identify and display the text as described herein without command by the user. In embodiments where the text is identified in response to a user input, a user can use a variety of commands to initiate the identification or display of the text. For example, a command may be a verbal cue, a hand gesture, a head motion (e.g., nodding), an eye movement (e.g., blinking), etc.

Example Processes of Modifying Display Characteristics of a Text

Figure 17:
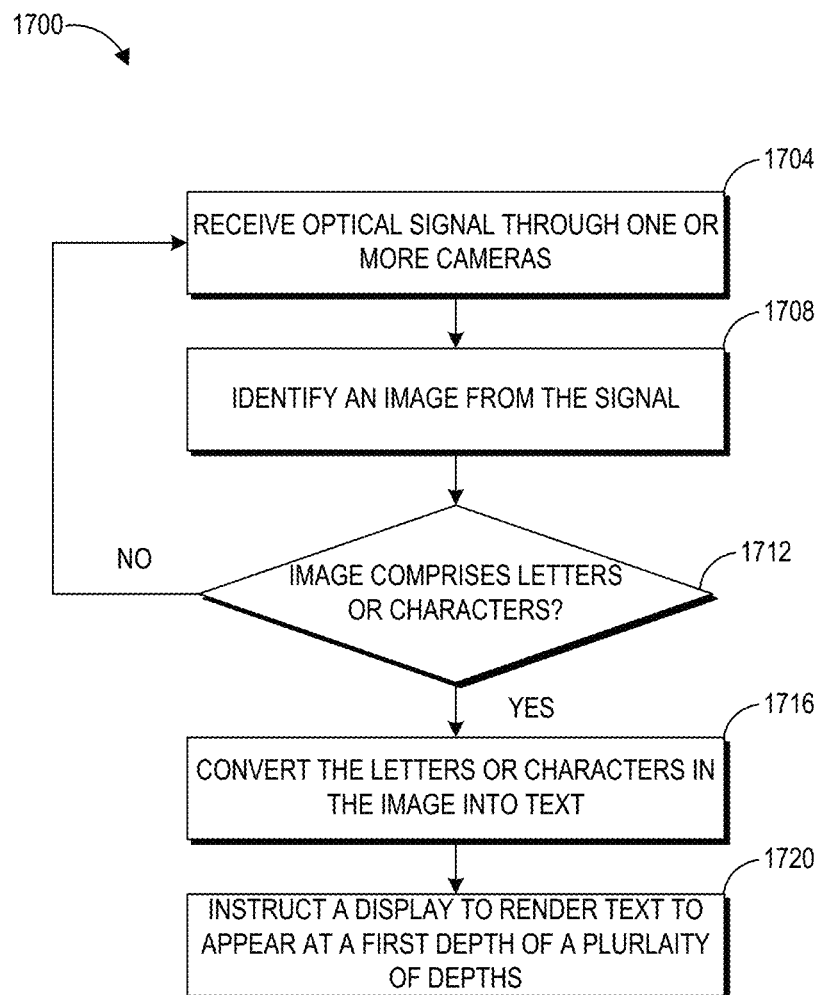
FIG. 17 illustrates an example process of a sensory eyewear for facilitating a user's interactions with the environment.

FIG. 17 illustrates an example process of a sensory eyewear for facilitating a user's interactions with the environment. The process 1700 can be performed by one or more components of the wearable system 200 (e.g., by the local processing & data module 260, the remote processing module 270, alone or in combination).

At block 1704, the wearable system can receive an optical signal through one or more cameras. The one or more cameras may be part of the outward-facing imaging system 464 or be part of another computing device such as a dash cam or the user input device 466.

At block 1708, the wearable system can include identifying an image from the signal. For example, the wearable system can convert the optical signal to human readable image. In some embodiments, identifying an image from the signal can also include recognizing the content of the image such as, e.g., performing an optical character recognition (OCR) on the image using one or more object recognizers 708. In certain embodiments, the optical character recognition process includes identifying likely candidates for the text or language of the one or more letters or characters. The optical character recognition process may use various contextual information (e.g., context clues) to perform the recognition. Some example contextual information may include the activity engaged in by the user or someone in a vicinity of the user, the geographical location of the user, the current speed of travel of the user, the current altitude of the user, the volume or type of ambient noise detected by the system, the level or type of visible or other light in the area detected by the display system, the temperature or climate detected by the display system, the perceived distance of the characters or letters from the user, or the category or genre of words detected by the display.

With continued reference to FIG. 17, the process 1700 can further include determining whether the image comprises letters or characters as shown in block 1712. In some embodiments, if the process 1700 determines that the image does not comprise letters or characters, the process can revert back to the block 1704. If the process 1700 determines that the image comprises letters or characters, the method continues onto the block 1716.

At block 1716, the wearable system can convert the letters or characters into text. This can include, for example, displaying the text in a second language that is different from the first language (as further described with reference to FIGS. 18 and 19). In some embodiments converting the one or more letters or characters (from an image) into a text can be done in response to receiving an input or command from a user or another person. Such an input or command can include a variety of modes, such as, for example, a verbal command, a hand gesture, a motion of the head, or a movement of one or more of the user's eyes. These examples should not be viewed as limiting.

At block 1720, the wearable system can instruct a display to render text to appear at a first depth of a plurality of depths from the user. In some embodiments, displaying the text includes transmitting light to the user as an image through an optically transmissive eyepiece. The eyepiece can be any of those described herein. For example, light may be directed into and eye of the user to form an image in the eye. The wearable system may use a fiber scanning projector or other projector as described herein. In some embodiments, the method may receive location data from a GPS system 37 (described with reference to FIG. 2B). This location data can be used to help the system infer text extracted from an image, as further described herein with reference to FIGS. 16A-16E.

The wearable system can also modify the text and render the modified text (e.g., project light from the display 220 toward the user's eyes). For example, the method can display the text, relative to the original letters or characters, in a different font, font size, color, background or background color, format, level of clarity, language, or brightness. In some embodiments, the method can include animating the text or incorporating virtual objects that interact with the text.

Examples of Modifying Content of Signage

In addition to or in alternative to modifying the display characteristics of the text, the wearable system can also modify the content of the text, such as, e.g., by translating the text from one language to another, and display the modified text. FIG. 18 illustrates an example of assisting a user in understanding signage in a physical environment by modifying the content of the signage where the signage is translated from a local language to a target language which the user of the wearable system is able to understand.

Figure 18:
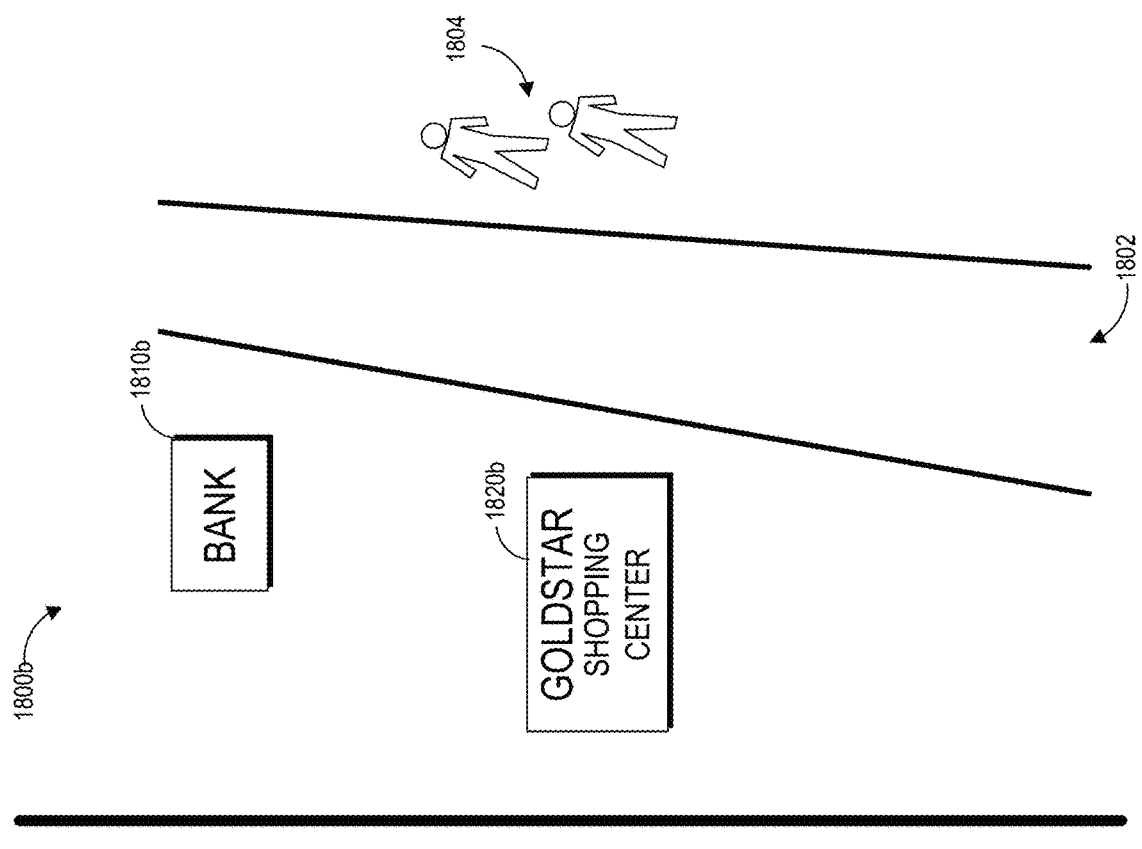
FIG. 18 illustrates an example of assisting a user in understanding signage in a physical environment by modifying the content of the signage.
Figure 18:
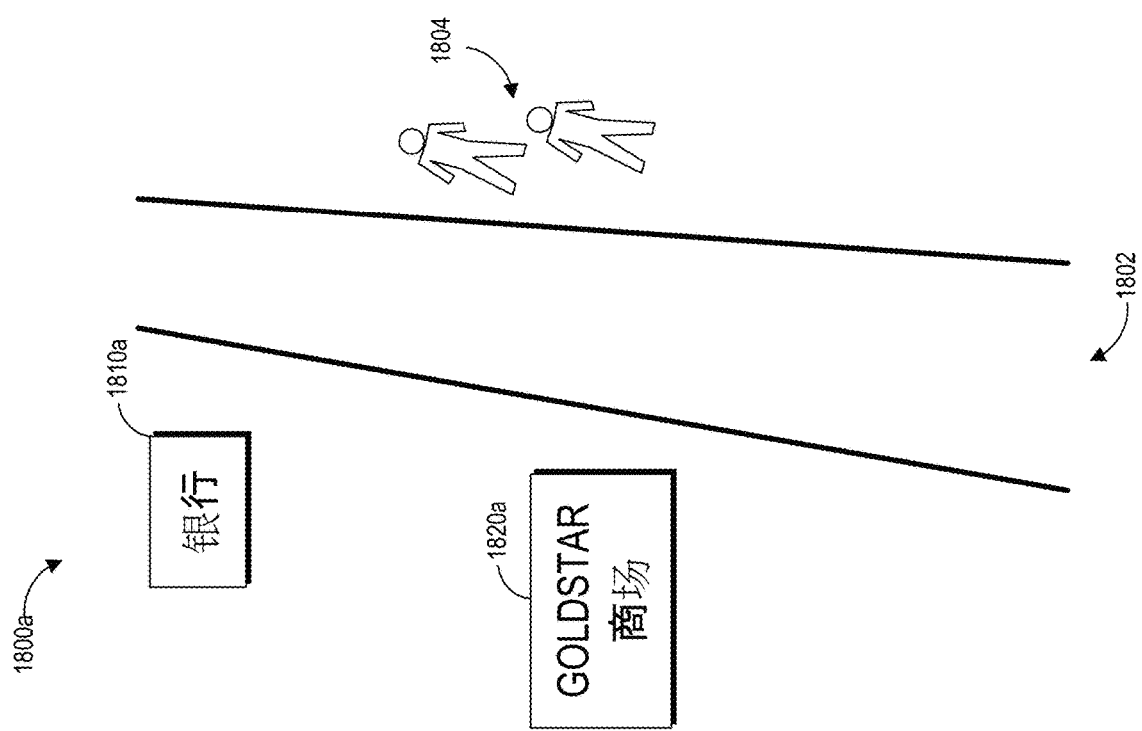

FIG. 18 illustrates two scenes 1800a and 1800b. The scene 1800a can be perceived by a user without wearing the HMD described herein. The scene 1800b can be perceived by the user while wearing the HMD (e.g., through the display 220, without the translation process to be described). As illustrated, both scenes 1800a and 1800b include a street 1802 and pedestrians 1804. The scene 1800a also shows street signs 1810a and 1820a which include Simplified Chinese characters. The sign 1820a also includes English characters. However, the user (not shown in FIG. 18) of the HMD may be an English speaker and may not understand the Chinese characters. Advantageously, in some embodiments, the wearable system can automatically recognize the text on the street signs 1810a and 1820b and convert the foreign language text portion of the street signs into a language that the user understands. The wearable system can also present the translated signage as a virtual image over the physical signs as shown in the scene 1800b. Accordingly, the user would not perceive the Chinese text in the signs 1810a, 1820a but instead would perceive the English text shown in the signs 1810b, 1820b, because the HMD displays virtual image (with the English text) with sufficient brightness that the underlying Chinese text is not perceived.

The HMD (e.g., the wearable system 200) can use similar techniques as described with reference to FIGS. 16A-17 to identify a sign in the user's environment and recognize the sign. In some situations, the wearable system 200 may be configured to translate only a portion of a sign. For example, the wearable system 200 translates only the portion of the sign 1820a having Chinese text but not the portion of the sign 1820a having English text ("GOLDSTAR"), because the English portion can be understood by the user (e.g., because it is in the target language of the user). However, in situations where the user is bilingual such that the user can read both English and Simplified Chinese, the wearable system 200 may be configured not to translate any of the text on the signs 1810a and 1820a into the signs 1810b and 1820b.

As described with reference to FIGS. 16A-16E, the wearable system 200 can be configured to adjust the display characteristics of the signs. For example, the text resulted from the translation of the Chinese portion of the sign 1820a may be longer than the original Chinese characters on the sign 1820a. As a result, the wearable system may reduce the font size of the translated text (e.g., "shopping center") such that the rendered text (as shown in the sign 1820b) can fit within the boundary of the original sign.

Although FIG. 18 shows Simplified Chinese and English characters, this is for illustration and is not a limitation. The language recognized and converted by embodiments of the wearable display system 200 can include any language such as, e.g., English, Chinese (simplified or traditional), Japanese, Korean, French, Spanish, German, Russian, Arabic, a Romance language, an Indo-European language, a Sino-Tibetan language, an Afro-Asiatic language, Hebrew, a Malayo-Polynesian language, etc.

Example Processes of Modifying Content of Signage

Figure 19:
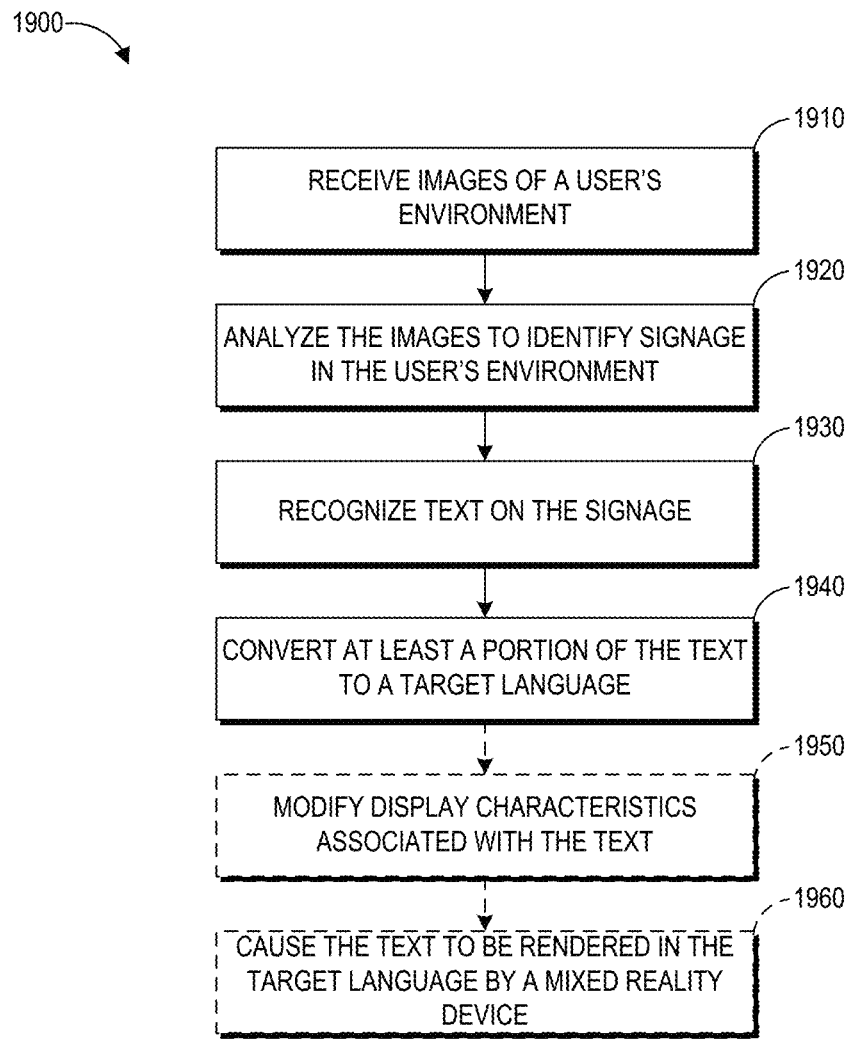
FIG. 19 illustrates an example process of assisting a user in understanding signage in a physical environment.

FIG. 19 illustrates an example process of assisting a user in understanding signage in a physical environment. The example process 1900 may be performed by one or more components of the wearable system 200 (e.g., by the local processing & data module 260, the remote processing module 270, alone or in combination).

At block 1910, the wearable system can receive images of a user's environment. The images can be captured by the outward-facing imaging system 464, a user input device 466, or a camera on another device that is external to the wearable system. The images may be still images, frames of a video, or a video.

At block 1920, the wearable system can analyze the images to identify signage in the user's environment. The wearable system can use the object recognizer 708 to perform such identification. For example, the object recognizer 708 can detect the existence of text on the object and thus classify the object as a sign or can recognize the regular boundary of the signage (e.g., the rectangular signs 1810a, 1810b in FIG. 18).

At block 1930, the wearable system can recognize text on the signage 1930. For example, the wearable system can determine which characters or letters there are on the sign. As another example, the wearable system can determine which language the text is in. The wearable system can make such determination based on context clues associated with the user or the sign, such as, e.g., the location of the user, the syntax, grammar, spelling of the text, etc. The wearable system can further determining the meaning of the text (e.g., by looking up in a dictionary) at block 1930.

At block 1940, the wearable system can convert at least a portion of the text to a target language. The target language may be determined based on the user's preference or the user's demographic information. For example, the target language may be the official language associated with the user's country of origin, the user's mother tongue, the language most frequently used by the user, or the language that the user has spoken (e.g., in a voice command to a wearable system or in a conversation with another user), etc. The target language can also be set in accordance with the user's preference. For example, the user may prefer the signs to be translated into English even though the user's native tongue is French.

At the optional block 1950, the wearable system can modify the display characteristics associated with the text. For example, the wearable system can add focus indicators to the text (or the background associated with the text), as well as change the font size or color of the text. Example modifications of the display characteristics are further described with reference to FIGS. 16A-17.

At the optional block 1960, the wearable system can cause the text to be rendered in the target language by a mixed reality device. The MR device may be the HMD described herein. Where the display characteristics are modified, the wearable system can also cause the modified display characteristics to be rendered. In situations where only a portion of the text is translated into the target language, the wearable system can either display only the portion of the translated text or display both the translated portion and the portion of the original text that was not translated. The modified text may be rendered over the original text on the physical signage such that the original text may be occluded from the user's view.

Although the examples in FIGS. 18 and 19 are described with reference to translating text on signage, similar techniques can also be applied to text that is embodied in other types of mediums (such as books, television, computer monitor, etc.).

Additional Aspects Related to Sign Language

Additional aspects of applications of sensory eyewear in a sign language are further provided below.

In a 1st aspect, a method for providing text converted from sign language through an augmented reality system, the method comprising: under the control of an augmented reality (AR) system comprising an imaging system: capturing, via the imaging system, image information; detecting gestures in the image information, the gestures being candidates for sign language recognition; recognizing sign language in the detected gestures; converting the recognized sign language to text; and displaying the converted text.

In a 2nd aspect, the method of aspect 1, further comprising: receiving a request for auxiliary information on the converted text; retrieving auxiliary information associated with the requested converted text; displaying the auxiliary information using the AR system; detecting a condition for dismissing display of the converted text or the auxiliary information; and dismissing display of the converted text or the auxiliary information.

In a 3rd aspect, the method of aspect 2, wherein the condition for dismissing display of the converted text or the auxiliary information is based on a user interface interaction.

In a 4th aspect, the method of aspect 3, wherein the user interface interaction is based, at least in part, on eye movements of a user of the AR system.

In a 5th aspect, the method of any one of aspects 2-4, wherein the condition for dismissing display of the converted text or the auxiliary information is based, at least in part, on a duration of time.

In a 6th aspect, the method of any one of aspects 2-5, wherein the condition for dismissing display of the converted text or the auxiliary information is based, at least in part, on conversion of additional sign language gestures or reception of additional auxiliary information.

In a 7th aspect, the method of any one of aspects 2-6, further comprising: detecting a condition for re-displaying a dismissed display of the converted text or the auxiliary information; and re-displaying a dismissed display of the converted text or the auxiliary information.

In an 8th aspect, the method of any one of aspects 1-7, wherein converting the recognized sign language to text comprises applying a deep learning technique.

In a 9th aspect, the method of aspect 8, wherein the deep learning technique comprises a neural network.

In a 10th aspect, the method of any one of aspects 1-9, wherein the AR system uses a sign language dictionary in sign language recognition and text conversion.

In an 11th aspect, the method of any one of aspects 1-10, wherein the AR system recognizes a sign language which is foreign to a user of the AR system.

In a 12th aspect, the method of aspect 11, wherein the AR system recognizes the sign language by working through a list of candidate sign languages, the list being prioritized based at least in part on location of the AR system.

In a 13th aspect, the method of any one of aspects 11-12, wherein the AR system recognizes the sign language by working through a list of candidate sign languages, the list being prioritized based at least in part on a spoken language detected in the environment of the AR system.

In a 14th aspect, an augmented reality (AR) apparatus for translating a sign language, comprising: an AR display; an imaging system; a data store configured to store computer-executable instructions and data; and a processor in communication with the data store, wherein the computer-executable instructions, when executed, cause the processor to: receive image information captured by the imaging system; detect gestures in the received image or video information; recognize sign language in the detected gestures; translate recognized sign language to a language understood by a user of the AR apparatus; and display, using the AR display, information associated with the translated sign language.

In a 15th aspect, the apparatus of aspect 14, wherein the computer-executable instructions, when executed, further cause the processor to: receive a request for auxiliary information on the translated sign language; retrieve auxiliary information related to the requested sign language; and display, using the AR display, the retrieved auxiliary information.

In a 16th aspect, the apparatus of any of aspects 14-15, wherein the processor detects the gestures and recognizes the sign language by transmitting received image information through a communication network to a remote processor for the remote processor to detect the gestures and to recognize the sign language.

In a 17th aspect, the apparatus of any one of aspects 14-16, wherein the imaging system comprises a plurality of cameras or a wide-angle camera.

In an 18th aspect, the apparatus of any one of aspects 14-17, wherein the processor is further configured to: determine a source of the detected gestures; and upon determining the source of the detected gestures to be the user of the AR apparatus, transmit the translated sign language to another device for display.

In a 19th aspect, the apparatus of any one of aspects 14-18, further comprising an audio amplifier, and the processor is further programmed to present the translated sign language in audio through the audio amplifier.

In a 20th aspect, the apparatus of aspect 19, wherein the processor is further configured to present the auxiliary information in audio through the audio amplifier.

In a 21st aspect, the apparatus of any one of aspects 14-20, wherein the language understood by the user of the AR apparatus comprises a sign language different from the recognized sign language.

In a 22nd aspect, an augmented reality (AR) system for facilitating remote communication involving one or more sign languages, comprising: a plurality of wearable AR devices, each comprising: an AR display; an imaging system; and a communication system for communicating over a communication network; one or more data stores configured to store computer-executable instructions and data; and one or more processors in communication with the data stores, wherein the computer-executable instructions, when executed, configure the one or more processors to: receive image information captured by the imaging system of a first wearable AR device in the plurality of wearable AR devices; detect sign language in the received image information; convert the detected sign language into text; transmit, through the communication network, the converted text to a second wearable AR device in the plurality of wearable AR devices; and display, on the AR display of the second wearable AR device, the converted text.

In a 23rd aspect, the system of aspect 22, wherein the second wearable AR device further displays a world map of the first user.

In a 24th aspect, the system of aspect 23, wherein the world map of the first user comprises an avatar of the first user.

In a 25th aspect, the system of any one of aspects 22-24, wherein each of the plurality of wearable AR devices includes one or more data stores and one or more processors, and the processor functionalities are performed by a local processor.

In a 26th aspect, a wearable system for sign language recognition, the wearable system comprising: a head-mounted display configured to present virtual content to a user; an imaging system configured to image an environment of the user; and a hardware processor in communication with the head-mounted display and the imaging system, and programmed to: receive an image captured by the imaging system; detect a gesture in the image with an object recognizer; recognize a meaning of the gesture in a sign language; identify a target language based on contextual information associated with the user; translate the gesture into the target language based on the recognized meaning; generate virtual content based at least partly on a translation of the gesture into the target language; and cause the head-mounted display to render the virtual content to the user.

In a 27th aspect, the wearable system of aspect 26, wherein the imaging system comprises one or more of wide-angle cameras configured to image a surrounding of the user.

In a 28th aspect, the wearable system of any one of aspects 26-27, where in the hardware processor is further programmed to access auxiliary information associated with the gesture; and where the virtual content rendered by the head-mounted display comprises the auxiliary information.

In a 29th aspect, the wearable system of any one of aspects 26-28, wherein to identify a target language based on contextual information associated with the user, the hardware processor is programmed to: set the target language as a language understood by the user based on at least one of: the user's speech as captured by the wearable system, the user's location, or an input from the user selecting the language as the target language.

In a 30th aspect, the wearable system of any one of aspects 26-29, wherein the hardware processor is programmed to determine whether the target language is a spoken language; and in response to a determination that the target language is a spoken language, to play an audio stream of a speech associated with the translated gesture in the target language.

In a 31st aspect, the wearable system of any one of aspects 26-29, wherein the hardware processor is programmed to determine whether the target language is another sign language; and in response to a determination that the target language is another sign language, present a graphic of another gesture in the other sign language as the translation of the gesture.

In a 32nd aspect, the wearable system of any one of aspects 26-31, wherein to recognize the meaning of the gesture in the sign language, the hardware processor is programmed to apply a deep neutral network technique on at a portion of the image captured by the imaging system.

In a 33rd aspect, the wearable system of any one of aspects 26-32, wherein the hardware processor is further programmed to identify the sign language from a list of candidate sign language based at least partly on a location of the user.

In a 34th aspect, the wearable system of any one of aspects 26-33, wherein to translate the gesture into the target language based on the recognized meaning, the hardware processor is programmed to convert the gesture to a text expression in the target language.

In a 35th aspect, the wearable system of any one of aspects 26-34, wherein the hardware processor is programmed to determine a source of the detected gesture; and upon determining the source of the detected gesture to be the user of the wearable system, communicate the translation of the gesture in the target language to a wearable device of another user.

In a 36th aspect, the wearable system of any one of aspects 26-35, wherein the hardware processor is programmed to detect a condition from dismissing the virtual content from display by the head-mounted display, and remove the virtual content from the display by the head-mounted display in response to a detection of the condition.

In a 37th aspect, the wearable system of aspect 36, wherein the condition comprises at least one of: a duration of time, a user's hand gesture, or an input from a user input device.

In a 38th aspect, the wearable system of any one of aspects 26-37, wherein the image comprises one or more frames of a video.

In a 39th aspect, a method for sign language recognition, the method comprising: receiving an image captured by an imaging system; analyzing the image to detect a gesture of a user; detecting a presence of a communication in a sign language based at least partly on the detected gesture; recognizing a meaning of the gesture in the sign language; identifying a target language to which the gesture will be translated into; translating the gesture into the target language based on the recognized meaning; generating virtual content based at least partly on a translation of the gesture into the target language; and causing a head-mounted display to render the virtual content to the user.

In a 40th aspect, the method of aspect 39, wherein the image is received from a first wearable device configured to present mixed reality content while the virtual content is communicated to a second wearable device for rendering, wherein the first wearable device and the second wearable device are configured to present mixed reality content to the user.

In a 41st aspect, the method of aspect 39, wherein translating the gesture into the target language based on the recognized meaning comprises converting the gesture to a text expression in the target language.

In a 42nd aspect, the method of any one of aspects 39-41, wherein the virtual content comprises a text expression in the target language or a graphic illustrating another in the target language.

In a 43rd aspect, the method of any one of aspects 39-42, wherein recognizing the meaning of the gesture in the sign language comprises applying a deep neutral network technique on at a portion of the image captured by the imaging system.

In a 44th aspect, the method of any one of aspects 39-43, wherein detecting the presence of the communication in the sign language comprises: identifying the sign language from a list of candidate sign languages; and determining the detected gesture correspond to an expression in the sign language.

In a 45th aspect, the method of aspect 44, wherein determining the detected gesture correspond to an expression in the sign language comprises analyzing the gesture in connection with the lip movements of a person making the gesture and audio data captures while the user is making the gesture.

Additional Aspects Related to Text Modification

Additional aspects modifying characteristics of a text by a sensory eyewear are further described below.

In a 1st aspect, a head-mounted display device configured to project augmented reality image content, the display device comprising: a frame configured to be wearable on a head of the user and configured to support a display in front of an eye of the user; one or more cameras configured to receive an optical signal; processing electronics configured to: receive a signal from the one or more cameras; identify an image from the signal; determine whether the image comprises text (e.g., one or more letters or characters); convert the text into modified text; and instruct the display to render the modified text.

In a 2nd aspect, the head-mounted display device of aspect 1, wherein the display comprises one or more light sources and one or more waveguide stacks configured to direct light into an eye of the user to form images in the eye.

In a 3rd aspect, the head-mounted display device of aspect 2, wherein the one or more light sources is configured to direct light into the waveguide stacks.

In a 4th aspect, the head-mounted display device of any one of aspects 2-3, wherein the one or more light sources comprises a fiber scanning projector.

In a 5th aspect, the head-mounted display device of any one of aspects 1-4, wherein the one or more cameras comprises one or more video cameras.

In a 6th aspect, the head-mounted display device of any one of aspects 1-5, wherein the processing electronics are configured to use an optical character recognition algorithm to convert one or more letters or characters in the image into text.

In a 7th aspect, the head-mounted display device of aspect 6, wherein the processing electronics are configured to access a database to identify likely candidates for the text or language of the one or more letters or characters.

In an 8th aspect, the head-mounted display device of any one of aspects 6-7, wherein the processing electronics is configured to receive input associated with one or more of an activity engaged in by the user, a geographical location of the user, a speed of travel of the user, an altitude of the user, a volume or type of ambient noise detected by the display, a level or type of visible or other light in the area detected by the display, a temperature or climate detected by the display, a perceived distance of the text from the user, or a category of words detected by the display.

In a 9th aspect, the head-mounted display device of any one of aspects 1-8, further comprising a GPS system.

In a 10th aspect, the head-mounted display device of any one of aspects 1-9, wherein the modified text is in a second font size different from a first font size of the text. The second font size can be larger than the first font size.

In an 11th aspect, the head-mounted display device of any one of aspects 1-10, wherein the modified text is more legible to the user then the text.

In a 12th aspect, the head-mounted display device of any one of aspects 1-11, wherein the processing electronics are configured to add graphical elements to the text in part to form the modified text.

In a 13th aspect, the head-mounted display device of any one of aspects 1-12, wherein the processing electronics are configured to display the one or more letters or characters of the text in a second font different from a first font of the one or more letters or characters.

In a 14th aspect, the head-mounted display device of any one of aspects 1-13, wherein the processing electronics are configured to magnify the one or more letters or characters of the text relative to what the user would see without the head-mounted display.

In a 15th aspect, the head-mounted display device of any one of aspects 1-14, wherein the processing electronics are configured to display a border region, the border region bounding an inner region.

In a 16th aspect, the head-mounted display device of aspect 15, wherein the processing electronics are configured to display the one or more letters or characters within the inner region.

In a 17th aspect, the head-mounted display device of any one of aspects 1-16, wherein the processing electronics are configured to display the one or more letters or characters of the text against a second background different from a first background against which the user would read the one or more letters or characters without the head-mounted display.

In an 18th aspect, the head-mounted display device of aspect 17, wherein the second background comprises a monochrome background.

In a 19th aspect, the head-mounted display device of aspect 18, wherein the monochrome background comprises white.

In a 20th aspect, the head-mounted display device of any one of aspects 17-19, wherein the first background comprises what the user would see without the head-mounted display.

In a 21st aspect, the head-mounted display device of any one of aspects 1-20, wherein the text is adapted to be editable by a text editor.

Although aspects 1-21 are described with reference to a head-mounted display, similar functions described in these aspects can also be implemented with a head-mounted device or the wearable system described with reference to FIG. 2A. Further, the display can comprise a plurality of depth planes and the head-mounted device is configured to identify a depth plane to render the modified text based at least partly on the user's eye capacity.

In a 22nd aspect, a method for projecting augmented reality image content using a head-mounted display, the method comprising: under control of a hardware processor: receiving an optical signal from one or more cameras; using an optical character recognition module, identifying an image from the signal; determining whether the image comprises one or more letters or characters; converting the one or more letters or characters into text; and displaying the text on the head-mounted display, wherein displaying the text comprises transmitting light to the user as an image through an optically transmissive eyepiece.

In a 23rd aspect, the method of aspect 22, further comprising directing light into an eye of the user to form images in the eye.

In a 24th aspect, the method of any one of aspects 22-23, further comprising directing light into the eyepiece using a fiber scanning projector.

In a 25th aspect, the method of any one of aspects 22-24, wherein using an optical character recognition module comprises identifying likely candidates for the text or language of the one or more letters or characters.

In a 26th aspect, the method of any one of aspects 22-25, wherein using an optical character recognition module comprises receiving an input comprising information associated with one or more of an activity engaged in by the user, a geographical location of the user, a speed of travel of the user, an altitude of the user, a volume or type of ambient noise detected by the display, a level or type of visible or other light in the area detected by the display, a temperature or climate detected by the display, a perceived distance of the one or more letters or characters from the user, or a category of words detected by the display.

In a 27th aspect, the method of any of aspects 22-26, wherein converting the one or more letters or characters into text comprises displaying the text in a second language different from a first language associated with the one or more letters or characters. In some implementations of the 27th aspect, the method includes translating the text into the second language.

In a 28th aspect, the method of any of one of aspects 22-27, further comprising receiving location data from a GPS system.

In a 29th aspect, the method of any one of aspects 22-28, wherein displaying the one or more letters or characters on the head-mounted display comprises displaying the one or more letters or characters in a second font size different from a first font size of the one or more letters or characters.

In a 30th aspect, the method of any one of aspects 22-29, wherein displaying the one or more letters or characters on the head-mounted display comprises displaying the one or more letters or characters more legibly to the user than without the head-mounted display.

In a 31st aspect, the method of any one of aspects 22-30, wherein displaying the one or more letters or characters on the head-mounted display comprises displaying the one or more letters or characters in a font size that is larger than would appear to the user without the head-mounted display.

In a 32nd aspect, the method of any one of aspects 22-31, wherein displaying the one or more letters or characters on the head-mounted display comprises displaying the one or more letters or characters in a second font different from a first font of the one or more letters or characters.

In a 33th aspect, the method of any one of aspects 22-32, wherein displaying the one or more letters or characters on the head-mounted display comprises magnifying the one or more letters or characters relative to what the user would see without the head-mounted display.

In a 34th aspect, the method of any one of aspects 22-33, wherein displaying the one or more letters or characters on the head-mounted display comprises displaying a border region, the border region bounding an inner region.

In a 35th aspect, the method of aspect 34, wherein displaying the one or more letters or characters on the head-mounted display comprises displaying the one or more letters or characters within the inner region.

In a 36th aspect, the method of any one of aspects 22-35, wherein displaying the one or more letters or characters on the head-mounted display comprises displaying the one or more letters or characters against a second background different from a first background against which the user would read the one or more letters or characters without the head-mounted display.

In a 37th aspect, the method of aspect 36, wherein the second background comprises a monochrome background.

In a 38th aspect, the method of aspect 37, wherein the monochrome background comprises white.

In a 39th aspect, the method of any of one of aspects 36-38, wherein the first background comprises what the user would see without the head-mounted display.

In a 40th aspect, the method of any one of aspects 22-39, wherein the text is adapted to be editable by a text editor.

In a 41st aspect, the method of any one of aspects 22-40, wherein converting the one or more letters or characters into text comprises receiving an input from a user.

In a 42nd aspect, the method of aspect 41, wherein receiving an input from a user comprises receiving one or more of a verbal command, a hand gesture, a motion of the head, or a movement of one or more of the user's eyes.

In a 43rd aspect, the method of any one of aspects 22-42, wherein the text is displayed at a first depth that appears to be closer than a second depth if the one or more letters or characters appear to be closer than a first distance threshold.

In a 44th aspect, the method of any one of aspects 22-43, wherein the text is displayed at a second depth that appears to be farther away than a first depth if the one or more letters or characters appear to be farther away than a second distance threshold.

In a 45th aspect, the method of any one of aspects 43-44, wherein the text is displayed at a third depth that appears to be farther away than the first depth but closer than the second depth if the one or more letters or characters appear to be farther away than a first distance threshold and closer than the second distance threshold.

In a 46th aspect, the method of any one of aspects 43-45, wherein the first distance threshold is 80 cm.

In a 47th aspect, the method of any one of aspects 43-46, wherein the second distance threshold is 600 cm.

In a 48th aspect, the method of any one of aspects 43-47, wherein the difference between the second distance threshold and first distance threshold is less than 100 m.

Additional Aspects Related to Signage Modification

In a 1st aspect, an augmented reality system comprising: an outward-facing imaging system; non-transitory memory configured to store images obtained by the outward-facing imaging system; and a hardware processor programmed to: receive images of an environment of a user of the augmented reality system obtained by the outward-facing imaging system; analyze the images to identify signage in the user's environment; recognize text on the signage; convert at least a portion of the text to a target language; and instruct a display to render the converted text to the user.

In a 2nd aspect, the augmented reality system of aspect 1, wherein the hardware processor is programmed to modify display characteristics associated with the text.

In a 3rd aspect, the augmented reality system of aspect 1 or 2, wherein to convert at least a portion of the text to a target language, the hardware processor is programmed to identify a language of the text on the signage and to convert the language to the target language.

In a 4th aspect, the augmented reality system of any one of aspects 1-3, wherein the hardware processor is programmed to determine the target language based at least in part on a location of the user.

In a 5th aspect, the augmented reality system of any one of aspects 1-4, wherein to recognize text on the signage, the hardware processor is programmed to recognize text that is in the target language.

In a 6th aspect, the augmented reality system of aspect 5, wherein the hardware processor is programmed not to convert the text that is in the target language.

Other Considerations

Each of the processes, methods, and algorithms described herein or depicted in the attached figures may be embodied in, and fully or partially automated by, code modules executed by one or more physical computing systems, hardware computer processors, application-specific circuitry, or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations or embodiments shown herein, but are to be accorded the widest scope consistent with this disclosure, the principles and the novel features disclosed herein.

Certain features that are described in this specification in the context of separate implementations or embodiments also can be implemented in combination in a single implementation or embodiment. Conversely, various features that are described in the context of a single implementation or embodiment also can be implemented in multiple implementations or embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without author input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A wearable display device, comprising:
a frame configured to be wearable on a head of a user, the frame configured to support a display in front of an eye of the user;
the display, comprising a plurality of waveguides configured to present virtual content to the eye of the user with various levels of wavefront curvature, such that the virtual content appears to be at a plurality of different depth planes;
one or more cameras configured to generate one or more images of at least a portion of an environment of the user; and
processing electronics configured to:
receive the one or more images from the one or more cameras;
identify, in the one or more images, at least one physical object in the environment of the user;
determine that the at least one physical object includes text comprising one or more letters or characters in a first language and, in response, generate modified text that includes a translation of at least a portion of the text from the first language to a second language;
generate a virtual representation of the at least one physical object comprising the modified text at a selected depth plane of the plurality of different depth planes such that the virtual representation appears closer to the user than a distance of the at least one physical object from the user, wherein the selected depth plane at which to present the virtual representation is selected from among the plurality of different depth planes based at least partly on the distance of the at least one physical object from the user; and
render the virtual representation of the at least one physical object using the display.

2. The wearable display device of claim 1, wherein the virtual representation is rendered to at least partially occlude the at least one physical object.

3. The wearable display device of claim 1, wherein the one or more cameras comprises one or more video cameras, and wherein the one or more images include one or more frames of a video generated by the one or more video cameras.

4. The wearable display device of claim 1, wherein the processing electronics are configured to use an optical character recognition algorithm to detect the one or more letters or characters in the one or more images.

5. The wearable display device of claim 1, wherein the processing electronics are configured to access a database to identify likely candidates for the first language of the one or more letters or characters.

6. The wearable display device of claim 1, wherein the processing electronics are further configured to determine the second language based on one or more of: a previously indicated preference of the user, an official language associated with a country where the user resides, or a language previously used by the user.

7. The wearable display device of claim 1, wherein the processing electronics are further configured to determine the first language based on a current location of the user.

8. The wearable display device of claim 1, wherein the modified text is in a second font size different from a first font size of the text.

9. The wearable display device of claim 1, wherein the modified text further comprises one or more graphical elements presented with the translation.

10. The wearable display device of claim 1, wherein the virtual representation comprises a border region bounding an inner region, wherein the processing electronics are configured to display the modified text within the inner region.

11. A method comprising:
receiving one or more images from one or more cameras on a wearable display device, the one or more images capturing at least a portion of an environment of a user of the wearable display device;
identifying, in the one or more images, at least one physical object in an environment of the user;
determining that the at least one physical object includes text comprising one or more letters or characters in a first language and, in response, generating modified text that includes a translation of at least a portion of the text from the first language to a second language;
generating a virtual representation of the at least one physical object comprising the modified text at a selected depth plane of a plurality of depth planes at which the wearable display device is configured to present virtual content, such that the virtual representation appears closer to the user than a distance of the at least one physical object from the user, wherein the selected depth plane at which to present the virtual representation is selected from the plurality of depth planes based at least partly on the distance of the at least one physical object from the user; and
rendering the virtual representation of the at least one physical object using a display.

12. The method of claim 11, wherein the virtual representation is rendered to at least partially occlude the at least one physical object.

13. The method of claim 11, wherein the one or more cameras comprises one or more video cameras, and wherein the one or more images include one or more frames of a video generated by the one or more video cameras.

14. The method of claim 11, further comprising using an optical character recognition algorithm to detect the one or more letters or characters in the one or more images.

15. The method of claim 11, further comprising accessing a database to identify likely candidates for the first language of the one or more letters or characters.

16. The method of claim 11, further comprising determining the second language based on one or more of: a previously indicated preference of the user, an official language associated with a country where the user resides, or a language previously used by the user.

17. The method of claim 11, further comprising determining the first language based on a current location of the user.

18. The method of claim 11, wherein the modified text is in a second font size different from a first font size of the text.

19. The method of claim 11, wherein the modified text further comprises one or more graphical elements presented with the translation.

20. The method of claim 11, wherein the virtual representation comprises a border region bounding an inner region, wherein processing electronics are configured to display the modified text within the inner region.

* * * * *